(12) United States Patent
Hagood, IV et al.

(10) Patent No.: US 9,135,868 B2
(45) Date of Patent: Sep. 15, 2015

(54) DIRECT-VIEW MEMS DISPLAY DEVICES AND METHODS FOR GENERATING IMAGES THEREON

(75) Inventors: Nesbitt W. Hagood, IV, Wellesley, MA (US); Jignesh Gandhi, Burlington, MA (US); Abraham McAllister, Annandale, VA (US); Rainer M. Malzbender, Niwot, CO (US); Stephen R. Lewis, Reading, MA (US)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 13/597,943

(22) Filed: Aug. 29, 2012

(65) Prior Publication Data

US 2012/0320111 A1     Dec. 20, 2012

Related U.S. Application Data

(63) Continuation of application No. 11/643,042, filed on Dec. 19, 2006, which is a continuation-in-part of application No. 11/361,294, filed on Feb. 23, 2006, now abandoned.

(Continued)

(51) Int. Cl.
*G09G 3/34* (2006.01)
*G02B 26/00* (2006.01)
(Continued)

(52) U.S. Cl.
CPC .............. *G09G 3/346* (2013.01); *G02B 26/004* (2013.01); *G02B 26/02* (2013.01); *G09G 3/2003* (2013.01);
(Continued)

(58) Field of Classification Search
CPC . G09G 3/3453; G09G 3/346; G02B 26/0833; G02B 26/0841; G02B 26/085; G02B 26/0858
USPC .................................................. 345/105–111
See application file for complete search history.

(56) References Cited

U.S. PATENT DOCUMENTS 3,864,582 A   2/1975 Keeler
4,067,043 A   1/1978 Perry
(Continued)

FOREIGN PATENT DOCUMENTS

CA   2241823 A1   8/1997
CA   2334403 A1   12/1999
(Continued)

OTHER PUBLICATIONS

Akimoto O. et al., "15.1: A 0.9-in UXGA/HDTV FLC Microdisplay," Society for Information Display, 2000, pp. 194-197.
(Continued)

*Primary Examiner* — Kenneth Bukowski
(74) *Attorney, Agent, or Firm* — Edward A. Gordon; Foley & Lardner LLP

(57) ABSTRACT

A direct-view display includes an array of MEMS light modulators and a control matrix formed on a transparent substrate, where each light modulator can be driven into at least two states, and a controller for controlling the states of each light modulator in the array. The control matrix transmits data and actuation voltages to the array. The controller includes an input, a processor, a memory, and an output. The input receives image data encoding an image frame for display. The processor derives a plurality of sub-frame data sets from the image data, where each sub-frame data set indicates desired states of light modulators in multiple rows and multiple columns of the array. The memory stores the plurality of sub-frame data sets. The output outputs the plurality of sub-frame data sets according to an output sequence to drive light modulators into the states indicated in the sub-frame data sets.

20 Claims, 32 Drawing Sheets

Related U.S. Application Data

(60) Provisional application No. 60/751,909, filed on Dec. 19, 2005, provisional application No. 60/655,827, filed on Feb. 23, 2005, provisional application No. 60/676,053, filed on Apr. 29, 2005, provisional application No. 60/776,367, filed on Feb. 24, 2006.

(51) Int. Cl.
  *G02B 26/02* (2006.01)
  *G09G 3/20* (2006.01)
  *G09G 5/06* (2006.01)
  *G09G 5/36* (2006.01)
  *G09G 5/393* (2006.01)

(52) U.S. Cl.
  CPC ............ *G09G 3/2022* (2013.01); *G09G 3/2081* (2013.01); *G09G 3/3413* (2013.01); *G09G 5/06* (2013.01); *G09G 5/363* (2013.01); *G09G 5/393* (2013.01); *G09G 2300/0809* (2013.01); *G09G 2310/0235* (2013.01); *G09G 2330/021* (2013.01); *G09G 2360/144* (2013.01)

(56) References Cited

U.S. PATENT DOCUMENTS

| | | |
|---|---|---|
| 4,074,253 A | 2/1978 | Nadir |
| 4,421,381 A | 12/1983 | Ueda et al. |
| 4,559,535 A | 12/1985 | Watkins et al. |
| 4,563,836 A | 1/1986 | Woodruff et al. |
| 4,564,836 A | 1/1986 | Vuilleumier et al. |
| 4,582,396 A | 4/1986 | Bos et al. |
| 4,673,253 A | 6/1987 | Tanabe et al. |
| 4,728,936 A | 3/1988 | Guscott et al. |
| 4,744,640 A | 5/1988 | Phillips |
| 4,889,603 A | 12/1989 | DiSanto et al. |
| 4,958,911 A | 9/1990 | Beiswenger et al. |
| 4,991,941 A | 2/1991 | Kalmanash |
| 5,005,108 A | 4/1991 | Pristash et al. |
| 5,025,346 A | 6/1991 | Tang et al. |
| 5,025,356 A | 6/1991 | Gawad |
| 5,042,900 A | 8/1991 | Parker |
| 5,044,734 A | 9/1991 | Sperl et al. |
| 5,050,946 A | 9/1991 | Hathaway et al. |
| 5,061,049 A | 10/1991 | Hornbeck |
| 5,062,689 A | 11/1991 | Koehler |
| 5,078,479 A | 1/1992 | Vuilleumier |
| 5,093,652 A | 3/1992 | Bull et al. |
| 5,096,279 A | 3/1992 | Hornbeck et al. |
| 5,128,787 A | 7/1992 | Blonder |
| 5,136,480 A | 8/1992 | Pristash et al. |
| 5,136,751 A | 8/1992 | Coyne et al. |
| 5,142,405 A | 8/1992 | Hornbeck |
| 5,184,248 A | 2/1993 | De Vaan et al. |
| 5,184,428 A | 2/1993 | Feldt et al. |
| 5,198,730 A | 3/1993 | Vancil |
| 5,202,950 A | 4/1993 | Arego et al. |
| 5,233,385 A | 8/1993 | Sampsell |
| 5,233,459 A | 8/1993 | Bozler et al. |
| 5,245,454 A | 9/1993 | Blonder |
| 5,266,612 A | 11/1993 | Kim et al. |
| 5,278,652 A | 1/1994 | Urbanus et al. |
| 5,280,277 A | 1/1994 | Hornbeck |
| 5,319,061 A | 6/1994 | Ramaswamy |
| 5,319,491 A | 6/1994 | Selbrede |
| 5,339,116 A | 8/1994 | Urbanus et al. |
| 5,339,179 A | 8/1994 | Rudisill et al. |
| 5,359,345 A | 10/1994 | Hunter |
| 5,379,135 A | 1/1995 | Nakagaki et al. |
| 5,393,710 A | 2/1995 | Park et al. |
| 5,396,350 A | 3/1995 | Beeson et al. |
| 5,405,490 A | 4/1995 | Park et al. |
| 5,416,631 A | 5/1995 | Yagi |
| 5,440,197 A | 8/1995 | Gleckman |
| 5,452,024 A | 9/1995 | Sampsell |
| 5,461,411 A | 10/1995 | Florence et al. |
| 5,465,175 A | 11/1995 | Woodgate et al. |
| 5,467,104 A | 11/1995 | Furness, III et al. |
| 5,477,086 A | 12/1995 | Rostoker et al. |
| 5,479,279 A | 12/1995 | Barbier et al. |
| 5,491,347 A | 2/1996 | Allen et al. |
| 5,493,439 A | 2/1996 | Engle |
| 5,497,172 A | 3/1996 | Doherty et al. |
| 5,497,258 A | 3/1996 | Ju et al. |
| 5,499,127 A | 3/1996 | Tsubota et al. |
| 5,504,389 A | 4/1996 | Dickey |
| 5,504,614 A | 4/1996 | Webb et al. |
| 5,510,824 A | 4/1996 | Nelson |
| 5,517,341 A | 5/1996 | Kim et al. |
| 5,517,347 A | 5/1996 | Sampsell |
| 5,519,240 A | 5/1996 | Suzuki |
| 5,519,565 A | 5/1996 | Kalt et al. |
| 5,523,803 A | 6/1996 | Urbanus et al. |
| 5,526,051 A | 6/1996 | Gove et al. |
| 5,528,262 A | 6/1996 | McDowall et al. |
| 5,548,301 A | 8/1996 | Kornher et al. |
| 5,548,670 A | 8/1996 | Koike |
| 5,552,925 A | 9/1996 | Worley |
| 5,559,389 A | 9/1996 | Spindt et al. |
| 5,568,964 A | 10/1996 | Parker et al. |
| 5,578,185 A | 11/1996 | Bergeron et al. |
| 5,579,035 A | 11/1996 | Beiswenger |
| 5,579,240 A | 11/1996 | Buus |
| 5,591,049 A | 1/1997 | Dohnishi |
| 5,596,339 A | 1/1997 | Furness, III |
| 5,596,369 A | 1/1997 | Chau |
| 5,613,751 A | 3/1997 | Parker et al. |
| 5,618,096 A | 4/1997 | Parker et al. |
| 5,619,266 A | 4/1997 | Tomita et al. |
| 5,622,612 A | 4/1997 | Mihara et al. |
| 5,629,784 A | 5/1997 | Abileah et al. |
| 5,629,787 A | 5/1997 | Tsubota et al. |
| 5,655,832 A | 8/1997 | Pelka et al. |
| 5,655,838 A | 8/1997 | Ridley et al. |
| 5,659,327 A | 8/1997 | Furness, III |
| 5,663,917 A | 9/1997 | Oka et al. |
| 5,666,226 A | 9/1997 | Ezra et al. |
| 5,677,749 A | 10/1997 | Tsubota et al. |
| 5,684,354 A | 11/1997 | Gleckman |
| 5,687,465 A | 11/1997 | Hinata et al. |
| 5,691,695 A | 11/1997 | Lahiff |
| 5,694,227 A | 12/1997 | Starkweather |
| 5,724,062 A | 3/1998 | Hunter |
| 5,731,802 A | 3/1998 | Aras et al. |
| 5,745,193 A | 4/1998 | Urbanus et al. |
| 5,745,203 A | 4/1998 | Valliath et al. |
| 5,745,281 A | 4/1998 | Yi et al. |
| 5,745,284 A | 4/1998 | Goldberg et al. |
| 5,771,321 A | 6/1998 | Stern |
| 5,781,331 A | 7/1998 | Carr et al. |
| 5,781,333 A | 7/1998 | Lanzillotta et al. |
| 5,784,189 A | 7/1998 | Bozler et al. |
| 5,794,761 A | 8/1998 | Renaud et al. |
| 5,798,746 A | 8/1998 | Koyama |
| 5,801,792 A | 9/1998 | Smith et al. |
| 5,808,800 A | 9/1998 | Handschy et al. |
| 5,810,469 A | 9/1998 | Weinreich |
| 5,815,134 A | 9/1998 | Nishi |
| 5,835,255 A | 11/1998 | Miles |
| 5,835,256 A | 11/1998 | Huibers |
| 5,854,872 A | 12/1998 | Tai |
| 5,867,302 A | 2/1999 | Fleming |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,917,692 A | 6/1999 | Schmitz et al. |
| 5,921,652 A | 7/1999 | Parker et al. |
| 5,923,480 A | 7/1999 | Labeye |
| 5,926,591 A | 7/1999 | Labeye et al. |
| 5,936,596 A | 8/1999 | Yoshida et al. |
| 5,943,223 A | 8/1999 | Pond |
| 5,953,469 A | 9/1999 | Zhou |

(56) References Cited

U.S. PATENT DOCUMENTS

| | | | |
|---|---|---|---|
| 5,959,763 A | 9/1999 | Bozler et al. |
| 5,963,367 A | 10/1999 | Aksyuk et al. |
| 5,973,727 A | 10/1999 | McGrew et al. |
| 5,975,711 A | 11/1999 | Parker et al. |
| 5,986,628 A | 11/1999 | Tuenge et al. |
| 5,986,796 A | 11/1999 | Miles |
| 5,986,828 A | 11/1999 | Wood et al. |
| 5,990,990 A | 11/1999 | Crabtree |
| 5,994,204 A | 11/1999 | Young et al. |
| 5,995,688 A | 11/1999 | Aksyuk et al. |
| 6,008,781 A | 12/1999 | Furness, III |
| 6,008,929 A | 12/1999 | Akimoto et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,836 A | 4/2000 | Tuchman |
| 6,046,840 A | 4/2000 | Huibers |
| 6,049,317 A | 4/2000 | Thompson et al. |
| 6,055,090 A | 4/2000 | Miles |
| 6,069,676 A | 5/2000 | Yuyama |
| 6,079,838 A | 6/2000 | Parker et al. |
| 6,111,560 A | 8/2000 | May |
| 6,130,527 A | 10/2000 | Bontempo et al. |
| 6,130,735 A | 10/2000 | Hatanaka et al. |
| 6,137,313 A | 10/2000 | Wong et al. |
| 6,154,586 A | 11/2000 | MacDonald et al. |
| 6,158,867 A | 12/2000 | Parker et al. |
| 6,162,657 A | 12/2000 | Schiele et al. |
| 6,168,395 B1 | 1/2001 | Quenzer et al. |
| 6,172,657 B1 | 1/2001 | Kamakura et al. |
| 6,172,797 B1 | 1/2001 | Huibers |
| 6,174,064 B1 | 1/2001 | Kalantar et al. |
| 6,195,196 B1 | 2/2001 | Kimura et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,215,536 B1 | 4/2001 | Ebihara et al. |
| 6,219,119 B1 | 4/2001 | Nakai |
| 6,225,991 B1 | 5/2001 | McKnight |
| 6,227,677 B1 | 5/2001 | Willis |
| 6,239,777 B1 | 5/2001 | Sugahara et al. |
| 6,249,169 B1 | 6/2001 | Okada |
| 6,249,269 B1 | 6/2001 | Blalock et al. |
| 6,249,370 B1 | 6/2001 | Takeuchi et al. |
| 6,266,240 B1 | 7/2001 | Urban et al. |
| 6,275,320 B1 | 8/2001 | Dhuler et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,288,829 B1 | 9/2001 | Kimura |
| 6,295,054 B1 | 9/2001 | McKnight |
| 6,296,383 B1 | 10/2001 | Henningsen |
| 6,296,838 B1 | 10/2001 | Bindra et al. |
| 6,300,154 B2 | 10/2001 | Clark et al. |
| 6,300,294 B1 | 10/2001 | Robbins et al. |
| 6,317,103 B1 | 11/2001 | Furness, III |
| 6,323,834 B1 | 11/2001 | Colgan et al. |
| 6,329,967 B1 | 12/2001 | Little et al. |
| 6,329,971 B2 | 12/2001 | McKnight |
| 6,329,974 B1 | 12/2001 | Walker et al. |
| 6,360,033 B1 | 3/2002 | Lee et al. |
| 6,367,940 B1 | 4/2002 | Parker et al. |
| 6,388,661 B1 | 5/2002 | Richards |
| 6,392,736 B1 | 5/2002 | Furukawa et al. |
| 6,402,335 B1 | 6/2002 | Kalantar et al. |
| 6,402,355 B1 | 6/2002 | Kinouchi |
| 6,404,942 B1 | 6/2002 | Edwards et al. |
| 6,407,851 B1 | 6/2002 | Islam et al. |
| 6,411,423 B2 | 6/2002 | Ham |
| 6,424,329 B1 | 7/2002 | Okita |
| 6,424,388 B1 | 7/2002 | Colgan et al. |
| 6,428,173 B1 | 8/2002 | Dhuler et al. |
| 6,429,625 B1 | 8/2002 | LeFevre et al. |
| 6,429,628 B2 | 8/2002 | Nakagawa |
| 6,459,467 B1 | 10/2002 | Hashimoto et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,486,997 B1 | 11/2002 | Bruzzone et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,514,111 B2 | 2/2003 | Ebihara et al. |
| 6,523,961 B2 | 2/2003 | Ilkov et al. |
| 6,529,250 B1 | 3/2003 | Murakami et al. |
| 6,529,265 B1 | 3/2003 | Henningsen |
| 6,531,329 B2 | 3/2003 | Asakura et al. |
| 6,531,947 B1 | 3/2003 | Weaver et al. |
| 6,532,044 B1 | 3/2003 | Conner et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| RE38,108 E | 5/2003 | Chee et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Whitney et al. |
| 6,582,095 B1 | 6/2003 | Toyoda |
| 6,583,915 B1 | 6/2003 | Hong et al. |
| 6,589,625 B1 | 7/2003 | Kothari et al. |
| 6,591,049 B2 | 7/2003 | Williams et al. |
| 6,593,677 B2 | 7/2003 | Behin et al. |
| 6,600,474 B1 | 7/2003 | Heines et al. |
| 6,621,488 B1 | 9/2003 | Takeuchi et al. |
| 6,626,540 B2 | 9/2003 | Ouchi et al. |
| 6,633,301 B1 | 10/2003 | Dallas et al. |
| 6,639,570 B2 | 10/2003 | Furness, III |
| 6,639,572 B1 | 10/2003 | Little et al. |
| 6,650,455 B2 | 11/2003 | Miles |
| 6,650,822 B1 | 11/2003 | Zhou |
| 6,664,779 B2 | 12/2003 | Lopes et al. |
| 6,666,561 B1 | 12/2003 | Blakley |
| 6,671,078 B2 | 12/2003 | Flanders et al. |
| 6,674,562 B1 | 1/2004 | Miles |
| 6,677,709 B1 | 1/2004 | Ma et al. |
| 6,677,936 B2 | 1/2004 | Jacobsen et al. |
| 6,678,029 B2 | 1/2004 | Suzuki |
| 6,680,792 B2 | 1/2004 | Miles |
| 6,687,040 B2 | 2/2004 | Kimura |
| 6,687,896 B1 | 2/2004 | Royce et al. |
| 6,690,422 B1 | 2/2004 | Daly et al. |
| 6,697,035 B2 | 2/2004 | Sugahara et al. |
| 6,698,348 B1 | 3/2004 | Bloss |
| 6,698,349 B2 | 3/2004 | Komata |
| 6,700,554 B2 | 3/2004 | Ham et al. |
| 6,701,039 B2 | 3/2004 | Bourgeois et al. |
| 6,707,176 B1 | 3/2004 | Rodgers |
| 6,710,008 B2 | 3/2004 | Chang et al. |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,071 B1 | 3/2004 | Parker |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,746,886 B2 | 6/2004 | Duncan et al. |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,534 B2 | 6/2004 | Veligdan et al. |
| 6,755,547 B2 | 6/2004 | Parker |
| 6,760,081 B2 | 7/2004 | Takagi |
| 6,760,505 B1 | 7/2004 | Street et al. |
| 6,762,743 B2 | 7/2004 | Yoshihara et al. |
| 6,762,868 B2 | 7/2004 | Liu et al. |

(56) References Cited

U.S. PATENT DOCUMENTS

| | | |
|---|---|---|
| 6,764,796 B2 | 7/2004 | Fries |
| 6,774,964 B2 | 8/2004 | Funamoto et al. |
| 6,775,048 B1 | 8/2004 | Starkweather et al. |
| 6,778,162 B2 | 8/2004 | Kimura et al. |
| 6,778,228 B2 | 8/2004 | Murakami et al. |
| 6,778,248 B1 | 8/2004 | Ootaguro et al. |
| 6,785,454 B2 | 8/2004 | Abe |
| 6,787,969 B2 | 9/2004 | Grade et al. |
| 6,788,371 B2 | 9/2004 | Tanada et al. |
| 6,794,119 B2 | 9/2004 | Miles |
| 6,795,064 B2 | 9/2004 | Walker et al. |
| 6,796,668 B2 | 9/2004 | Parker et al. |
| 6,798,935 B2 | 9/2004 | Bourgeois et al. |
| 6,800,996 B2 | 10/2004 | Nagai et al. |
| 6,809,851 B1 | 10/2004 | Gurcan |
| 6,819,386 B2 | 11/2004 | Roosendaal et al. |
| 6,819,465 B2 | 11/2004 | Clikeman et al. |
| 6,822,734 B1 | 11/2004 | Eidelman et al. |
| 6,825,470 B1 | 11/2004 | Bawolek et al. |
| 6,825,499 B2 | 11/2004 | Nakajima et al. |
| 6,827,456 B2 | 12/2004 | Parker et al. |
| 6,831,678 B1 | 12/2004 | Travis |
| 6,832,511 B2 | 12/2004 | Samoto et al. |
| 6,835,111 B2 | 12/2004 | Ahn et al. |
| 6,844,959 B2 | 1/2005 | Huibers et al. |
| 6,846,082 B2 | 1/2005 | Glent-Madsen et al. |
| 6,846,089 B2 | 1/2005 | Stevenson et al. |
| 6,847,425 B2 | 1/2005 | Tanada et al. |
| 6,847,428 B1 | 1/2005 | Sekiguchi et al. |
| 6,852,095 B1 | 2/2005 | Ray |
| 6,857,751 B2 | 2/2005 | Penn et al. |
| 6,859,625 B2 | 2/2005 | Sawada |
| 6,862,072 B2 | 3/2005 | Liu et al. |
| 6,863,219 B1 | 3/2005 | Jacobsen et al. |
| 6,864,618 B2 | 3/2005 | Miller et al. |
| 6,867,192 B1 | 3/2005 | Armour et al. |
| 6,867,896 B2 | 3/2005 | Miles |
| 6,873,311 B2 | 3/2005 | Yoshihara et al. |
| 6,879,307 B1 | 4/2005 | Stern |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,889,565 B2 | 5/2005 | DeConde et al. |
| 6,893,677 B2 | 5/2005 | Yamada et al. |
| 6,897,164 B2 | 5/2005 | Baude et al. |
| 6,897,843 B2 | 5/2005 | Ayres et al. |
| 6,900,072 B2 | 5/2005 | Patel et al. |
| 6,906,847 B2 | 6/2005 | Huibers et al. |
| 6,911,891 B2 | 6/2005 | Qiu et al. |
| 6,911,964 B2 | 6/2005 | Lee et al. |
| 6,912,082 B1 | 6/2005 | Lu et al. |
| 6,919,981 B2 | 7/2005 | Clikeman et al. |
| 6,934,080 B2 | 8/2005 | Saccomanno et al. |
| 6,936,013 B2 | 8/2005 | Pevoto |
| 6,936,968 B2 | 8/2005 | Cross et al. |
| 6,939,013 B2 | 9/2005 | Asao |
| 6,940,631 B2 | 9/2005 | Ishikawa |
| 6,943,495 B2 | 9/2005 | Ma et al. |
| 6,947,107 B2 | 9/2005 | Yoshii et al. |
| 6,947,195 B2 | 9/2005 | Ohtaka et al. |
| 6,950,240 B2 | 9/2005 | Matsuo |
| 6,952,301 B2 | 10/2005 | Huibers |
| 6,953,375 B2 | 10/2005 | Ahn et al. |
| 6,961,167 B2 | 11/2005 | Prins et al. |
| 6,962,418 B2 | 11/2005 | Utsumi et al. |
| 6,962,419 B2 | 11/2005 | Huibers |
| 6,963,330 B2 | 11/2005 | Sugahara et al. |
| 6,965,375 B1 | 11/2005 | Gettemy et al. |
| 6,967,698 B2 | 11/2005 | Tanoue et al. |
| 6,967,763 B2 | 11/2005 | Fujii et al. |
| 6,969,635 B2 | 11/2005 | Patel et al. |
| 6,970,227 B2 | 11/2005 | Kida et al. |
| 6,977,710 B2 | 12/2005 | Akiyama et al. |
| 6,980,349 B1 | 12/2005 | Huibers et al. |
| 6,985,205 B2 | 1/2006 | Chol et al. |
| 6,992,375 B2 | 1/2006 | Robbins et al. |
| 6,996,306 B2 | 2/2006 | Chen et al. |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,019,809 B2 | 3/2006 | Sekiguchi |
| 7,026,821 B2 | 4/2006 | Martin et al. |
| 7,038,758 B2 | 5/2006 | Suzuki |
| 7,042,618 B2 | 5/2006 | Selebrede et al. |
| 7,042,643 B2 | 5/2006 | Miles |
| 7,046,221 B1 | 5/2006 | Malzbender |
| 7,046,905 B1 | 5/2006 | Gardiner et al. |
| 7,048,905 B2 | 5/2006 | Paparatto et al. |
| 7,050,035 B2 | 5/2006 | Iisaka |
| 7,050,141 B2 | 5/2006 | Yokoue |
| 7,050,219 B2 | 5/2006 | Kimura |
| 7,050,790 B2 | 5/2006 | Yamaga |
| 7,057,790 B2 | 6/2006 | Selbrede |
| 7,060,895 B2 | 6/2006 | Kothari et al. |
| 7,071,611 B2 | 7/2006 | Yonekubo et al. |
| 7,072,096 B2 | 7/2006 | Holman et al. |
| 7,075,702 B2 | 7/2006 | Huibers et al. |
| 7,092,142 B2 | 8/2006 | Selebrede et al. |
| 7,110,158 B2 | 9/2006 | Miles |
| 7,116,464 B2 | 10/2006 | Osawa |
| 7,119,944 B2 | 10/2006 | Patel et al. |
| 7,123,216 B1 | 10/2006 | Miles |
| 7,123,796 B2 | 10/2006 | Steckl et al. |
| 7,126,738 B2 | 10/2006 | Miles |
| 7,140,751 B2 | 11/2006 | Lin |
| 7,156,548 B2 | 1/2007 | Teng et al. |
| 7,161,094 B2 | 1/2007 | Kothari et al. |
| 7,164,250 B2 | 1/2007 | Boscolo et al. |
| 7,164,520 B2 | 1/2007 | Palmateer et al. |
| 7,180,677 B2 | 2/2007 | Fujii et al. |
| 7,184,202 B2 | 2/2007 | Miles et al. |
| 7,196,837 B2 | 3/2007 | Sampsell et al. |
| 7,198,982 B2 | 4/2007 | Patel et al. |
| 7,199,916 B2 | 4/2007 | Faase et al. |
| 7,215,459 B2 | 5/2007 | Huibers et al. |
| 7,217,588 B2 | 5/2007 | Hartzell et al. |
| 7,218,437 B2 | 5/2007 | Selbrede |
| 7,227,677 B2 | 6/2007 | Ravnkilde et al. |
| 7,233,304 B1 | 6/2007 | Aratani et al. |
| 7,271,945 B2 | 9/2007 | Hagood et al. |
| 7,274,416 B2 | 9/2007 | Feenstra et al. |
| 7,291,363 B2 | 11/2007 | Miller |
| 7,292,235 B2 | 11/2007 | Nose |
| 7,298,448 B2 | 11/2007 | Wu |
| 7,304,785 B2 | 12/2007 | Hagood et al. |
| 7,304,786 B2 | 12/2007 | Hagood et al. |
| 7,315,294 B2 | 1/2008 | Richards |
| 7,345,805 B2 | 3/2008 | Chui |
| 7,359,108 B2 | 4/2008 | Hayes et al. |
| 7,365,897 B2 | 4/2008 | Hagood et al. |
| 7,374,328 B2 | 5/2008 | Kuroda et al. |
| 7,391,493 B2 | 6/2008 | Kim |
| 7,391,552 B2 | 6/2008 | Barton et al. |
| 7,405,852 B2 | 7/2008 | Hagood, IV et al. |
| 7,417,735 B2 * | 8/2008 | Cummings et al. ............ 356/408 |
| 7,417,782 B2 | 8/2008 | Hagood et al. |
| 7,420,725 B2 | 9/2008 | Kothari |
| 7,460,290 B2 | 12/2008 | Hagood, IV et al. |
| 7,463,227 B2 | 12/2008 | Van Gorkom et al. |
| 7,463,398 B2 | 12/2008 | Feenstra et al. |
| 7,502,159 B2 | 3/2009 | Hagood, IV et al. |
| 7,529,012 B2 | 5/2009 | Hayes et al. |
| 7,551,344 B2 | 6/2009 | Hagood et al. |
| 7,573,547 B2 | 8/2009 | Palmateer et al. |
| 7,601,942 B2 | 10/2009 | Underwood et al. |
| 7,616,368 B2 | 11/2009 | Hagood, IV |
| 7,619,806 B2 | 11/2009 | Hagood, IV et al. |
| 7,636,189 B2 | 12/2009 | Hagood, IV et al. |
| 7,666,049 B2 | 2/2010 | Saito et al. |
| 7,675,665 B2 | 3/2010 | Hagood et al. |
| 7,715,080 B2 | 5/2010 | Natarajan et al. |
| 7,729,037 B2 | 6/2010 | Hagood, IV et al. |

(56) References Cited

U.S. PATENT DOCUMENTS

| | | |
|---|---|---|
| 7,742,016 B2 | 6/2010 | Hagood et al. |
| 7,742,215 B2 | 6/2010 | Hagood, IV |
| 7,746,529 B2 | 6/2010 | Hagood et al. |
| 7,755,582 B2 | 7/2010 | Hagood et al. |
| 7,826,127 B2 | 11/2010 | Khonsari et al. |
| 7,839,356 B2 | 11/2010 | Hagood et al. |
| 7,852,546 B2 | 12/2010 | Fijol et al. |
| 7,876,489 B2 | 1/2011 | Gandhi et al. |
| 7,898,714 B2 | 3/2011 | Hagood, IV et al. |
| 7,920,317 B2 | 4/2011 | Lee et al. |
| 7,927,654 B2 | 4/2011 | Hagood et al. |
| 7,975,665 B2 | 7/2011 | Mori |
| 7,999,994 B2 | 8/2011 | Hagood, IV et al. |
| 8,159,428 B2 | 4/2012 | Hagood et al. |
| 8,169,679 B2 | 5/2012 | Wu et al. |
| 8,310,442 B2 | 11/2012 | Hagood et al. |
| 8,482,496 B2 | 7/2013 | Lewis |
| 8,519,923 B2 | 8/2013 | Hagood, IV et al. |
| 8,519,945 B2 | 8/2013 | Hagood et al. |
| 8,526,096 B2 | 9/2013 | Steyn et al. |
| 8,599,463 B2 | 12/2013 | Wu et al. |
| 8,698,980 B2 | 4/2014 | Chao et al. |
| 2001/0028422 A1 | 10/2001 | Tsujimura et al. |
| 2001/0028993 A1 | 10/2001 | Sanford |
| 2001/0030488 A1 | 10/2001 | Jerman et al. |
| 2001/0040538 A1 | 11/2001 | Quanrud |
| 2001/0043177 A1 | 11/2001 | Huston et al. |
| 2001/0048265 A1 | 12/2001 | Miller et al. |
| 2001/0048431 A1 | 12/2001 | Laffargue et al. |
| 2001/0050661 A1* | 12/2001 | Noda et al. ............. 345/32 |
| 2002/0000959 A1* | 1/2002 | Colgan et al. ............. 345/84 |
| 2002/0012159 A1 | 1/2002 | Tew |
| 2002/0030566 A1 | 3/2002 | Bozler et al. |
| 2002/0047172 A1 | 4/2002 | Reid |
| 2002/0051096 A1 | 5/2002 | Yamazaki et al. |
| 2002/0054424 A1* | 5/2002 | Miles ............. 359/291 |
| 2002/0063218 A1 | 5/2002 | Maydanich et al. |
| 2002/0063661 A1 | 5/2002 | Comiskey et al. |
| 2002/0075555 A1 | 6/2002 | Miles |
| 2002/0093722 A1 | 7/2002 | Chan et al. |
| 2002/0109903 A1 | 8/2002 | Kaeriyama |
| 2002/0113281 A1 | 8/2002 | Cunningham et al. |
| 2002/0126387 A1 | 9/2002 | Ishikawa et al. |
| 2002/0135553 A1 | 9/2002 | Nagai et al. |
| 2002/0150698 A1 | 10/2002 | Kawabata |
| 2002/0163482 A1 | 11/2002 | Sullivan |
| 2002/0163484 A1 | 11/2002 | Furness, III et al. |
| 2002/0163709 A1 | 11/2002 | Mirza |
| 2002/0171327 A1 | 11/2002 | Miller et al. |
| 2002/0181597 A1 | 12/2002 | Okada |
| 2002/0185699 A1 | 12/2002 | Reid |
| 2002/0195423 A1 | 12/2002 | Patel et al. |
| 2002/0196522 A1 | 12/2002 | Little et al. |
| 2003/0001815 A1 | 1/2003 | Cui |
| 2003/0009898 A1 | 1/2003 | Slocum et al. |
| 2003/0021004 A1 | 1/2003 | Cunningham et al. |
| 2003/0023110 A1 | 1/2003 | Tam et al. |
| 2003/0036215 A1 | 2/2003 | Reid |
| 2003/0042157 A1 | 3/2003 | Mays |
| 2003/0043337 A1 | 3/2003 | Takabayashi |
| 2003/0048036 A1 | 3/2003 | Lemkin |
| 2003/0048370 A1 | 3/2003 | Koyama |
| 2003/0058543 A1 | 3/2003 | Sheedy et al. |
| 2003/0063234 A1 | 4/2003 | Oda et al. |
| 2003/0067565 A1 | 4/2003 | Yamamura |
| 2003/0071686 A1 | 4/2003 | Lemkin |
| 2003/0076649 A1 | 4/2003 | Speakman |
| 2003/0081315 A1 | 5/2003 | Kobayashi |
| 2003/0081402 A1 | 5/2003 | Jeon et al. |
| 2003/0085650 A1 | 5/2003 | Cathey et al. |
| 2003/0085867 A1 | 5/2003 | Grabert |
| 2003/0095081 A1 | 5/2003 | Furness, III et al. |
| 2003/0123245 A1 | 7/2003 | Parker et al. |
| 2003/0123246 A1 | 7/2003 | Parker |
| 2003/0128218 A1 | 7/2003 | Struyk |
| 2003/0128416 A1 | 7/2003 | Caracci et al. |
| 2003/0133284 A1 | 7/2003 | Chipchase et al. |
| 2003/0156422 A1 | 8/2003 | Tatewaki et al. |
| 2003/0164814 A1 | 9/2003 | Starkweather et al. |
| 2003/0174422 A1 | 9/2003 | Miller et al. |
| 2003/0174931 A1 | 9/2003 | Rodgers et al. |
| 2003/0183008 A1 | 10/2003 | Bang et al. |
| 2003/0184189 A1 | 10/2003 | Sinclair |
| 2003/0190536 A1 | 10/2003 | Fries |
| 2003/0196590 A1 | 10/2003 | Hartzell |
| 2003/0202338 A1 | 10/2003 | Parker |
| 2003/0210811 A1 | 11/2003 | Dubowsky et al. |
| 2003/0218793 A1 | 11/2003 | Soneda et al. |
| 2003/0231160 A1 | 12/2003 | Yoshihara et al. |
| 2004/0001033 A1 | 1/2004 | Goodwin-Johansson et al. |
| 2004/0012946 A1 | 1/2004 | Parker et al. |
| 2004/0036668 A1* | 2/2004 | Nakanishi ............. 345/88 |
| 2004/0051929 A1 | 3/2004 | Sampsell et al. |
| 2004/0058532 A1 | 3/2004 | Miles et al. |
| 2004/0076008 A1 | 4/2004 | Ikeda |
| 2004/0080484 A1 | 4/2004 | Heines et al. |
| 2004/0085608 A1 | 5/2004 | Theil et al. |
| 2004/0085749 A1 | 5/2004 | Parker et al. |
| 2004/0088629 A1 | 5/2004 | Ott |
| 2004/0090144 A1 | 5/2004 | Miller et al. |
| 2004/0090599 A1 | 5/2004 | Kowarz et al. |
| 2004/0113903 A1 | 6/2004 | Mikami et al. |
| 2004/0114346 A1 | 6/2004 | Parker et al. |
| 2004/0122328 A1 | 6/2004 | Wang et al. |
| 2004/0125062 A1 | 7/2004 | Yamamoto et al. |
| 2004/0135273 A1 | 7/2004 | Parker et al. |
| 2004/0135951 A1 | 7/2004 | Stumbo et al. |
| 2004/0136680 A1 | 7/2004 | Medina et al. |
| 2004/0141700 A1 | 7/2004 | Yang |
| 2004/0145580 A1 | 7/2004 | Perlman |
| 2004/0145793 A1 | 7/2004 | Barbour et al. |
| 2004/0145854 A1 | 7/2004 | Tamura |
| 2004/0156246 A1 | 8/2004 | Nakamura |
| 2004/0157664 A1 | 8/2004 | Link |
| 2004/0165372 A1 | 8/2004 | Parker |
| 2004/0171206 A1 | 9/2004 | Rodgers |
| 2004/0173872 A1 | 9/2004 | Park et al. |
| 2004/0179146 A1 | 9/2004 | Nilsson |
| 2004/0184710 A1 | 9/2004 | Kubby et al. |
| 2004/0196215 A1 | 10/2004 | Duthaler et al. |
| 2004/0207768 A1 | 10/2004 | Liu |
| 2004/0207815 A1 | 10/2004 | Allen et al. |
| 2004/0212759 A1 | 10/2004 | Hayashi |
| 2004/0212907 A1 | 10/2004 | Mala et al. |
| 2004/0217919 A1 | 11/2004 | Piehl et al. |
| 2004/0218149 A1 | 11/2004 | Huibers |
| 2004/0218154 A1 | 11/2004 | Huibers |
| 2004/0218292 A1 | 11/2004 | Huibers |
| 2004/0218293 A1 | 11/2004 | Huibers |
| 2004/0223088 A1 | 11/2004 | Huibers |
| 2004/0223240 A1 | 11/2004 | Huibers |
| 2004/0227428 A1 | 11/2004 | Sinclair |
| 2004/0233354 A1 | 11/2004 | Uehara et al. |
| 2004/0233392 A1 | 11/2004 | Huibers |
| 2004/0233498 A1* | 11/2004 | Starkweather et al. ....... 359/230 |
| 2004/0233503 A1 | 11/2004 | Kimura |
| 2004/0240032 A1 | 12/2004 | Miles |
| 2004/0240138 A1 | 12/2004 | Martin et al. |
| 2004/0246275 A1 | 12/2004 | Yoshihara et al. |
| 2004/0263076 A1 | 12/2004 | De Zwart et al. |
| 2004/0263502 A1 | 12/2004 | Dallas et al. |
| 2004/0263944 A1 | 12/2004 | Miles et al. |
| 2005/0002082 A1 | 1/2005 | Miles |
| 2005/0002086 A1 | 1/2005 | Starkweather et al. |
| 2005/0007671 A1 | 1/2005 | Onvlee |
| 2005/0007759 A1 | 1/2005 | Parker |
| 2005/0012197 A1 | 1/2005 | Smith et al. |
| 2005/0018322 A1 | 1/2005 | Ben-Gad et al. |
| 2005/0024849 A1 | 2/2005 | Parker et al. |
| 2005/0052681 A1 | 3/2005 | Kogi |
| 2005/0052723 A1 | 3/2005 | Watanabe et al. |
| 2005/0059184 A1 | 3/2005 | Sniegowski et al. |
| 2005/0062708 A1 | 3/2005 | Yoshihara et al. |
| 2005/0072032 A1 | 4/2005 | McCollum et al. |

(56) References Cited

U.S. PATENT DOCUMENTS

| | | |
|---|---|---|
| 2005/0073471 A1 | 4/2005 | Selbrede |
| 2005/0088404 A1 | 4/2005 | Heines et al. |
| 2005/0094240 A1 | 5/2005 | Huibers et al. |
| 2005/0094418 A1 | 5/2005 | Parker |
| 2005/0111238 A1 | 5/2005 | Parker |
| 2005/0111241 A1 | 5/2005 | Parker |
| 2005/0116798 A1 | 6/2005 | Bintoro et al. |
| 2005/0122560 A1 | 6/2005 | Sampsell et al. |
| 2005/0122591 A1 | 6/2005 | Parker et al. |
| 2005/0123249 A1 | 6/2005 | Yun et al. |
| 2005/0123349 A1 | 6/2005 | Koch |
| 2005/0128370 A1 | 6/2005 | Moon |
| 2005/0134768 A1 | 6/2005 | Sugiura et al. |
| 2005/0134805 A1 | 6/2005 | Conner et al. |
| 2005/0139542 A1 | 6/2005 | Dickensheets et al. |
| 2005/0140636 A1* | 6/2005 | Chung et al. ............ 345/98 |
| 2005/0141076 A1 | 6/2005 | Bausenwein et al. |
| 2005/0151940 A1 | 7/2005 | Asao |
| 2005/0157376 A1 | 7/2005 | Huibers et al. |
| 2005/0168431 A1 | 8/2005 | Chui |
| 2005/0168789 A1 | 8/2005 | Glent-Madsen |
| 2005/0171408 A1 | 8/2005 | Parker |
| 2005/0172625 A1 | 8/2005 | Starkweather et al. |
| 2005/0179977 A1 | 8/2005 | Chui et al. |
| 2005/0195467 A1 | 9/2005 | Kothari et al. |
| 2005/0195468 A1 | 9/2005 | Sampsell |
| 2005/0206991 A1 | 9/2005 | Chui et al. |
| 2005/0207154 A1 | 9/2005 | Parker |
| 2005/0207178 A1 | 9/2005 | Parker |
| 2005/0212734 A1 | 9/2005 | Kimura |
| 2005/0212738 A1 | 9/2005 | Gally |
| 2005/0213322 A1 | 9/2005 | Parker |
| 2005/0213323 A1 | 9/2005 | Parker |
| 2005/0213349 A1 | 9/2005 | Parker |
| 2005/0219676 A1 | 10/2005 | Kimura et al. |
| 2005/0219679 A1 | 10/2005 | Ishikawa |
| 2005/0219680 A1 | 10/2005 | Ishikawa |
| 2005/0225501 A1 | 10/2005 | Srinivasan et al. |
| 2005/0225519 A1 | 10/2005 | Naugler, Jr. |
| 2005/0225732 A1 | 10/2005 | Conner et al. |
| 2005/0225827 A1 | 10/2005 | Kastalsky |
| 2005/0231791 A1 | 10/2005 | Sampsell et al. |
| 2005/0236928 A1 | 10/2005 | Kurozuka et al. |
| 2005/0242710 A1 | 11/2005 | Yamazaki et al. |
| 2005/0243023 A1 | 11/2005 | Reddy et al. |
| 2005/0244099 A1 | 11/2005 | Pasch et al. |
| 2005/0244949 A1 | 11/2005 | Miles |
| 2005/0245313 A1 | 11/2005 | Yoshino et al. |
| 2005/0249966 A1 | 11/2005 | Tung et al. |
| 2005/0253779 A1 | 11/2005 | Feenstra et al. |
| 2005/0258571 A1 | 11/2005 | Dumond et al. |
| 2005/0259198 A1 | 11/2005 | Lubart et al. |
| 2005/0263866 A1 | 12/2005 | Wan |
| 2005/0265029 A1 | 12/2005 | Epstein et al. |
| 2005/0275072 A1 | 12/2005 | Haluzak et al. |
| 2005/0275930 A1 | 12/2005 | Patel et al. |
| 2005/0285816 A1 | 12/2005 | Glass |
| 2005/0286113 A1 | 12/2005 | Miles |
| 2005/0286114 A1 | 12/2005 | Miles |
| 2006/0001942 A1 | 1/2006 | Chui et al. |
| 2006/0003676 A1 | 1/2006 | Bernard et al. |
| 2006/0004928 A1 | 1/2006 | Hess et al. |
| 2006/0007514 A1 | 1/2006 | Desai |
| 2006/0007701 A1 | 1/2006 | Schoellmann et al. |
| 2006/0012781 A1 | 1/2006 | Fradkin et al. |
| 2006/0023287 A1 | 2/2006 | Przybyla et al. |
| 2006/0028708 A1 | 2/2006 | Miles |
| 2006/0028811 A1 | 2/2006 | Ross, Jr. et al. |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0033676 A1 | 2/2006 | Faase et al. |
| 2006/0033975 A1 | 2/2006 | Miles |
| 2006/0038766 A1 | 2/2006 | Morita |
| 2006/0038768 A1 | 2/2006 | Sagawa et al. |
| 2006/0044246 A1 | 3/2006 | Mignard |
| 2006/0044298 A1 | 3/2006 | Mignard et al. |
| 2006/0044508 A1 | 3/2006 | Mochizuki |
| 2006/0044928 A1 | 3/2006 | Chui et al. |
| 2006/0061559 A1 | 3/2006 | King |
| 2006/0066504 A1 | 3/2006 | Sampsell et al. |
| 2006/0066540 A1 | 3/2006 | Hewlett et al. |
| 2006/0066560 A1 | 3/2006 | Gally et al. |
| 2006/0066598 A1 | 3/2006 | Floyd |
| 2006/0066934 A1 | 3/2006 | Selbrede |
| 2006/0066937 A1 | 3/2006 | Chui |
| 2006/0077125 A1 | 4/2006 | Floyd |
| 2006/0077153 A1 | 4/2006 | Cummings et al. |
| 2006/0092490 A1 | 5/2006 | McCollum et al. |
| 2006/0104061 A1 | 5/2006 | Lerner et al. |
| 2006/0132383 A1 | 6/2006 | Gally et al. |
| 2006/0152476 A1 | 7/2006 | Van Gorkom et al. |
| 2006/0154078 A1 | 7/2006 | Watanabe et al. |
| 2006/0172745 A1 | 8/2006 | Knowles |
| 2006/0187290 A1 | 8/2006 | Nakashima |
| 2006/0209000 A1 | 9/2006 | Sumiyoshi et al. |
| 2006/0209012 A1 | 9/2006 | Hagood, IV |
| 2006/0215540 A1 | 9/2006 | Krishnamoorthi et al. |
| 2006/0238443 A1 | 10/2006 | Derichs |
| 2006/0250325 A1 | 11/2006 | Hagood et al. |
| 2006/0262060 A1 | 11/2006 | Amundson |
| 2006/0262380 A1 | 11/2006 | Miles |
| 2006/0268386 A1 | 11/2006 | Selbrede et al. |
| 2006/0268568 A1 | 11/2006 | Oku et al. |
| 2006/0270179 A1 | 11/2006 | Yang |
| 2006/0280319 A1 | 12/2006 | Wang et al. |
| 2006/0291034 A1 | 12/2006 | Patry et al. |
| 2006/0291771 A1 | 12/2006 | Braunisch et al. |
| 2006/0291774 A1 | 12/2006 | Schoellmann et al. |
| 2007/0002413 A1 | 1/2007 | Psaltis et al. |
| 2007/0003055 A1 | 1/2007 | Bark et al. |
| 2007/0007889 A1 | 1/2007 | Bongaerts et al. |
| 2007/0024701 A1 | 2/2007 | Prechtl et al. |
| 2007/0031097 A1 | 2/2007 | Heikenfeld et al. |
| 2007/0035808 A1 | 2/2007 | Amundson et al. |
| 2007/0040982 A1 | 2/2007 | Nakano et al. |
| 2007/0047051 A1 | 3/2007 | Selbrede et al. |
| 2007/0047887 A1 | 3/2007 | Selbrede |
| 2007/0052636 A1 | 3/2007 | Kalt et al. |
| 2007/0052660 A1 | 3/2007 | Montbach et al. |
| 2007/0053652 A1 | 3/2007 | Mignard et al. |
| 2007/0086078 A1 | 4/2007 | Hagood et al. |
| 2007/0091011 A1 | 4/2007 | Selbrede |
| 2007/0103209 A1 | 5/2007 | Lee |
| 2007/0132680 A1 | 6/2007 | Kagawa et al. |
| 2007/0150813 A1 | 6/2007 | Selebrede et al. |
| 2007/0172171 A1 | 7/2007 | Van Ostrand et al. |
| 2007/0190265 A1 | 8/2007 | Aoki et al. |
| 2007/0205969 A1 | 9/2007 | Hagood et al. |
| 2007/0217108 A1 | 9/2007 | Ozawa et al. |
| 2007/0247401 A1 | 10/2007 | Sasagawa et al. |
| 2007/0297747 A1 | 12/2007 | Biernath et al. |
| 2008/0014557 A1 | 1/2008 | Kuhn et al. |
| 2008/0026066 A1 | 1/2008 | Roser |
| 2008/0037104 A1 | 2/2008 | Hagood et al. |
| 2008/0043726 A1 | 2/2008 | Herrero-Veron et al. |
| 2008/0094853 A1 | 4/2008 | Kim et al. |
| 2008/0129681 A1 | 6/2008 | Hagood et al. |
| 2008/0158635 A1 | 7/2008 | Hagood et al. |
| 2008/0165122 A1 | 7/2008 | Duthaler et al. |
| 2008/0174532 A1 | 7/2008 | Lewis |
| 2008/0279727 A1 | 11/2008 | Haushalter |
| 2008/0283175 A1 | 11/2008 | Hagood et al. |
| 2008/0297880 A1 | 12/2008 | Steckl et al. |
| 2009/0091561 A1 | 4/2009 | Koyama |
| 2009/0103281 A1 | 4/2009 | Koh |
| 2009/0141335 A1 | 6/2009 | Feenstra et al. |
| 2009/0195855 A1 | 8/2009 | Steyn et al. |
| 2009/0284824 A1 | 11/2009 | Feenstra et al. |
| 2010/0110518 A1 | 5/2010 | Wu et al. |
| 2010/0328608 A1 | 12/2010 | Fujii et al. |
| 2011/0122474 A1 | 5/2011 | Payne et al. |

(56) References Cited

U.S. PATENT DOCUMENTS

| | | |
|---|---|---|
| 2011/0148948 A1 | 6/2011 | Gandhi et al. |
| 2011/0164067 A1 | 7/2011 | Lewis et al. |
| 2011/0205259 A1 | 8/2011 | Hagood, IV |
| 2011/0255146 A1 | 10/2011 | Brosnihan et al. |
| 2011/0267668 A1 | 11/2011 | Hagood, IV et al. |
| 2012/0133006 A1 | 5/2012 | Hasselbach et al. |
| 2012/0169795 A1 | 7/2012 | Hagood et al. |
| 2012/0200906 A1 | 8/2012 | Wu et al. |
| 2012/0229226 A1 | 9/2012 | Oja et al. |
| 2012/0280971 A1 | 11/2012 | Hagood et al. |
| 2012/0320112 A1 | 12/2012 | Hagood, IV et al. |
| 2012/0320113 A1 | 12/2012 | Hagood, IV et al. |
| 2013/0010341 A1 | 1/2013 | Hagood et al. |
| 2013/0010342 A1 | 1/2013 | Hagood, IV et al. |
| 2013/0010344 A1 | 1/2013 | Hagood et al. |
| 2013/0335806 A1 | 12/2013 | Steyn et al. |
| 2013/0342522 A1 | 12/2013 | Hagood |
| 2014/0078154 A1 | 3/2014 | Payne et al. |
| 2014/0085698 A1 | 3/2014 | Wu et al. |
| 2014/0145926 A1 | 5/2014 | Wu et al. |
| 2014/0184573 A1 | 7/2014 | Nemchuk et al. |
| 2014/0184621 A1 | 7/2014 | Brosnihan et al. |
| 2014/0267196 A1 | 9/2014 | Villarreal et al. |
| 2014/0267331 A1 | 9/2014 | Villarreal et al. |
| 2014/0268293 A1 | 9/2014 | Chleirigh et al. |

FOREIGN PATENT DOCUMENTS

| | | |
|---|---|---|
| CN | 1206218 A | 1/1999 |
| CN | 1309782 A | 8/2001 |
| CN | 1390045 A | 1/2003 |
| CN | 1402033 A | 3/2003 |
| CN | 1476664 A | 2/2004 |
| CN | 1491030 A | 4/2004 |
| CN | 1498408 A | 5/2004 |
| CN | 1541483 A | 10/2004 |
| CN | 1542499 A | 11/2004 |
| CN | 1555472 A | 12/2004 |
| CN | 1573525 A | 2/2005 |
| CN | 1584731 A | 2/2005 |
| CN | 1599522 A | 3/2005 |
| CN | 1623111 A | 6/2005 |
| CN | 1898969 A | 1/2007 |
| DE | 10332647 A1 | 2/2005 |
| EP | 0366847 A2 | 5/1990 |
| EP | 0438614 A1 | 7/1991 |
| EP | 0359450 B1 | 11/1994 |
| EP | 0495273 B1 | 9/1996 |
| EP | 0415625 B1 | 1/1997 |
| EP | 0757958 A1 | 2/1997 |
| EP | 0786679 A2 | 7/1997 |
| EP | 0884525 A2 | 12/1998 |
| EP | 0889458 A2 | 1/1999 |
| EP | 0751340 B1 | 5/2000 |
| EP | 1022598 A2 | 7/2000 |
| EP | 1091342 A2 | 4/2001 |
| EP | 1091343 A2 | 4/2001 |
| Ep | 1091842 A1 | 4/2001 |
| EP | 1093142 A2 | 4/2001 |
| EP | 1168051 A1 | 1/2002 |
| EP | 1202096 A2 | 5/2002 |
| EP | 1202244 A1 | 5/2002 |
| EP | 1426190 A1 | 6/2004 |
| EP | 1429310 A2 | 6/2004 |
| EP | 1471495 A2 | 10/2004 |
| EP | 1522883 A1 | 4/2005 |
| EP | 1533853 A2 | 5/2005 |
| EP | 1551002 A2 | 7/2005 |
| EP | 1674893 A1 | 6/2006 |
| EP | 1734502 A1 | 12/2006 |
| EP | 1757958 A1 | 2/2007 |
| EP | 2263968 | 12/2010 |
| EP | 1858796 | 1/2011 |
| EP | 2287110 | 2/2011 |
| EP | 1640770 | 4/2012 |
| EP | 2459777 A1 | 6/2012 |
| FR | 2726135 A1 | 4/1996 |
| GB | 2071896 A | 9/1981 |
| GB | 2343980 A | 5/2000 |
| JP | S56137386 A | 10/1981 |
| JP | 57062028 A | 4/1982 |
| JP | S5774730 A | 5/1982 |
| JP | 57127264 U | 8/1982 |
| JP | S5933077 U | 2/1984 |
| JP | S62275230 A | 11/1987 |
| JP | 3142409 | 6/1991 |
| JP | 4249203 A | 9/1992 |
| JP | 5045648 A | 2/1993 |
| JP | H06174929 A | 6/1994 |
| JP | 6194649 A | 7/1994 |
| JP | H06202009 A | 7/1994 |
| JP | H06222290 A | 8/1994 |
| JP | H06250593 A | 9/1994 |
| JP | H0836161 A | 2/1996 |
| JP | H0895526 A | 4/1996 |
| JP | 8234158 A | 9/1996 |
| JP | 8334752 A | 12/1996 |
| JP | H08334752 A | 12/1996 |
| JP | 9080386 A | 3/1997 |
| JP | 09189869 A | 7/1997 |
| JP | 9198906 A | 7/1997 |
| JP | H09218360 A | 8/1997 |
| JP | H09292576 A | 11/1997 |
| JP | H1054916 A | 2/1998 |
| JP | H1054947 A | 2/1998 |
| JP | 10282474 A | 10/1998 |
| JP | H10282521 A | 10/1998 |
| JP | H10333145 A | 12/1998 |
| JP | 11015393 A | 1/1999 |
| JP | 11024038 A | 1/1999 |
| JP | H1184419 A | 3/1999 |
| JP | H1195693 A | 4/1999 |
| JP | H11126118 A | 5/1999 |
| JP | H11202325 A | 7/1999 |
| JP | 2000028933 A | 1/2000 |
| JP | 2000028938 | 1/2000 |
| JP | 2000057832 A | 2/2000 |
| JP | 2000105547 A | 4/2000 |
| JP | 2000111813 A | 4/2000 |
| JP | 2000121970 | 4/2000 |
| JP | 2000131627 A | 5/2000 |
| JP | 2000172219 A | 6/2000 |
| JP | 2000214393 A | 8/2000 |
| JP | 2000214394 A | 8/2000 |
| JP | 2000214395 A | 8/2000 |
| JP | 2000214397 A | 8/2000 |
| JP | 2000214831 A | 8/2000 |
| JP | 2000235152 A | 8/2000 |
| JP | 2000259116 A | 9/2000 |
| JP | 2000321566 A | 11/2000 |
| JP | 2001067010 A | 3/2001 |
| JP | 2001075534 A | 3/2001 |
| JP | 2001100121 A | 4/2001 |
| JP | 2001125014 A | 5/2001 |
| JP | 2001154642 A | 6/2001 |
| JP | 2001175216 A | 6/2001 |
| JP | 2001201698 A | 7/2001 |
| JP | 2001201767 A | 7/2001 |
| JP | 2001242826 A | 9/2001 |
| JP | 2001281563 A | 10/2001 |
| JP | 2001318377 A | 11/2001 |
| JP | 2001331142 A | 11/2001 |
| JP | 2001331144 A | 11/2001 |
| JP | 2001337649 A | 12/2001 |
| JP | 2001356281 A | 12/2001 |
| JP | 2001356327 A | 12/2001 |
| JP | 2002040336 A | 2/2002 |
| JP | 2002040337 A | 2/2002 |
| JP | 2002139683 A | 5/2002 |
| JP | 2002140038 A | 5/2002 |
| JP | 2002214543 A | 7/2002 |
| JP | 2002279812 A | 9/2002 |
| JP | 2002528763 A | 9/2002 |

(56) References Cited

FOREIGN PATENT DOCUMENTS

| | | |
|---|---|---|
| JP | 2002287718 A | 10/2002 |
| JP | 2002297085 A | 10/2002 |
| JP | 2002318564 A | 10/2002 |
| JP | 2002333619 A | 11/2002 |
| JP | 2002341343 A | 11/2002 |
| JP | 2002351431 A | 12/2002 |
| JP | 2002365650 A | 12/2002 |
| JP | 2003029295 A | 1/2003 |
| JP | 2003036057 A | 2/2003 |
| JP | 2003506755 A | 2/2003 |
| JP | 2003084314 A | 3/2003 |
| JP | 2003086233 A | 3/2003 |
| JP | 2003098984 A | 4/2003 |
| JP | 2003121824 A | 4/2003 |
| JP | 2003162904 A | 6/2003 |
| JP | 2003202519 A | 7/2003 |
| JP | 2003248463 A | 9/2003 |
| JP | 2003344785 A | 12/2003 |
| JP | 2004004216 A | 1/2004 |
| JP | 2004053839 A | 2/2004 |
| JP | 2004069788 A | 3/2004 |
| JP | 2004117833 A | 4/2004 |
| JP | 2004140800 A | 5/2004 |
| JP | 2004151722 A | 5/2004 |
| JP | 2004163915 A | 6/2004 |
| JP | 2004191736 A | 7/2004 |
| JP | 2004205973 A | 7/2004 |
| JP | 2004212673 A | 7/2004 |
| JP | 2004221051 A | 8/2004 |
| JP | 2004287215 A | 10/2004 |
| JP | 2004287431 A | 10/2004 |
| JP | 2004302270 A | 10/2004 |
| JP | 2004317557 A | 11/2004 |
| JP | 2004317785 A | 11/2004 |
| JP | 2004325909 A | 11/2004 |
| JP | 2004327025 A | 11/2004 |
| JP | 2004534280 A | 11/2004 |
| JP | 2004347982 A | 12/2004 |
| JP | 2005010786 A | 1/2005 |
| JP | 2005043674 A | 2/2005 |
| JP | 2005043726 A | 2/2005 |
| JP | 2005504355 A | 2/2005 |
| JP | 2005512119 A | 4/2005 |
| JP | 2005134896 A | 5/2005 |
| JP | 2005309416 A | 11/2005 |
| JP | 2006098990 A | 4/2006 |
| JP | 2006522360 A | 9/2006 |
| JP | 2007155983 A | 6/2007 |
| JP | 2007517488 A | 6/2007 |
| JP | 2008015081 A | 1/2008 |
| JP | 2008098984 A | 4/2008 |
| JP | 2008233898 A | 10/2008 |
| JP | 2009111813 A | 5/2009 |
| JP | 2010517052 A | 5/2010 |
| JP | 2012128451 A | 7/2012 |
| JP | 2012186782 A | 9/2012 |
| JP | 2012230079 A | 11/2012 |
| JP | 2013061658 A | 4/2013 |
| WO | 9401716 A1 | 1/1994 |
| WO | 9528035 A1 | 10/1995 |
| WO | 9704436 A1 | 2/1997 |
| WO | 9804950 A1 | 2/1998 |
| WO | WO-9819201 A1 | 5/1998 |
| WO | 9901696 A1 | 1/1999 |
| WO | 0017695 A1 | 3/2000 |
| WO | 0050807 A1 | 8/2000 |
| WO | 0052674 A1 | 9/2000 |
| WO | 0055916 A1 | 9/2000 |
| WO | 0169584 A1 | 9/2001 |
| WO | 0189986 A1 | 11/2001 |
| WO | 0207482 A2 | 1/2002 |
| WO | 03004836 A1 | 1/2003 |
| WO | 03007049 | 1/2003 |
| WO | 03008860 A1 | 1/2003 |
| WO | WO-03029874 A2 | 4/2003 |
| WO | 03040802 A2 | 5/2003 |
| WO | 03048836 A2 | 6/2003 |
| WO | 03050448 A1 | 6/2003 |
| WO | 03061007 A1 | 7/2003 |
| WO | 03061329 A2 | 7/2003 |
| WO | 03069593 A2 | 8/2003 |
| WO | 03081315 A1 | 10/2003 |
| WO | WO-03105198 A1 | 12/2003 |
| WO | 2004008629 A1 | 1/2004 |
| WO | 2004019120 A1 | 3/2004 |
| WO | 2004034136 A1 | 4/2004 |
| WO | WO-2004038496 A1 | 5/2004 |
| WO | 2004086098 A2 | 10/2004 |
| WO | 2004088629 A1 | 10/2004 |
| WO | 2004097506 A2 | 11/2004 |
| WO | 2005001892 A2 | 1/2005 |
| WO | 2005015287 A1 | 2/2005 |
| WO | 2005062908 A2 | 7/2005 |
| WO | 2005073950 | 8/2005 |
| WO | 2005082908 A1 | 9/2005 |
| WO | 2006017129 A2 | 2/2006 |
| WO | 2006023077 A2 | 3/2006 |
| WO | 2006039315 A2 | 4/2006 |
| WO | 2006052755 A2 | 5/2006 |
| WO | 2006091791 | 8/2006 |
| WO | WO-2006091860 A2 | 8/2006 |
| WO | WO-2006091904 | 8/2006 |
| WO | 2007123173 A1 | 11/2007 |
| WO | 2007145973 | 12/2007 |
| WO | 2008026066 A1 | 3/2008 |
| WO | WO-2008091339 A2 | 7/2008 |
| WO | 2008092859 A1 | 8/2008 |
| WO | WO-2009102471 A1 | 8/2009 |
| WO | 2010062647 A2 | 6/2010 |
| WO | WO-2013032865 A1 | 3/2013 |

OTHER PUBLICATIONS

Alt P.M., et al., "A Gray-Scale Addressing Technique for Thin-Film-Transistor/Liquid Crystal Displays," IBM J. Res. Develop., 36 (1), Jan. 1992, pp. 11-22.

AZ Displays, Inc., "Complete LCD Solutions," ATM3224C-NC-FTH, pp. 1-15 (Oct. 2, 2003).

Bergquist et al., "Field Sequential Colour Display with Adaptive Gamut", Society for Information Display, Digest of Technical Papers, 2006, pp. 1594-1597.

Birch et al, "31.1: SXGA Resolution FLC Microdisplays," SID 02 Digest, 954-957 (2002).

B.J. Feenstra et. al. "A Reflective Display Based on Electrowetting: Principle and Properties", International Display Research Conference Proceedings 2003, p. 322.

Blackstone, "Making MEMS Reliable," SPIE's OEMagazine, 32-34 (Sep. 2002).

"BLU," Heesung Precision Ltd., http://www.hspr.co.kr/eng/product/blu.asp Retrieved on Aug. 3, 2006.

Den Boer W.D., "Active Matrix Liquid Crystal Displays", Elsevier Science & Technology Books, ISBN #0750678135, Aug. 2005.

Boeuf, J.P., "Plasma display panels: physics, recent deveopments and key issues," J. Phys. D: Appl. Phys. 36 (2003) R53-R79 (received Aug. 29, 2002: published Feb. 26, 2003).

Boucinha M., et al., "Air-gap amorphous silicon thin film transistors", Applied Physics Letters, AIP, American Institute of Physics, Melville, NY, US, vol. 73, No. 4, Jul. 27, 1998, pp. 502-504, XP012021821, ISSN: 0003-6951, DOI: 10.1063/1.121914.

Bozler et al, "Arrays of gated field-emitter cones having 0.32 mm tip-to-tip spacing," J. Vec. Sci. Technol. B, 12 (2): 629-632 (Mar./Apr. 1994).

Bryan-Brown, "Ultra Low Power Bistable LCDs," SID 00, 76-79 (2000).

Chino E. et al., "25.1: Invited Paper: Development of Wide-Color-Gamut Mobile Displays with Four-primary-color LCDs," Society for Information Display, 37 (2), 2006, pp. 1221-1224.

Clark N. A., et al., "FLC Microdisplays", Ferroelectrics, 246, 2000, pp. 97-110.

Conde, J.P., et. al., "Amorphous and microcrystalline silicon deposited by hot-wire chemical vapor deposition at low substrate tempera-

(56) References Cited

OTHER PUBLICATIONS tures: application to devices and thin-film microelectromechanical systems," Thin Solid Films 395: 105-111 (2001).
Conde, J.P., et al., "Low-temperature Thin-film Silicon MEMS", in Thin Solid Films 427, p. 181 (2003).
Davis, "Light Emitting Diode Source Modeling for Optical Design," Reflexite Display Optics (Oct. 2004).
Davis, "Microstructured Optics for LED Applications," Reflexite Display Optics (2002).
Doane, et al, "Display Technologies in Russia, Ukraine, and Belarus," World Technology Evaluation Center Panel Report (Dec. 1994) http://www.wtec.org/loyola/displays/toc.htm, retrieved on Nov. 22, 2005.
Doherty D. et al., "Pulse Width Modulation Control of DLP Projectors", TI Technical Journal, Jul.-Sep. 1998, No. 3, pp. 115-121.
"Electronic Display Lighting Tutorials," 3M Corporation,file//D:/Optical/Vikuiti Tutorial.htm. retrieved on Aug. 10, 2006.
Extended European Search Report dated Sep. 19, 2012 in European Patent Application No. EP11178527.5.
Extended European Search Report dated Sep. 19, 2012 in European Patent Application No. EP1178533.3.
Feenstra J. et al., "Electrowetting Displays", Liquavista BV, http://www.liquavista.com/documents/electrowetting_displays_whitepaper.pdf, Retrieved on Aug. 17, 2006, pp. 1-16.
Feng, et al, "Novel Integrated Light-Guide Plates for Liquid Crystal Display Backlight," Journal of optics a Pure and applied optics, 2005, 7, 111-117.
Feng, "High Quality Light Guide Plates that Can Control the Illumination Angle Based on Microprism Structures," Applied Physics Letters, 85 (24): 6016-6018 (Dec. 2004).
Final Office Action dated May 18, 2007, U.S. Appl. No. 11/218,690.
Final Office Action dated Oct. 3, 2007 in U.S. Appl. No. 11/218,690.
Final Office Action dated Sep. 21, 2007, U.S. Appl. No. 11/546,937.
Flat Panel Display (FPD) Manufacturing Equipment that Cuts Production Costs by Half, Shibaura Mechatronics Corporation, product brochure for panel processing.
Foley, "NE04-21: Microstructured Plastic Optics for Display, Lighting, and Telecommunications Applications," Fresnel Optics (2001).
Funamoto et al, "Diffusive-sheetless Backlight System for Mobile Phone," IDW/AD, 1277-1280 (2005).
Funamoto et. al. "LED Backlight System with Double-Prism Pattern", Journal of the Society for Information Display v. 14, pp. 1045-1051 (2006).
Goddhue et al, "Bright-field analysis of field-emission cones using high-resolution tranmission electron microscopy and the effect of structural properties on current stability," J. Vac. Sci. Technol. B, 12 (2): 693-696 (Mar.Apr. 1994).
Hartman, "4.1: Invited paper: Two-Terminal Devices Technologies for AMLCDs," SID 95 Digest, 7-10 (1995).
Hewlett et al, "DLP CinemaTM projection: A hybrid frame-rate technique for flicker-free performance," Journ of the SID 9/3, 221-226 (2001).
Hornbeck J. "Digital Light Processing TM: A New MEMS-Based Display Technology," Technical Digest of the IEEJ 14th Sensor Symposium, Jun. 4-5, 1996, pp. 297-304.
J. Heikenfeld et. al., "Contrast Enhancement in Black Dielectric Electroluminescent Devices", IEEE Transactions on Electron Devices, 49: 8, 1348-52 (2002).
Jepsen et al, "4.11: 0.9" SXGA Liquid Crystal on Silicon Panel with 450 Hz. Field Rate," SID MicroDisplay Corporation, pp. 106-109 (Sep. 2001).
Joaquirn, M., "Polyphenyl Ether Lubricants" Synthetic Lubricants and High-performance Functional Fluids, R. L. Rudnick and R. L. Shubkin, Eds., p. 239, Marcel Dekker, Inc., NY, 1999.
Johnstone et al, "Theoretical limits on the freestanding length of cantilevers produced by surface micromachining technology," J. Micromech. Microeng. 12: 855-861 (Published Oct. 3, 2002).
Jones et al, "29-1: Addressing TVmin Ferroelectric Liquid Crystal Displays," (1998).

Judy, et al, "Self-Adjusting Microstructures(SAMS)," Proceedings of the Workshop on Micro Electro Mechanical Systems, New York, Jan. 30, 1991, vol. Workshop 4, pp. 51-56.
Judy, M. W., "Micromechanisms Using Sidewall Beams," Dissertation, University of California at Berkeley, 1994.
Kalantar et al, "Optical Micro Deflector Based Functional Light-Guide Plate for Backlight Unit," SID 00 Digest, 1029-1031 (2000).
Kalantar, K., et al., "Backlight Unit with Double Surface Light Emission Using a Single Micro-structured Light-guide Plate," p. 1182, Society for Information Display Digest (2004).
Kalantar, "Modulation of viewing angle on an LCD surface through backlight optics," Journal of the SID, 11 (4): 647-652 (2003).
Kim, C.W., et al., "Manufacturing Technologies for the Next Generation a-Si TFT-LCD," Proceedings of the Intl. Display Mfg. Cnf. Seoul, Korea (2000).
Koden et al., "Ferroelectric Liquid Crystal Display," (Sep. 17, 1997).
Kuang et al., "Dynamic characteristics of shaped micro-actuators solved using the differential quadrature method," Journal of Micromechanics and Microengineering, 14: 647-655, (2004).
Kunzman A. et al., "10.3 White Enhancement for Color Sequential DLP", Society for Information Display, Digest of Technical Papers, 1998.
Lee, et al., "40.1: Distingusihed Contributed Paper: Integrated Amorphous Silicon Color Sensor on LCD Panel for LED Backlight Feedback Control System", Society for Information Display, Digest of Technical Papers, 2005, pp. 1376-1379.
Lee et al, "P-25: A LCOS Microdisplay Driver with Frame Buffering Pixels," SID 02 Digest, 292-295 (2002).
Legtenberg, et al., "Electrostatic Curved Electrode Actuators," Journal of Microelectromechanical Systems, 6 (3): 257-265 (Sep. 1997).
Li, J., et al., "DRIE-Fabricated Curved-Electrode Zipping Actuators with Low Pull-In Voltage," 12th International Conference on Solid State Sensors, Actuators and Microsystems, IEE, 480-483 (2003).
Liang et al, "Observation of electric field gradients near field-emission cathode arrays," Appl Phys. Lett., 66 (9): 1147-1149 (Feb. 27, 1995).
Liu et al, "Scaling Laws of Microactuators and Potential Applications of Electroactive Polymers in MEMS," SPIE, 3669: 345-354 (Mar. 1999).
"Low Temperature Polysilicon TFT Reflective Color LCD" by Techno World.
Maboudian et al., "Stiction reduction processes for surface micromachines," Tribology Letters, 3: 215-221 (1997).
Markandey V. et al., "Video Processing for DLP Display Systems," Texas Instruments Corporation, Mar. 13, 1996, pp. 21-32.
Mastrangelo et al, "Mechanical Stability and Adhesion of Microstructures Under Capillary Forces—Part I: Basic Theory," Journal of Microelectromechanical Systems, 2 (1): 33-43 (Mar. 1993).
Mastrangelo et al, "Mechanical Stability and Adhesion of Microstructures Under Capillary Forces—Part II: Experiments," Journal of Microelectromechanical Systems, 2 (1): 44-55 (Mar. 1993).
McLaughlin, "Progress in Projection and Large-Area Displays," Proceedings of the IEEE, 90 (4): 521-532 (Apr. 2002).
"Microprism Technology for Luminaires," Reflexite Display Optics, Reflexite Corporation, Technical Publication RLO-181, Rev. 2 (2004).
"Nano SU-8 2000 Negative Tone Photoresist Formulations 2002-2025," Micro Chem, Product Brochesure for Thick Polymer, Rev. 2/02.
Non Final Office Action Dated Mar. 22, 2007, U.S. Appl. No. 11/546,937.
Non Final Office Action dated Nov. 1, 2006, U.S. Appl. No. 11/218,690.
Notice of Allowance dated Jan. 31, 2008 in U.S. Appl. No. 11/361,785.
Office Action dated Dec. 5, 2011 in Japanese Patent Application No. 2008-058190.
Office Action dated Jul. 15, 2010 in Japanese Patent Application No. 2007-556428.
Office Action dated Oct. 14, 2010 in Japanese Patent Application No. 2008-058190.

(56) References Cited

OTHER PUBLICATIONS

Okumura et al, "Highly-efficient backlight for liquid crystal display having no optical films," Applied Physics Letters, 83 (13): 2515-2517 (Sep. 29, 2003).

"Optical Design Tools for Backlight Displays," Light Tools, Optical Engineering, Optical Research Associates, Publication of ROCOES, 81:90-101 (Jun. 3).

Park, Y.I., et al., "Active Matrix OLED Displays Using Simple Poly-Si TFT Process," Society of Information Display, Digest, pp. 487-489 (2003).

Pasricha S. et al., "Dynamic Backlight Adaptation for Low Power Handheld Devices" IEEE Design and Test v. 21, 2004, pp. 398.

Perregaux, G., et al, "Arrays of Addressable High-Speed Optical Microshutters," CSEM Swiss Center for Electronics and Microtechnology Inc., Microsystems Division, pp. 232-235 (2001).

"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378DOHGJgl/theme_us_vikuiti_3_0/command_AbcPageHandler/ output_html Retrieved on Aug. 3, 2006.

"Prism Sheet," Mitsubishi Rayon America Inc., http://www.mrany.com/data/HTML/29.htm Retrieved on Aug. 4, 2006.

Qiu et al, "A Curved-Beam Bistable Mechanism," Journal of Microelectromechanical Systems, 13 (2): 137-145 (Apr. 2004).

Qiu et al, "A High-Current Electrothermal Bistable MEMS Relay," Micro Electro Mechanical Systems, MEMS-03 Kyoto, pp. 64-67 (Jan. 19-23, 2003).

Ravnkilde J. et al. "Fabrication of Nickel Microshutter Arrays for Spatial Light Modulation", Mesomechanics, 2002, pp. 161-165. Also on their web site: http://www2.mic.dtu.dk/research/mems/publications/Papers/Dicon_Meso2002.pdf.

Roosendaal et al, "25.2: A Wide Gamut, High Aperture Mobile Spectrum Sequential Liquid Crystal Display," SID 05 Digest, 1116-1119 (2005).

Saeedi, et. al. "Molten-Alloy Driven Self-Assembly for Nano and Micro Scale System Integration" Fluid Dynamics and Materials Processing, vol. 2, No. 4, pp. 221-245 (2006).

Sato, "Research on Flexible Display Systems," Broadcast Technology, 21: 10-15 (Winter, 2005).

Sharp Specification No. LCP-03015 for Mobile Liquid Crystal Display Group, Sharp Corporation, Jun. 13, 2003.

Shikida et al, "Fabrication of an S-shaped Microactuator," Journal of Microelectromechanical Systems, 6 (1): 18-24 (Mar. 1997).

Sony Corporation, "ACX705AKM, 6.92cm Diagonal Reflective Color LCD Module".

Steyn, Lodewyck, "Electroquasistatic Zipper Actuators: A Technology Review", Dec. 2004.

Tagaya et al., "Thin Liquid-Crystal Display Backlight System with Highly Scattering Optical Transmission Polymers," Applied Optics, 40 (34): 6274-6280 (Dec. 2001).

Takatori, et al., "6.3: Field-Sequential Smectic LCD with TFT Pixel Amplifier," SID 01, 2001, Digest, pp. 48-51.

Tan et al "Soldering Technology for Optoelectronics Packaging", 1996 Electronic Components and Technology Conference, pp. 26-36 (1996).

Teijido, J.M., "Conception and Design of Illumination Light Pipes," Thesis No. 1498 for University of Neuchatel, http://www.unige.ch/cyberdocuments/unine/theses2000/TeijidoJM/these_front.htm 1: 1-99 Retrieved on Aug. 3, 2006.

Tien et al, "MEMS Actuators for Silicon Micro-Optical Elements," Proc. of SPIE, 4178: 256-269, (2000).

"Two Proprietary Technologies Supporting OMRON Backlight," OMRON Electronics Corporation, OMRON Electronics Components Web, www.omron.co.jp/ecb/products/bklight/english/genri/index.html, retrieved on Aug. 3, 2006.

Underwood, "A review of microdisplay technologies," SID © EID, (Nov. 21 to 23, 2000).

Underwood, "LCoS through the looking glass," SID (2001).

van de Biggelaar, et. al. "Passive and Active Matrix Addressed Polymer Light-emitting Diode Displays", Proc. SPIE vol. 4295, p. 134 (2001).

Vangbo et al, "A lateral symmetrically bistable buckled beam," J. Micromech. Microeng., 8: 29-32 (1998).

Wang et al., "A highly efficient system for automatic face region detection in MPEG video." IEEE Trans. on Circuits and Systems for Video Technology, vol. 7 Issue 4, Aug. 1997, pp. 615-628.

Wang K. et al., "Highly Space-Efficient Electrostatic Zigzag Transmissive Micro-Optic Switches for an Integrated MEMS Optical Display System", Transducers 03 Conference, Jun. 8-12, 2003, vol. 1, pp. 575-575.

Yamada et al, "52.2: Invited Paper: Color Sequential LCD Based on OCB with an LED Backlight," SID 00 Digest, 1180-1183 (2000).

Yasumura et al, "Fluid Damping of an Electrostatic Actuator for Optical Switching Applications," Transducers Research Foundation (2002).

Boer W.D., "AMLCD Electronics", Active Matrix Liquid Crystal Displays: Fundamentals and Applications, 2005 pp. 87-111, XP055089329, U.S.A, ISBN: 978-0-75-067813-1.

Boer W.D., "Improvement of Image Quality in AMLCDs", Active Matrix Liquid Crystal Displays: Fundamentals and Applications, 2005, pp. 139-177, XP055089313, U.S.A, ISBN: 978-0-75-067813-1.

European Patent Office Examination Report dated Sep. 7, 2009 in European Patent Application No. 06847859.3.

International Search Report and Written Opinion—PCT/US2006/048679, International Search Authority—European Patent Office—Oct. 4, 2007.

"MicroLensTm—Re-Inventing LCD Backlighting," Global Lighting Technologies Inc., http://www.glthome.com/tech.htm, 1-2; retrieved on Aug. 3, 2006.

Partial European Search Report—EP11178527—Search Authority—Munich—Jan. 17, 2012.

Partial European Search Report—EP11178533—Search Authority—Munich—Jan. 30, 2012.

Co-pending U.S. Appl. No. 14/508,342, filed Oct. 7, 2014.

Uchida T. et al., "Encyclopedia of Flat Panel Displays", Japan, Kogyo Chosakai Publishing Co., Ltd./Yukio Shimura, Dec. 25, 2001, pp. 617 to 619.

\* cited by examiner

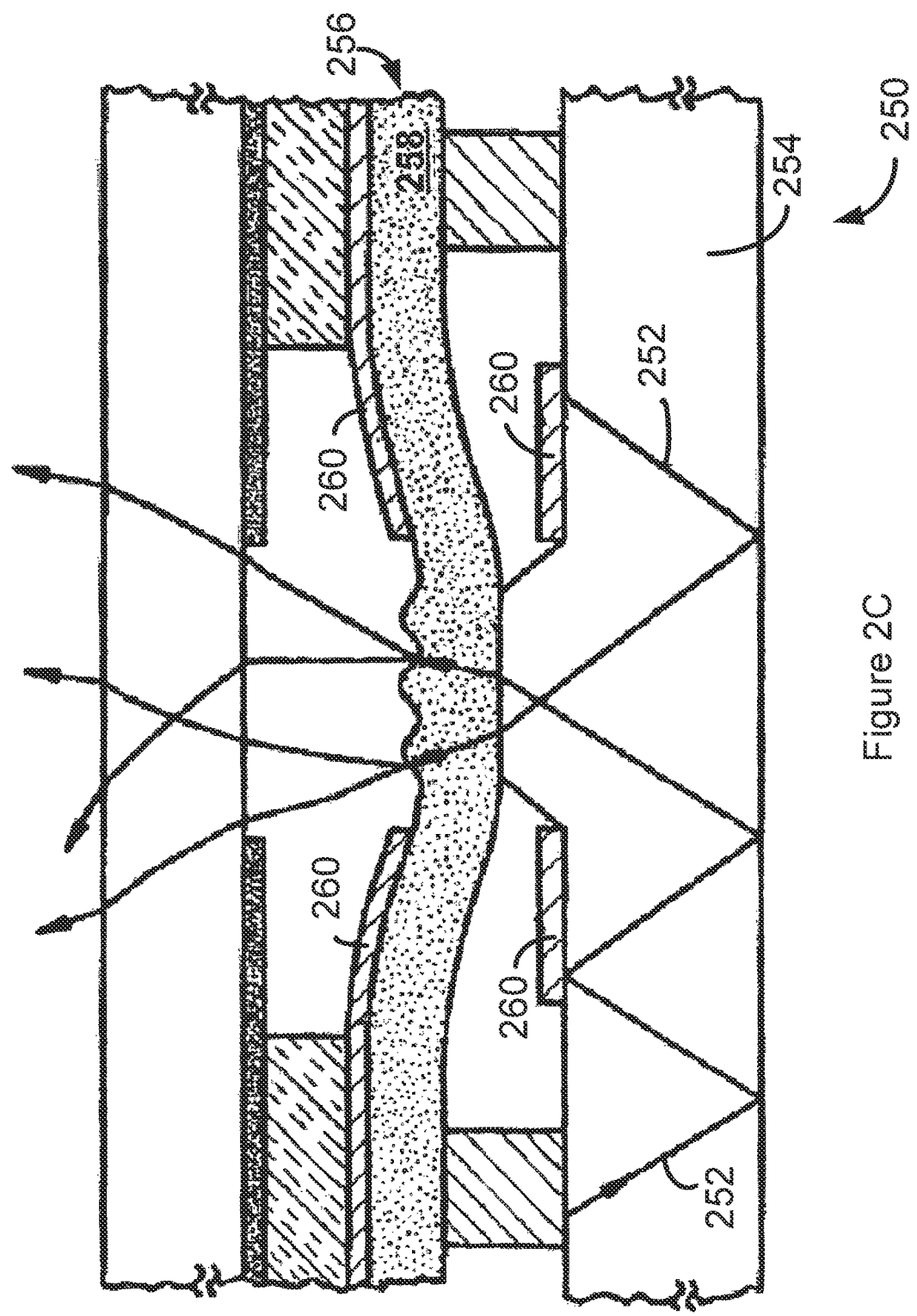

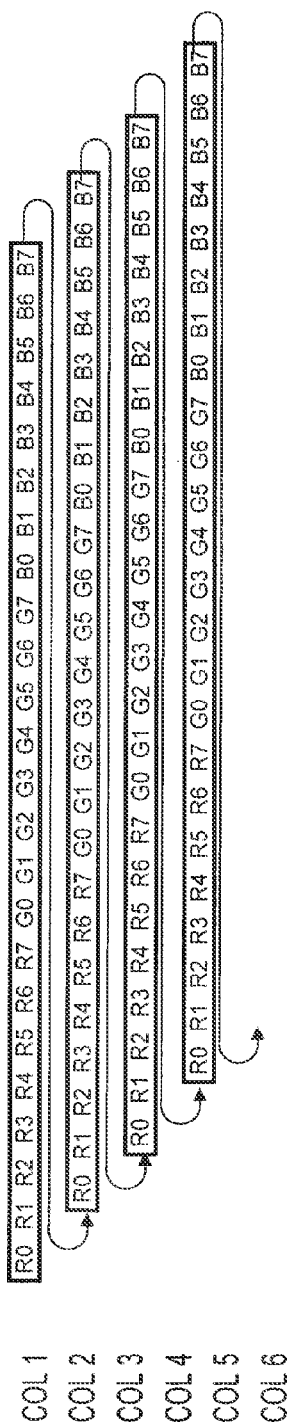
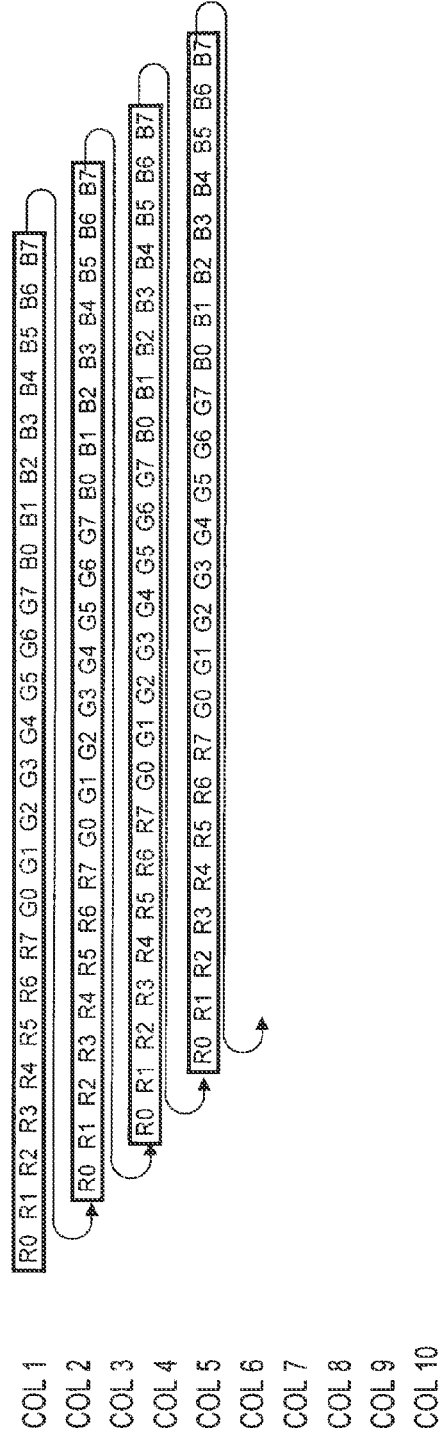
Figure 6A

BITPLANE R0　　　　　　　　　　　　　　　650

|  | COL 1 | COL 2 | COL 3 | COL 4 | COL 5 | COL 6 | COL 7 | COL 8 | COL 9 | COL 10 |
|---|---|---|---|---|---|---|---|---|---|---|
| ROW 1 | R0 | R0 | R0 | R0 | R0 | R0 | R0 | R0 | R0 | R0 |
| ROW 2 | R0 | R0 | R0 | R0 | R0 | R0 | R0 | R0 | R0 | R0 |
| ROW 3 | R0 | R0 | R0 | R0 | R0 | R0 | R0 | R0 | R0 | R0 |
| ROW 4 | R0 | R0 | R0 | R0 | R0 | R0 | R0 | R0 | R0 | R0 |
| ROW 5 | R0 | R0 | R0 | R0 | R0 | R0 | R0 | R0 | R0 | R0 |
| ROW 6 | R0 | R0 | R0 | R0 | R0 | R0 | R0 | R0 | R0 | R0 |
| ROW 7 | R0 | R0 | R0 | R0 | R0 | R0 | R0 | R0 | R0 | R0 |
| ROW 8 | R0 | R0 | R0 | R0 | R0 | R0 | R0 | R0 | R0 | R0 |
| ROW 9 | R0 | R0 | R0 | R0 | R0 | R0 | R0 | R0 | R0 | R0 |
| ROW 10 | R0 | R0 | R0 | R0 | R0 | R0 | R0 | R0 | R0 | R0 |
| ROW 11 | R0 | R0 | R0 | R0 | R0 | R0 | R0 | R0 | R0 | R0 |
| ROW 12 | R0 | R0 | R0 | R0 | R0 | R0 | R0 | R0 | R0 | R0 |
| ROW 13 | R0 | R0 | R0 | R0 | R0 | R0 | R0 | R0 | R0 | R0 |
| ROW 14 | R0 | R0 | R0 | R0 | R0 | R0 | R0 | R0 | R0 | R0 |
| ROW 15 | R0 | R0 | R0 | R0 | R0 | R0 | R0 | R0 | R0 | R0 |

BITPLANE R1　　　　　　　　　　　　　　　660

|  | COL 1 | COL 2 | COL 3 | COL 4 | COL 5 | COL 6 | COL 7 | COL 8 | COL 9 | COL 10 |
|---|---|---|---|---|---|---|---|---|---|---|
| ROW 1 | R1 | R1 | R1 | R1 | R1 | R1 | R1 | R1 | R1 | R1 |
| ROW 2 | R1 | R1 | R1 | R1 | R1 | R1 | R1 | R1 | R1 | R1 |
| ROW 3 | R1 | R1 | R1 | R1 | R1 | R1 | R1 | R1 | R1 | R1 |
| ROW 4 | R1 | R1 | R1 | R1 | R1 | R1 | R1 | R1 | R1 | R1 |
| ROW 5 | R1 | R1 | R1 | R1 | R1 | R1 | R1 | R1 | R1 | R1 |
| ROW 6 | R1 | R1 | R1 | R1 | R1 | R1 | R1 | R1 | R1 | R1 |
| ROW 7 | R1 | R1 | R1 | R1 | R1 | R1 | R1 | R1 | R1 | R1 |
| ROW 8 | R1 | R1 | R1 | R1 | R1 | R1 | R1 | R1 | R1 | R1 |
| ROW 9 | R1 | R1 | R1 | R1 | R1 | R1 | R1 | R1 | R1 | R1 |
| ROW 10 | R1 | R1 | R1 | R1 | R1 | R1 | R1 | R1 | R1 | R1 |
| ROW 11 | R1 | R1 | R1 | R1 | R1 | R1 | R1 | R1 | R1 | R1 |
| ROW 12 | R1 | R1 | R1 | R1 | R1 | R1 | R1 | R1 | R1 | R1 |
| ROW 13 | R1 | R1 | R1 | R1 | R1 | R1 | R1 | R1 | R1 | R1 |
| ROW 14 | R1 | R1 | R1 | R1 | R1 | R1 | R1 | R1 | R1 | R1 |
| ROW 15 | R1 | R1 | R1 | R1 | R1 | R1 | R1 | R1 | R1 | R1 |

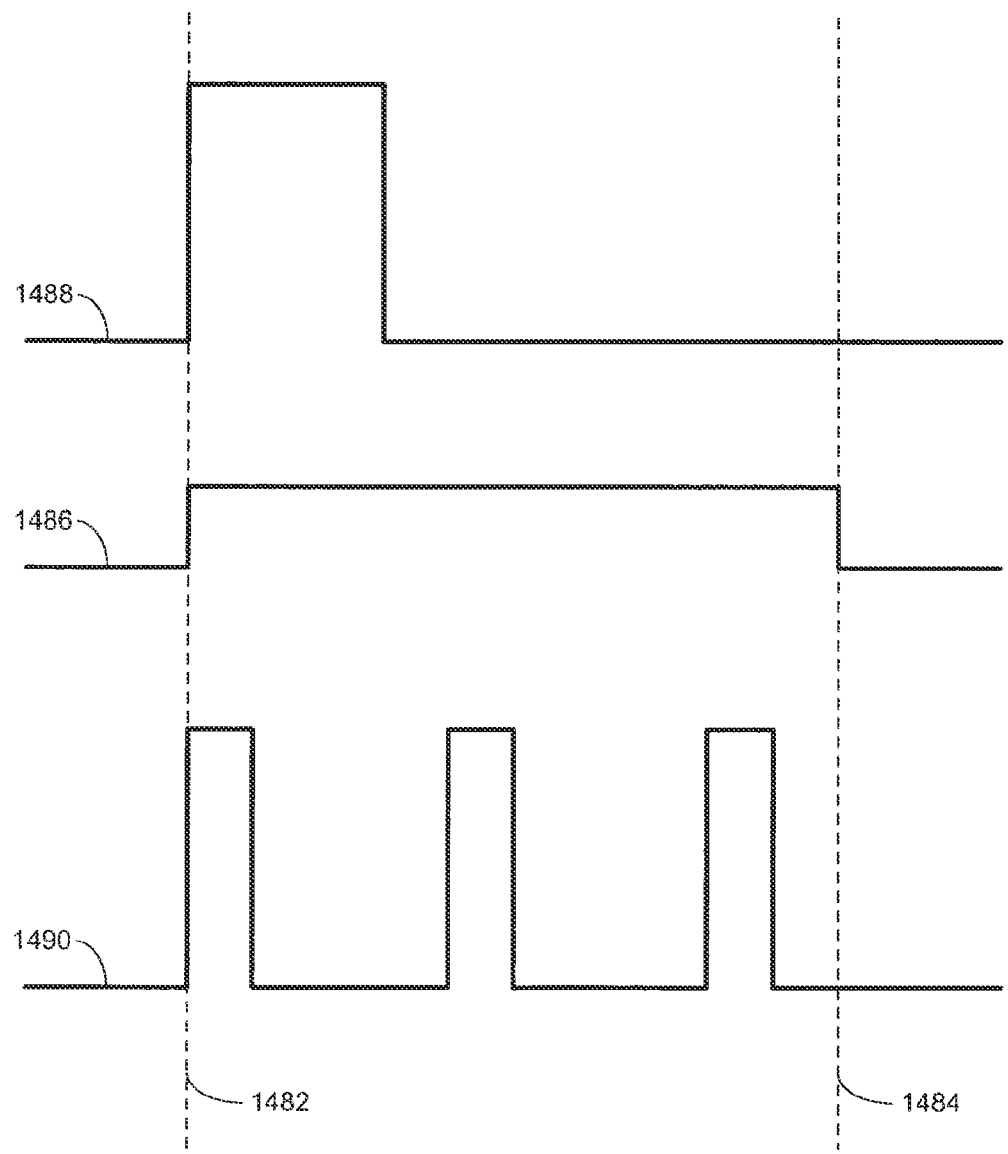

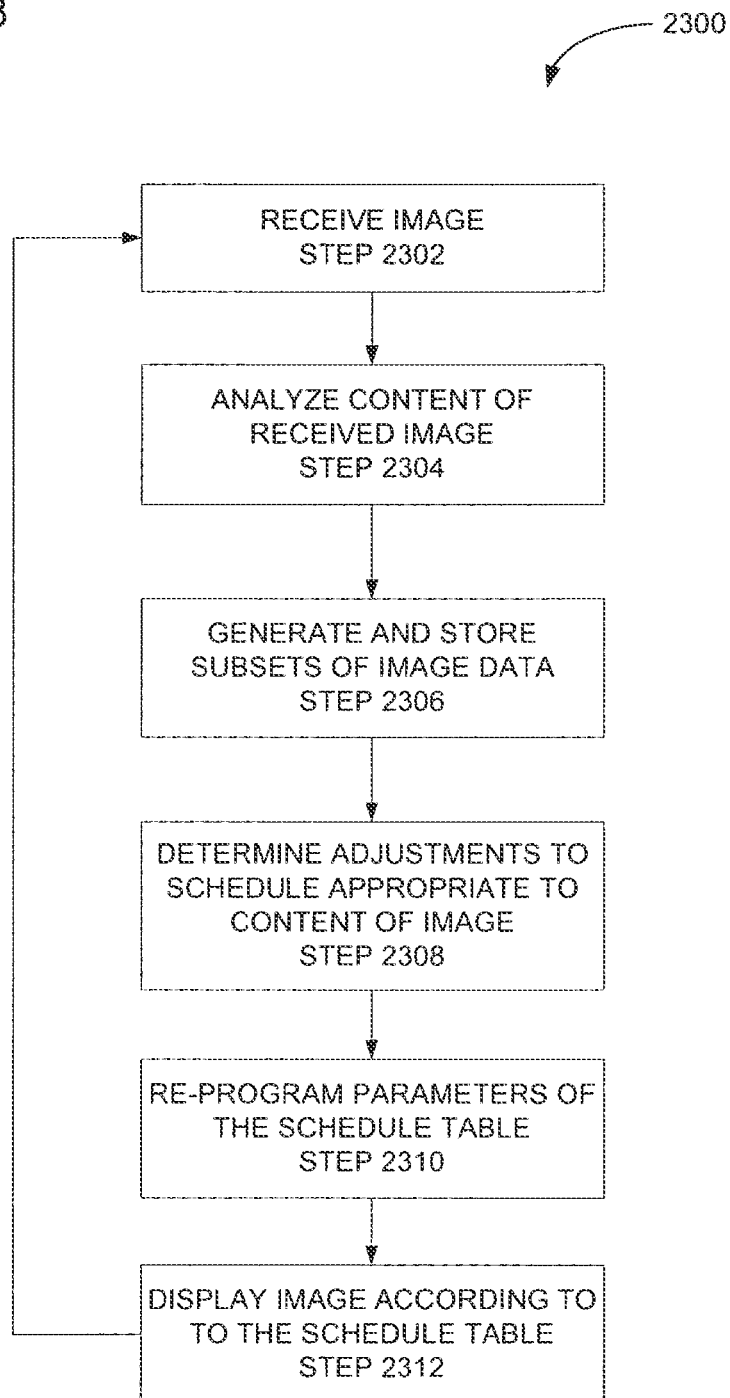

DIRECT-VIEW MEMS DISPLAY DEVICES AND METHODS FOR GENERATING IMAGES THEREON

CROSS-REFERENCE TO RELATED APPLICATIONS

This application is a continuation of U.S. patent application Ser. No. 11/643,042, filed Dec. 19, 2006, which claims priority to and the benefit of U.S. Patent Application No. 60/751,909, filed Dec. 19, 2005, and U.S. Patent Application No. 60/776,367, filed Feb. 24, 2006, and is also a continuation-in-part of U.S. patent application Ser. No. 11/361,294, filed Feb. 23, 2006, and which claims priority to and the benefit of U.S. Patent Application No. 60/676,053, filed Apr. 29, 2005, and U.S. Patent Application No. 60/655,827, filed Feb. 23, 2005. The disclosures of all of the foregoing are incorporated herein by reference in their entirety.

FIELD OF THE INVENTION

In general, the invention relates to the field of imaging displays, in particular, the invention relates to controller circuits and processes for controlling light modulators incorporated into imaging displays.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Direct-view displays using mechanical light modulators have not yet demonstrated sufficiently attractive combinations of brightness and low power.

In contrast to projection displays in which switching circuitry and light modulators can be built on relatively small die cut from silicon substrates, most direct-view displays require the fabrication of light modulators on much larger substrates. In addition, in many cases, particularly for backlit direct view displays, both the control circuitry and the light modulators are preferably formed on transparent substrates. As a result, many typical semiconductor manufacturing processes are inapplicable, and switching circuits often need to be re-designed accordingly. A need remains for MEMS direct-view displays that incorporate display processes in conjunction with switching circuitry that yield detailed images along with rich levels of grayscale and contrast.

SUMMARY

There is a need in the art for fast, bright, low-powered mechanically actuated direct-view displays. Specifically there is a need for direct-view displays built on transparent substrates that can be driven at high speeds and at low voltages for improved image quality and reduced power consumption.

In one aspect of the invention, a direct-view display includes an array of MEMS light modulators and a control matrix both formed on a transparent substrate, where each of the light modulators can be driven into at least two states. The control matrix transmits data and actuation voltages to the array and may include, for each light modulator, a transistor and a capacitor. The direct-view display also includes a controller for controlling the states of each of the light modulators in the array. The controller includes an input, a processor, a memory, and an output. The input receives image data encoding an image frame for display on the direct-view display. The processor derives a plurality of sub-frame data sets from the image data. Each sub-frame data set indicates desired states of light modulators in multiple rows and multiple columns of the array. The memory stores the plurality of sub-frame data sets. The output outputs the plurality of sub-frame data sets according to an output sequence to drive light modulators into the states indicated in the sub-frame data sets. The plurality of sub-frame data sets may include distinct sub-frame data sets for at least two of at least three color components of the image frame or for four color components of the image frame, where the four color components may consist of red, green, blue, and white.

In one embodiment, the output sequence includes a plurality of events corresponding to the sub-frame data sets. The controller stores different time values associated with events corresponding to at least two sub-frame data sets. The time values may be selected to prevent illumination of the array while the modulators change states and may correlate to a brightness of a sub-frame image resulting from an outputting of a sub-frame data set of the plurality of sub-frame data sets. The direct-view display may include a plurality of lamps, in which case the controller may store time values associated with lamp illumination events and/or lamp extinguishing events included in the output sequence. The output sequence may include addressing events, where the controller stores time values associated with the addressing events.

In another embodiment, the output sequence is stored at least in part in memory. The direct-view display may include a data link to an external processor for receiving changes to the output sequence. The direct-view display may include a plurality of lamps, where the output sequence includes a lamp illumination sequence. The lamp illumination sequence may include data corresponding to the length of time and/or intensity with which lamps are illuminated in association with sub-frame data sets output in the output sequence. The length of time that a lamp is illuminated for each sub-frame data set in the lamp illumination sequence is preferably less than or equal to 4 milliseconds.

In another embodiment, the processor derives the plurality of sub-frame data sets by decomposing the image frame into a plurality of sub-frame images and assigning a weight to each sub-frame image of the plurality of sub-frame images. The controller may cause a sub-frame image to be illuminated for a length of time and/or with an illumination intensity proportional to the weight assigned to the sub-frame image. The processor may assign the weight according to a coding scheme. In one implementation, the coding scheme is a binary coding scheme, the sub-frame data sets are bitplanes, and each color component of the image frame is decomposed into at least a most significant sub-frame image and a next most significant sub-frame image. The most-significant sub-frame image may contribute to a displayed image frame twice as much as the next most significant sub-frame image. According to the output sequence, the bitplane corresponding to the most significant sub-image of at least one color component of the image frame may be output at two distinct times which may be separated by no more than 25 milliseconds. The length of time between a first time the bitplane corresponding to the most significant sub-frame image of a color component of the image frame is output and a second time the bitplane corresponding to the most significant sub-frame image of the color component is output is preferably within 10% of the length of time between the second time the bitplane corresponding to the most significant sub-frame image of the color component is output and a subsequent time at which a sub-frame image corresponding to a most significant sub-frame image of the color component is output.

In another embodiment, at least one sub-frame data set corresponding to a first color component of the image frame is output before at least one sub-frame data set corresponding to a second color component of the image frame, and at least one sub-frame data set corresponding to the first color component of the image frame is output after at least one sub-frame data set corresponding to the second color component of the image frame. Lamps of at least two different colors may be illuminated to display a single sub-frame image corresponding to a single sub-frame data set, where a lamp of one of the colors may be illuminated with a substantially greater intensity than lamps of the other colors.

In another embodiment, the direct-view display includes a memory for storing a plurality of alternative output sequences and may include an output sequence switching module for switching between the output sequence and the plurality of alternative output sequences. The output sequence switching module may respond to the processor, to a user interface included in the direct-view display, and/or to instructions received from a second processor, external to the controller, included in the device in which the direct-view display is incorporated. The user interface may be a manual switch.

In another embodiment, the direct-view display includes a sequence parameter calculation module for deriving changes to the output sequence. Based on characteristics of a received image frame, the sequence parameter calculation module may derive changes to the output sequence, to timing values stored in relation to events included in the output sequence, and/or to sub-frame data sets. The direct-view display may include a plurality of lamps, in which case the sequence parameter calculation module may derive changes to lamp intensity values stored in relation to lamp illumination events included in the output sequence.

In another embodiment, the array of light modulators includes a plurality of independently actuatable banks of light modulators. The control matrix may include a plurality of global actuation interconnects, where each global actuation interconnect corresponds to a respective bank of light modulators. The plurality of banks may be located adjacent one another in the array. Alternatively, each bank of light modulator may include a plurality of rows in the array, where the banks are interwoven with one another in the array. In one implementation, the display of a sub-frame image corresponding to a particular significance and color component in one of the banks is no more than 25 ms from a subsequent display of a sub-frame image corresponding to the significance value and color component, and is no more than 25 ms after a prior display of a sub-frame image corresponding to the significance and color component in the other of the banks.

In another embodiment, the light modulators include shutters. The shutters may selectively reflect light and/or selectively allow low light to pass through corresponding apertures to form the image frame. The shutters may be driven transverse to the substrate. In another embodiment, the light modulators are reflective light modulators. In another embodiment, the light modulators selectively allow the passage of light towards a viewer. In another embodiment, a light guide is positioned proximate the array of light modulators.

In another embodiment, the output sequence includes a plurality of global actuation events. The direct-view display may include a global actuation interconnect coupled to the array of light modulators for causing light modulators in multiple rows and multiple columns of the array of light modulators to actuate substantially simultaneously.

In another aspect of the invention, a direct-view display includes an array of MEMS light modulators and a control matrix both formed on a transparent substrate, where each of the light modulators can be driven into at least two states, and lamps of at least three colors. The control matrix transmits data and actuation voltages to the array. The direct-view display also includes a controller for controlling the states of each of the light modulators in the array. The controller also controls the illumination of lamps to illuminate the array of light modulators with lamps of at least two colors at the same time to form a portion of an image. At least one of the colors illuminating the array of light modulators may be of greater intensity than the other colors.

Another aspect of the invention includes a method for displaying an image frame on a direct-view display. The method includes the steps of receiving image data encoding the image frame; deriving a plurality of sub-frame data sets from the image data; storing the plurality of sub-frame data sets in a memory; and outputting the plurality of sub-frame data sets according to an output sequence. Each sub-frame data set indicates desired states of MEMS light modulators in multiple rows and multiple columns of a light modulator array formed on a transparent substrate. The step of outputting the plurality of sub-frame data sets drives the MEMS light modulators into the desired states indicated in each sub-frame data set and includes transmitting data and actuation voltages to the light modulator array via a control matrix formed on the transparent substrate.

In another aspect of the invention, a direct-view display includes an array of MEMS light modulators and a control matrix both formed on a transparent substrate, wherein each of the light modulators can be driven into at least two states. The control matrix transmits data and actuation voltages to the array. The direct-view display also includes a controller for controlling the states of each of the light modulators in the array. The controller also controls the illumination of lamps of at least four colors to display an image. The lamps may include at least a red lamp, a green lamp, a blue lamp, and a white lamp. The lamps may include at least a red lamp, a green lamp, a blue lamp, and a yellow lamp. The direct-view display may include a processor for translating three color image data into four color image data.

Another aspect of the invention includes a method for displaying an image on a direct-view display. The method includes the steps of controlling states of MEMS light modulators in a light modulator array formed on a transparent substrate, where each of the MEMS light modulators can be driven into at least two states; transmitting data and actuation voltages to the light modulator array via a control matrix formed on the transparent substrate; and controlling the illumination of lamps of at least four colors to display the image.

BRIEF DESCRIPTION

In the detailed description which follows, reference will be made to the attached drawings, in which:

FIG. 2C is a cross sectional view of a light-tap-based light modulator suitable for incorporation into the direct-view MEMS-based display of FIG. 1, according to an illustrative embodiment of the invention;

FIG. 6A is a schematic diagram of a digital image signal received by a display device, according to an illustrative embodiment of the invention;

FIG. 6B is a schematic diagram of a memory buffer useful for converting a received image signal into a bitplane, according to an illustrative embodiment of the invention;

FIG. 6C is a schematic diagram of portions of two bit-planes, according to an illustrative embodiment of the invention;

FIG. 14C depicts various pulse profiles for lamps, according to an illustrative embodiment of the invention;

FIG. 23 is a flow chart of a method of displaying an image suitable for use by the controller of FIG. 22, according to an illustrative embodiment of the invention.

DETAILED DESCRIPTION

Figure 1:
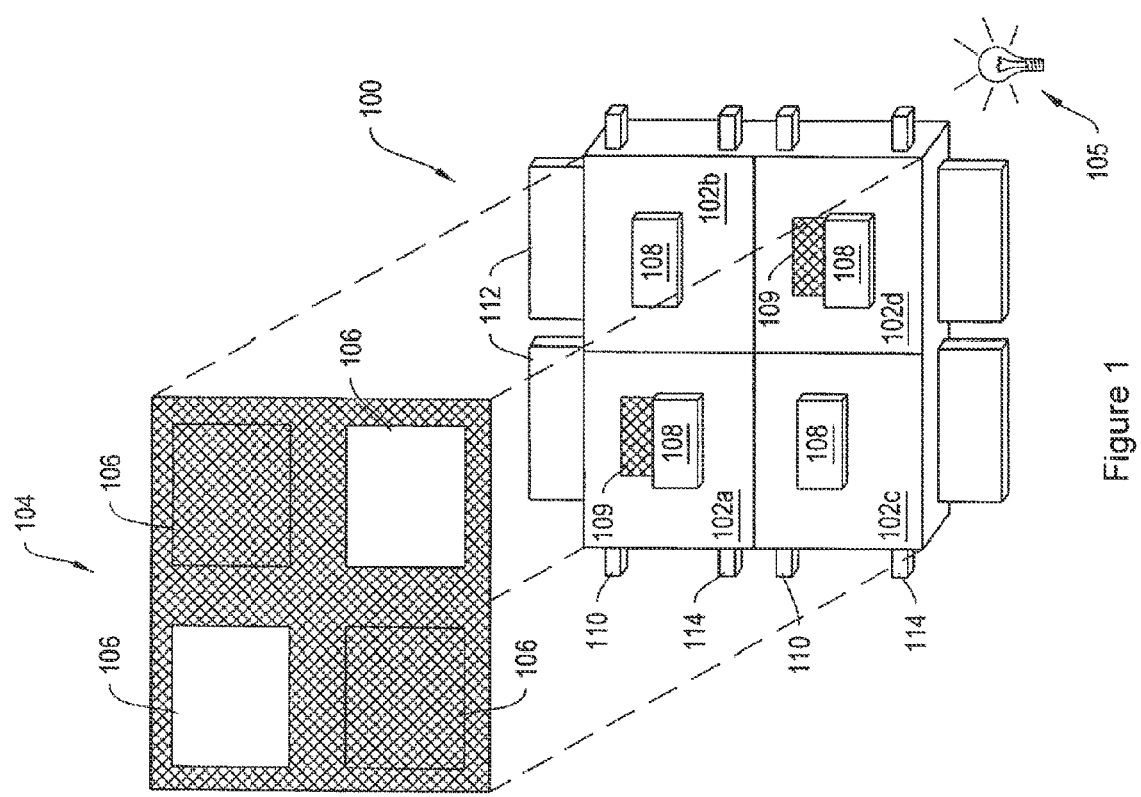
FIG. 1 is a schematic diagram of a direct-view MEMS-based display according to an illustrative embodiment of the invention.

FIG. 1 is a schematic diagram of a direct-view MEMS-based display apparatus 100, according to an illustrative embodiment of the invention. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e. by use of a frontlight.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

Display apparatus 100 is a direct-view display in that it does not require imaging optics that are necessary for projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 2A:
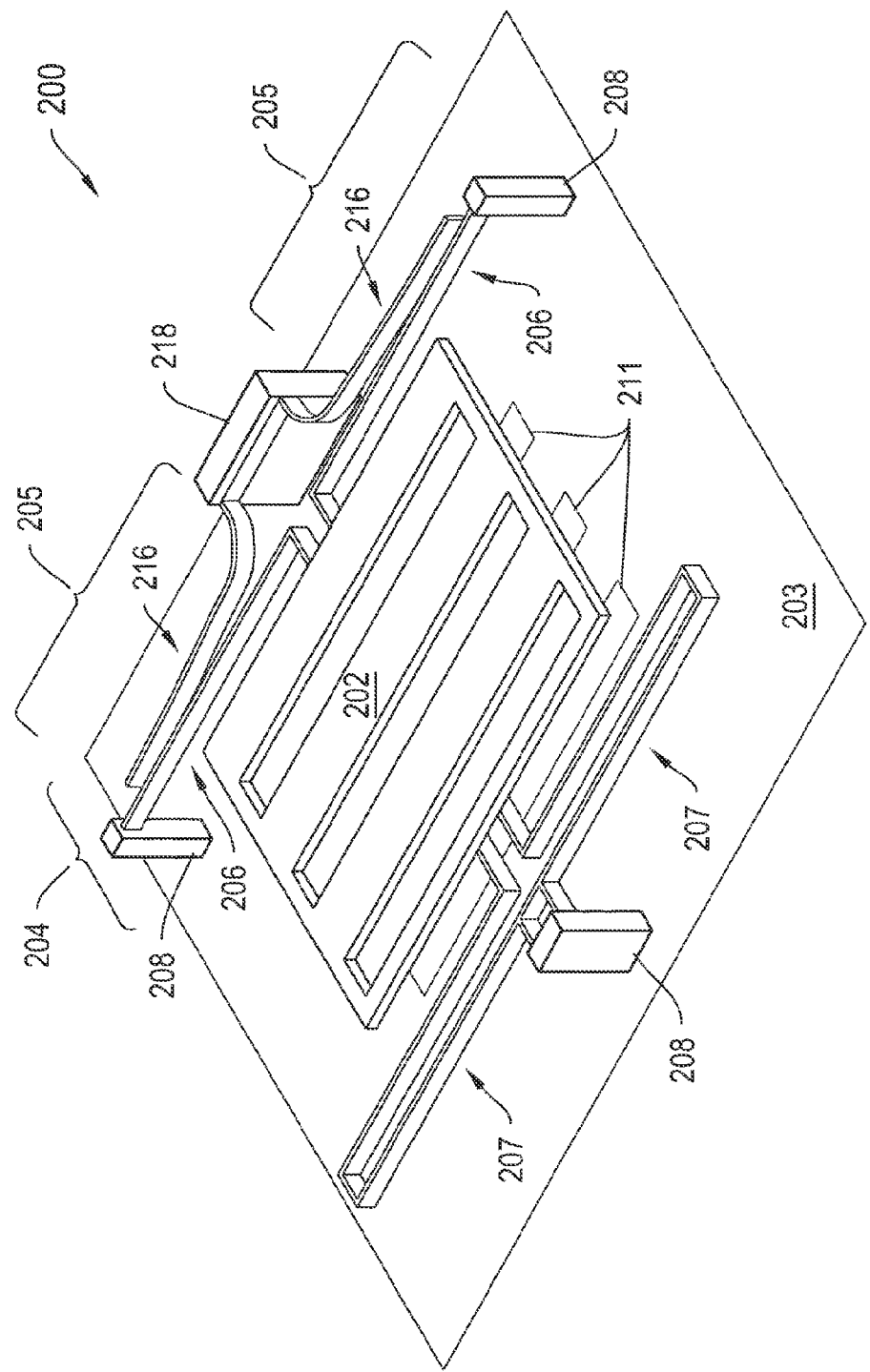
FIG. 2A is a perspective view of an illustrative shutter-based light modulator suitable for incorporation into the direct-view MEMS-based display of FIG. 1, according to an illustrative embodiment of the invention.

FIG. 2A is a perspective view of an illustrative shutter-based light modulator 200 suitable for incorporation into the direct-view MEMS-based display apparatus 100 of FIG. 1, according to an illustrative embodiment of the invention. The light modulator 200 includes a shutter 202 coupled to an actuator 204. The actuator 204 is formed from two separate compliant electrode beam actuators 205 (the "actuators 205"), as described in U.S. patent application Ser. No. 11/251,035, filed on Oct. 14, 2005. The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the first step of the processing sequence involves depositing a light blocking layer onto the substrate and etching the light blocking layer into an array of holes 211. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as light modulator 200, incorporates a passive restoring force, such as a spring, for returning a shutter to its rest position after voltages have been removed. Other shutter assemblies, as described in U.S. patent application Ser. Nos. 11/251,035 and 11/326,696, incorporate a dual set of "open" and "closed" actuators and a separate sets of "open" and "closed" electrodes for moving the shutter into either an open or a closed state.

U.S. patent application Ser. Nos. 11/251,035 and 11/326,696 have described a variety of methods by which an array of shutters and apertures can be controlled via a control matrix to produce images, in many cases moving images, with appropriate gray scale. In some cases control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 2B:
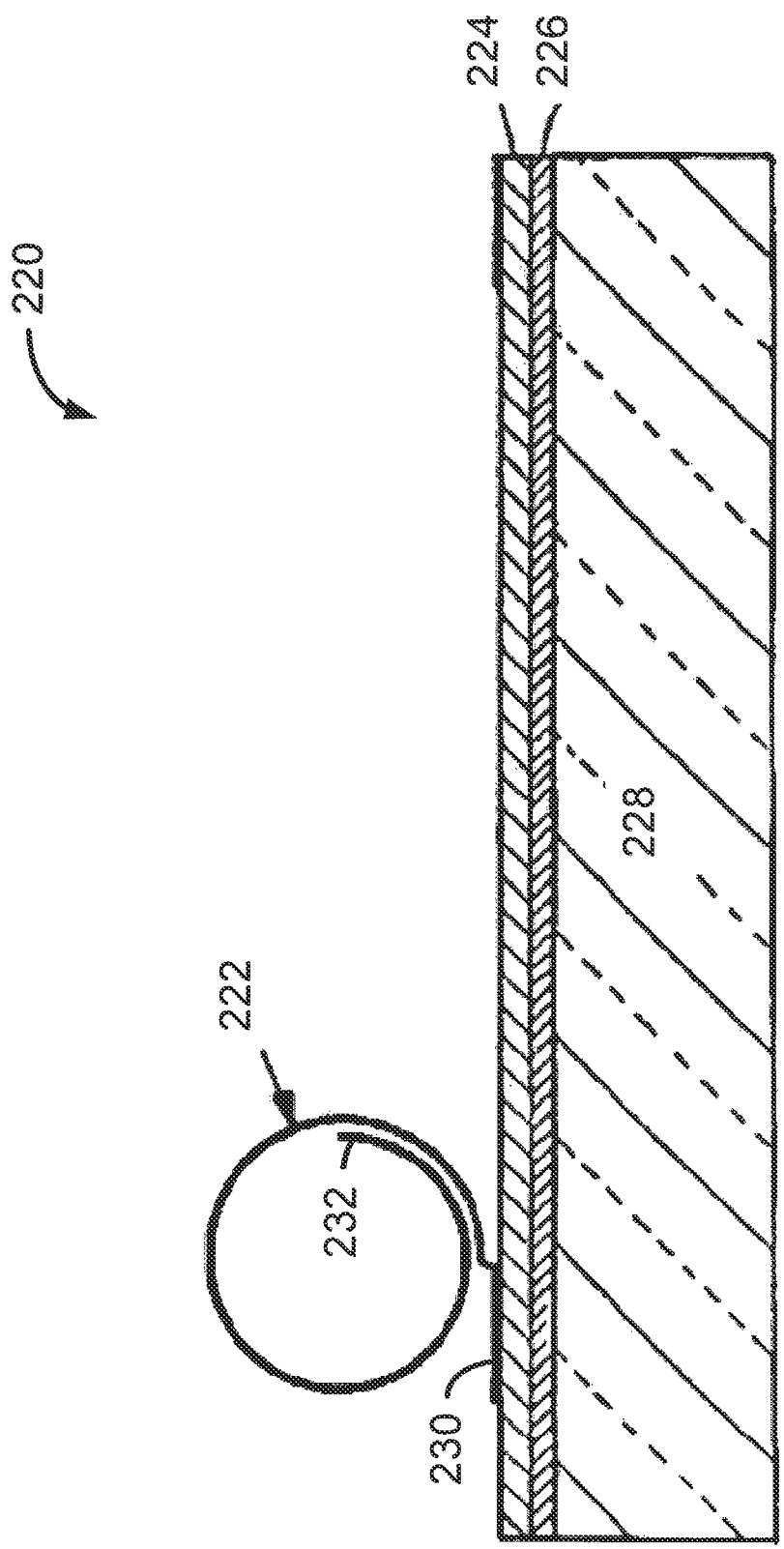
FIG. 2B is a cross-sectional view of a rollershade-based light modulator suitable for incorporation into the direct-view MEMS-based display of FIG. 1, according to an illustrative embodiment of the invention.

The control matrices described herein are not limited to controlling shutter-based MEMS light modulators, such as the light modulators described above. For example, FIG. 2B is a cross-sectional view of a rolling actuator-based light modulator 220 suitable for incorporation into the direct-view MEMS-based display apparatus 100 of FIG. 1, according to an illustrative embodiment of the invention. As described further in U.S. Pat. No. 5,233,459, entitled "Electric Display Device," and U.S. Pat. No. 5,784,189, entitled "Spatial Light Modulator," the entireties of which are incorporated herein by reference, a rolling actuator-based light modulator includes a moveable electrode disposed opposite a fixed electrode and biased to move in a preferred direction to produce a shutter upon application of an electric field. In one embodiment, the light modulator 220 includes a planar electrode 226 disposed between a substrate 228 and an insulating layer 224 and a moveable electrode 222 having a fixed end 230 attached to the insulating layer 224. In the absence of any applied voltage, a moveable end 232 of the moveable electrode 222 is free to roll towards the fixed end 230 to produce a rolled state. Application of a voltage between the electrodes 222 and 226 causes the moveable electrode 222 to unroll and lie flat against the insulating layer 224, whereby it acts as a shutter that blocks light traveling through the substrate 228. The moveable electrode 222 returns to the rolled state after the voltage is removed. The bias towards a rolled state may be achieved by manufacturing the moveable electrode 222 to include an anisotropic stress state.

FIG. 2C is a cross-sectional view of a light-tap-based light modulator 250 suitable for incorporation into the direct-view MEMS-based display apparatus 100 of FIG. 1, according to an illustrative embodiment of the invention. As described further in U.S. Pat. No. 5,771,321, entitled "Micromechanical Optical Switch and Flat Panel Display," the entirety of which is incorporated herein by reference, a light tap works according to a principle of frustrated total internal reflection. That is, light 252 is introduced into a light guide 254, in which, without interference, light 252 is for the most part unable to escape the light guide 254 through its front or rear surfaces due to total internal reflection. The light tap 250 includes a tap element 256 that has a sufficiently high index of refraction that, in response to the tap element 256 contacting the light guide 254, light 252 impinging on the surface of the light guide adjacent the tap element 256 escapes the light guide 254 through the tap element 258 towards a viewer, thereby contributing to the formation of an image.

In one embodiment, the tap element 256 is formed as part of beam 258 of flexible, transparent material. Electrodes 260 coat portions one side of the beam 258. Opposing electrodes 260 are disposed on a cover plate 264 positioned adjacent the layer 258 on the opposite side of the light guide 254. By applying a voltage across the electrodes 260, the position of the tap element 256 relative to the light guide 254 can be controlled to selectively extract light 252 from the light guide 254.

Figure 2D:
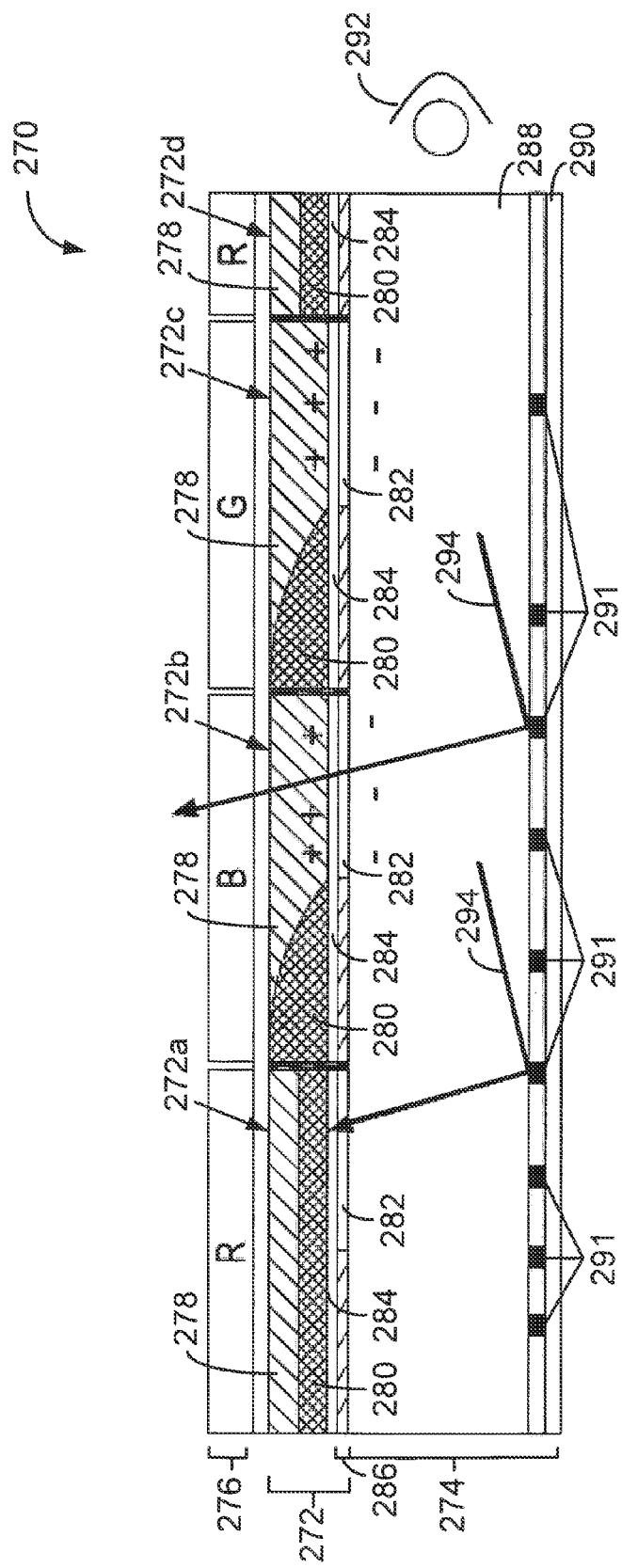
FIG. 2D is a cross sectional view of an electrowetting-based light modulator suitable for incorporation into the direct-view MEMS-based display of FIG. 1, according to an illustrative embodiment of the invention.

FIG. 2D is a cross sectional view of a third illustrative non-shutter-based light modulator suitable for inclusion in various embodiments of the invention Specifically, FIG. 2D is a cross sectional view of an electrowetting-based light modulation array 270. The light modulation array 270 includes a plurality of electrowetting-based light modulation cells 272a-272d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide) and an insulating layer 284 positioned between the layer of light absorbing oil 280 and the transparent electrode 282. Illustrative implementation of such cells are described further in U.S. Patent Application Publication No. 2005/0104804, published May 19, 2005 and entitled "Display Device." In the embodiment described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One of more light sources 292 inject light 294 into the light guide 288.

In an alternative implementation, an additional transparent substrate is positioned between the light guide 290 and the light modulation array 270. In this implementation, the reflective aperture layer 286 is formed on the additional transparent substrate instead of on the surface of the light guide 290.

In operation, application of a voltage to the electrode 282 of a cell (for example, cell 272b or 272c) causes the light absorbing oil 280 in the cell to collect in one portion of the cell 272. As a result, the light absorbing oil 280 no longer obstructs the passage of light through the aperture formed in the reflective aperture layer 286 (see, for example, cells 272b and 272c). Light escaping the backlight at the aperture is then able to escape through the cell and through a corresponding color (for example, red, green, or blue) filter in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area cannot pass light through, whether a voltage is applied or not, and therefore, without the inclusion of the reflective portions of reflective apertures layer 286, would absorb light that otherwise could be used to contribute to the formation of an image. However, with the inclusion of the reflective aperture layer 286, this light, which otherwise would have been absorbed, is reflected back into the light guide 290 for future escape through a different aperture.

The roller-based light modulator 220, light tap 250, and electrowetting-based light modulation array 270 are not the only examples of a non-shutter-based MEMS modulator suitable for control by the control matrices described herein. Other forms of non-shutter-based MEMS modulators could likewise be controlled by various ones of the control matrices described herein without departing from the scope of the invention.

Figure 3A:
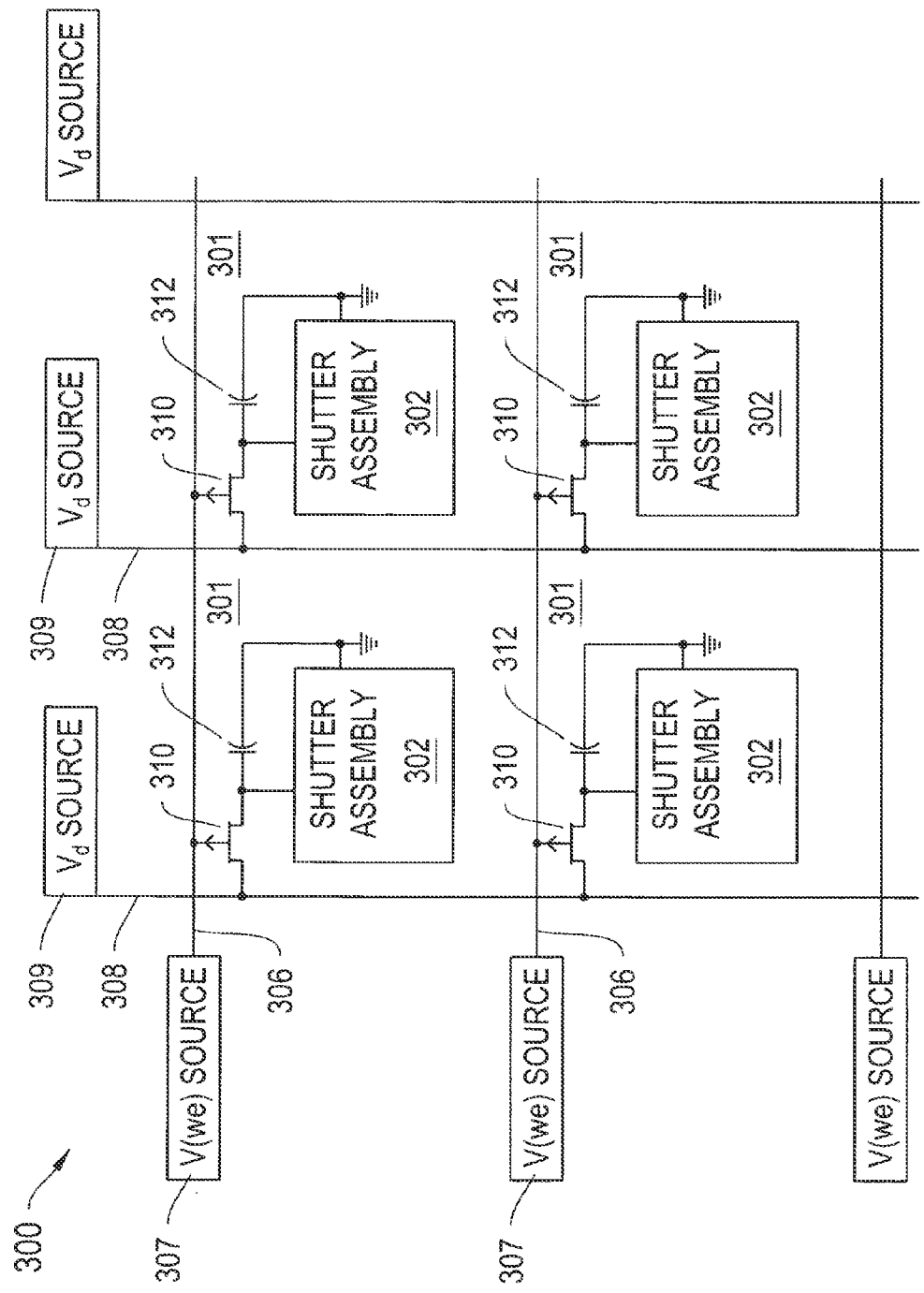
FIG. 3A is a schematic diagram of a control matrix suitable for controlling the light modulators incorporated into the direct-view MEMS-based display of FIG. 1, according to an illustrative embodiment of the invention.
Figure 3B:
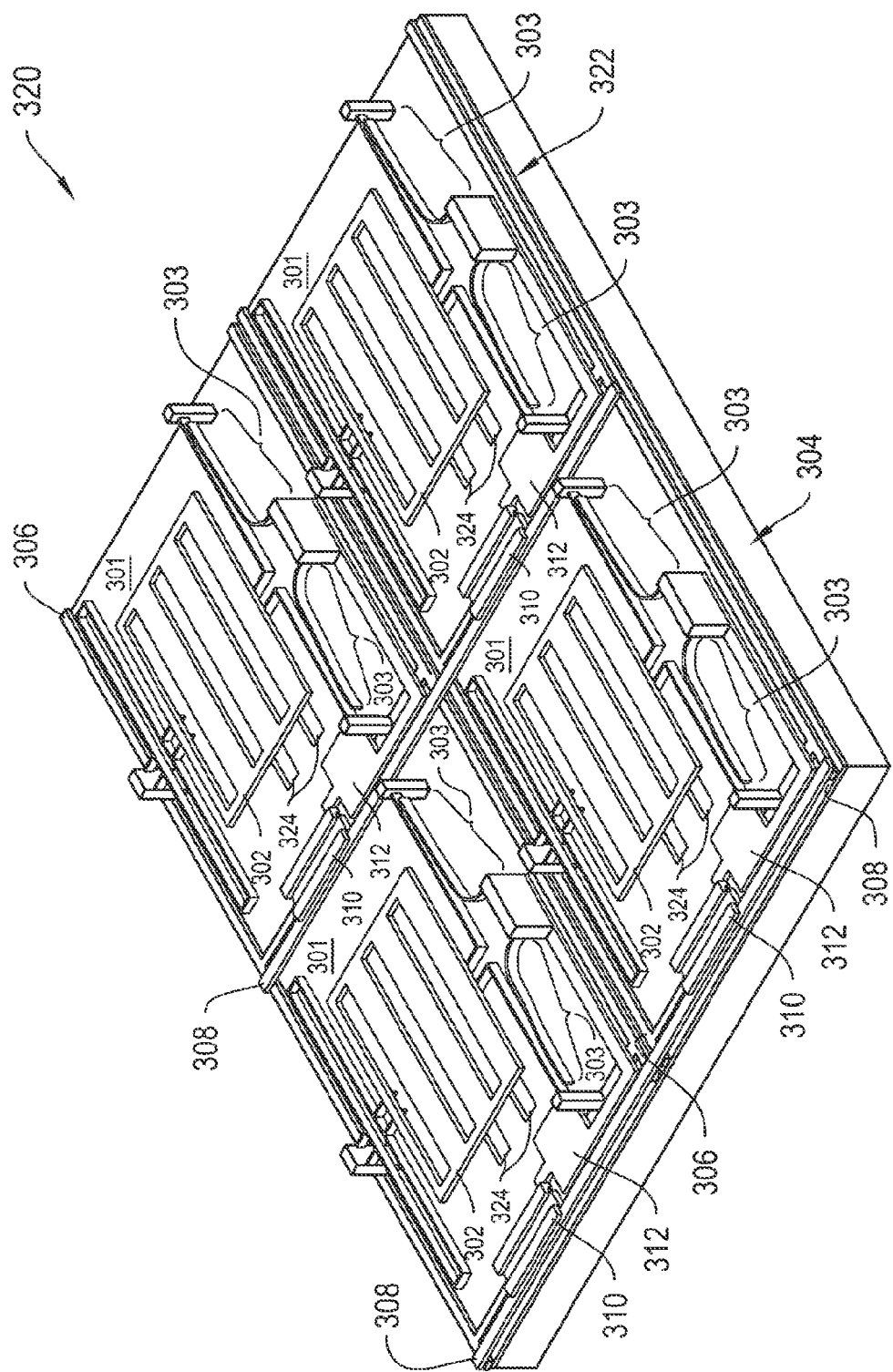
FIG. 3B is a perspective view of an array of shutter-based light modulators connected to the control matrix of FIG. 3A, according to an illustrative embodiment of the invention.

FIG. 3A is a schematic diagram of a control matrix 300 suitable for controlling the light modulators incorporated into the direct-view MEMS-based display apparatus 100 of FIG. 1, according to an illustrative embodiment of the invention. FIG. 3B is a perspective view of an array 320 of shutter-based light modulators connected to the control matrix 300 of FIG. 3A, according to an illustrative embodiment of the invention. The control matrix 300 may address an array of pixels 320 (the "array 320"). Each pixel 301 includes an elastic shutter assembly 302, such as the shutter assembly 200 of FIG. 2A, controlled by an actuator 303. Each pixel also includes an aperture layer 322 that includes aperture holes 324. Further electrical and mechanical descriptions of shutter assemblies such as shutter assembly 302, and variations thereon, can be found in U.S. patent application Ser. Nos. 11/251,035 and 11/326,696.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source, ("Vd source") 309 to the pixels 301 in a corresponding column of pixels 301. In control matrix 300, the data voltage $V_d$ provides the majority of the energy necessary for actuation of the shutter assemblies 302. Thus, the data voltage source 309 also serves as an actuation voltage source.

Referring to FIGS. 3A and 3B, for each pixel 301 or for each shutter assembly in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly include two electrodes. The drain of each transistor 310 is electrically connected in parallel to one electrode of the corresponding capacitor 312 and to the one of the electrodes of the corresponding actuator 303. The other electrode of the capacitor 312 and the other electrode of the actuator 303 in shutter assembly 302 are connected to a common or ground potential.

In operation, to form an image, the control matrix 300 write-enables each row in the array 320 in sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not necessary, therefore, to wait and hold the voltage $V_{we}$ on a row for times long enough for the shutter assembly 302 to actuate; such actuation can proceed after the write-enabling voltage has been removed from the row. The voltage in the capacitors 312 in a row remain substantially stored until an entire video frame is written, and in some implementations until new data is written to the row.

The pixels 301 of the array 320 are formed on a substrate 304. The array includes an aperture layer 322, disposed on the substrate, which includes a set of aperture holes 324 for each pixel 301 in the array 320. The aperture holes 324 are aligned with the shutter assemblies 302 in each pixel. In one implementation the substrate 304 is made of a transparent material, such as glass or plastic. In another implementation the substrate 304 is made of an opaque material, but in which holes are etched to form the aperture holes 324.

The shutter assembly 302 together with the actuator 303 can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 can also be made electrically bi-stable. In an electrically bi-stable shutter assembly, there exists a range of voltages below the actuation voltage of the shutter assembly, which if applied to a closed actuator (with the shutter being either open or closed), hold the actuator closed and the shutter in position, even if an opposing force is exerted on the shutter. The opposing force may be exerted by a spring such as spring 207 in shutter-based light modulator 200, or the opposing force may be exerted by an opposing actuator, such as an "open" or "closed" actuator.

The light modulator array 320 is depicted as having a single MEMS light modulator per pixel. Other embodiments are possible in which multiple MEMS light modulators are provided in each pixel, thereby providing the possibility of more than just binary "on' or "off" optical states in each pixel. Certain forms of coded area division gray scale are possible wherein the multiple MEMS light modulators in the pixel are provided, and where with aperture holes 324 associated with each of the light modulators have unequal areas.

Figure 3C:
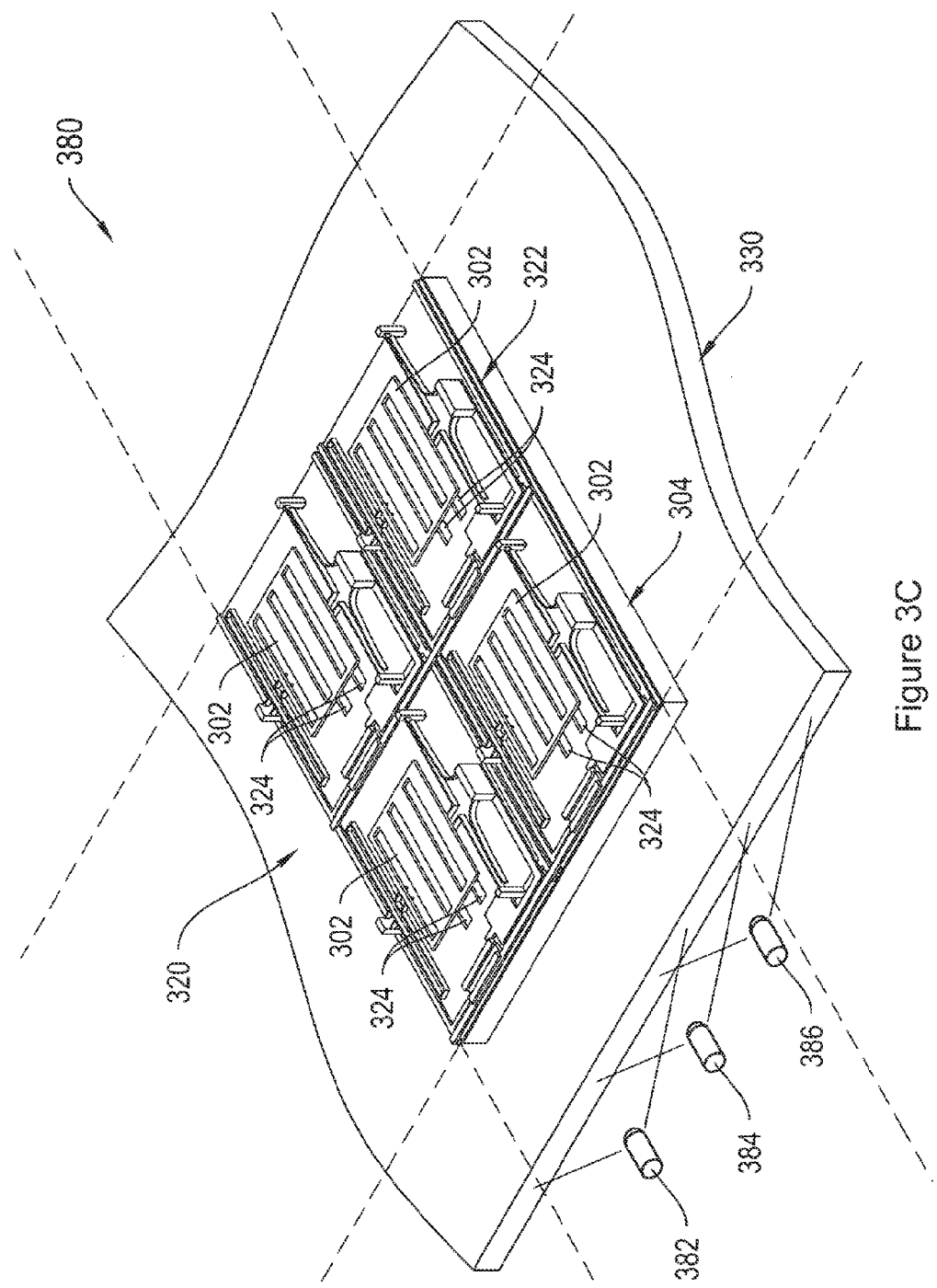
FIG. 3C illustrates a portion of a direct view display that includes the array of light modulators depicted in FIG. 3B disposed on top of a backlight, according to an illustrative embodiment of the invention.
Figure 3D:
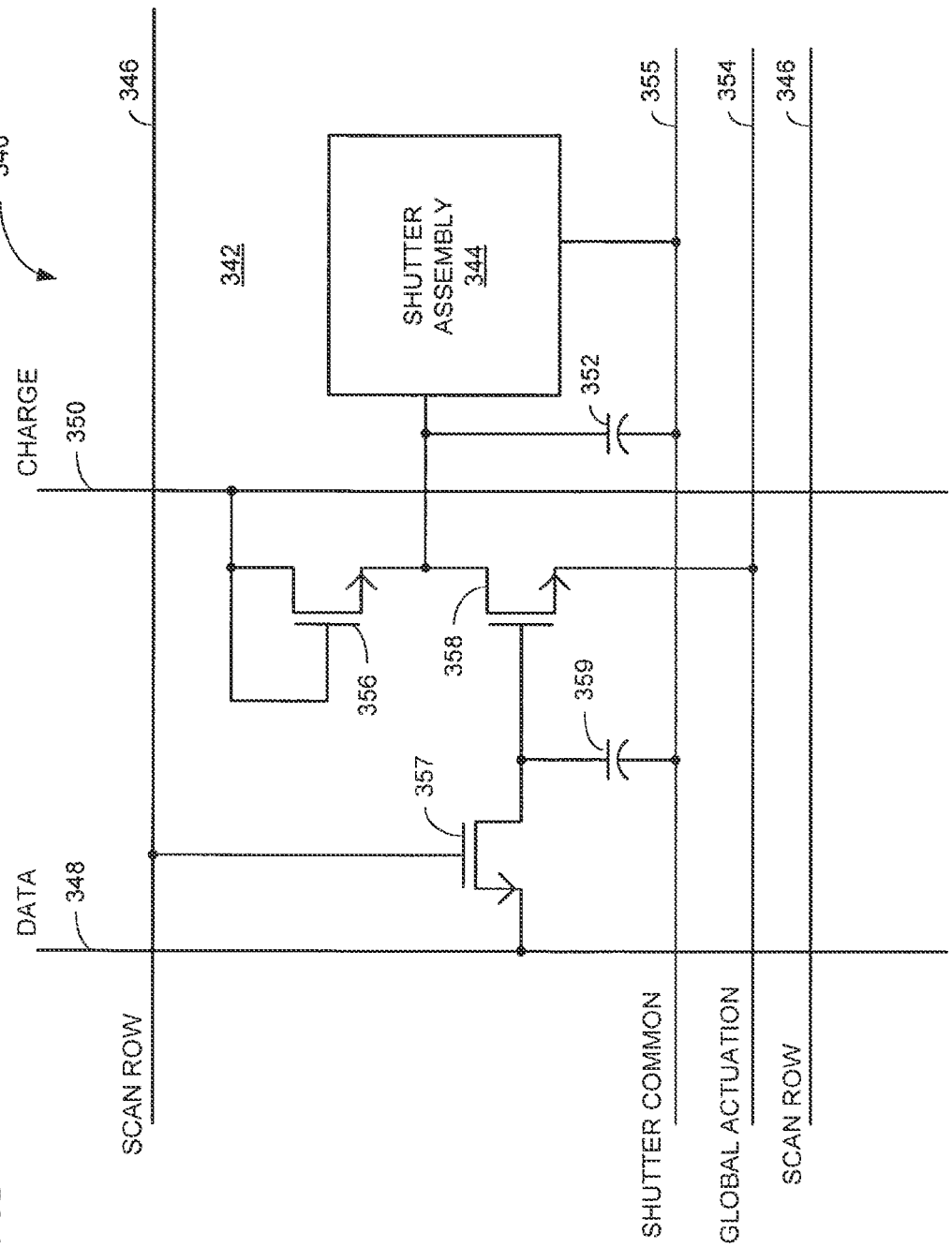
FIG. 3D is a schematic diagram of another suitable control matrix for inclusion in the direct-view MEMS-based display of FIG. 1, according to an illustrative embodiment of the invention.

FIG. 3D is yet another suitable control matrix 340 for inclusion in the display apparatus 100, according to an illustrative embodiment of the invention. Control matrix 340 controls an array of pixels 342 that include shutter assemblies 344. The control matrix 340 includes a single data interconnect 348 for each column of pixels 342 in the control matrix. The actuators in the shutter assemblies 344 can be made either electrically bi-stable or mechanically bi-stable.

The control matrix 340 includes a scan-line interconnect 346 for each row of pixels 342 in the control matrix 340. The control matrix 340 further includes a charge interconnect 350, and a global actuation interconnect 354, and a shutter common interconnect 355. These interconnects 350, 354 and 355 are shared among pixels 342 in multiple rows and multiple columns in the array. In one implementation, the interconnects 350, 354, and 355 are shared among all pixels 342 in the control matrix 340. Each pixel 342 in the control matrix includes a shutter charge transistor 356, a shutter discharge transistor 358, a shutter write-enable transistor 357, and a data store capacitor 359. Control matrix 340 also incorporates an optional voltage stabilizing capacitor 352 which is connected in parallel with the source and drain of discharge switch transistor 358. The gate terminals of the charging transistor 356 are connected directly to the charge interconnect 350, along with the drain terminal of the charging transistor 356. In operation, the charging transistors 356 operate essentially as diodes, they can pass a current in only one direction.

At the beginning of each frame addressing cycle the control matrix 340 applies a voltage pulse to the charge interconnect 350, allowing current to flow through charging transistor 356 and into the shutter assemblies 344 of the pixels 342. After this charging pulse, each of the shutter electrodes of shutter assemblies 344 will be in the same voltage state. After the voltage pulse, the potential of charge interconnect 350 is reset to zero, and the charging transistors 356 will prevent the charge stored in the shutter assemblies 344 from being dissipated through charge interconnect 350. The charge interconnect 350, in one implementation, transmits a pulsed voltage equal to or greater than $V_{at}$, e.g., 40V. In one implementation the imposition of a voltage in excess of $V_{at}$ of causes all of the shutter assemblies connected to the charging interconnect 350 to actuate or move into the same state, for instance the shutter closed state.

Each row is then write-enabled in sequence. The control matrix 340 applies a write-enabling voltage $V_{we}$ to the scan-line interconnect 346 corresponding to each row. While a particular row of pixels 342 is write-enabled, the control matrix 340 applies a data voltage to the data interconnect 348 corresponding to each column of pixels 342 in the control matrix 340. The application of $V_{we}$ to the scan-line interconnect 346 for the write-enabled row turns on the write-enable transistor 357 of the pixels 342 in the corresponding scan line. The voltages applied to the data interconnect 348 is thereby caused to be stored on the data store capacitor 359 of the respective pixels 342.

In control matrix 340 the global actuation interconnect 354 is connected to the source of the shutter discharge switch transistor 358. Maintaining the global actuation interconnect 354 at a potential significantly above that of the shutter common interconnect 355 prevents the turn-on of the discharge switch transistor 358, regardless of what charge is stored on the capacitor 359. Global actuation in control matrix 340 is achieved by bringing the potential on the global actuation interconnect 354 to ground or to substantially the same potential as the shutter common interconnect 355, enabling the discharge switch transistor 358 to turn-on in accordance to the whether a data voltage has been stored on capacitor 359. During the global actuation step, for the pixels wherein a data voltage has been stored on capacitor 359, the discharge transistor turns on, charge drainsout of the actuators of shutter assembly 344, and the shutter assembly 344 is allowed to move or actuate into its relaxed state, for instance the shutter open state. For pixels wherein no data voltage was stored on the capacitor 359, the discharge transistor 358 do not turn on and the shutter assembly 344 remains charged. For those pixels a voltage remains across the actuators of shutter assemblies 344 and those pixels remain, for instance, in the shutter closed state. During the global actuation step all pixels connected to the same global actuation interconnect, and with data stored on capacitor 359, move into their new states at substantially at the same time. Control matrix 340 does not depend on electrical bi-stability in the shutter assembly 344 in order to achieve global actuation.

Applying partial voltages to the data store capacitor 359 allows partial turn-on of the discharge switch transistor 358 during the time that the global actuation interconnect 354 is brought to its actuation potential. In this fashion, an analog voltage is created on the shutter assembly 344, for providing analog gray scale.

In some implementation the global actuation interconnect 354 is connected to every shutter discharge transistor 358 in every row and column in the array of pixels. In other implementations the global actuation interconnect 354 is connected to the shutter discharge transistors within only a sub-group of pixels in multiple rows and columns. As will be discussed with reference to FIGS. 18 and 19, the array of pixels can be arranged in banks, where each bank of pixels is connected by means of a global actuation interconnects to a unique global actuation driver. In this implementation the control circuit can load data into the selected banks and then actuate only the selected bank globally by means of the selected global actuation driver. In one implementation, the display is separated into two banks, with one set of global drivers and global actuation interconnects connected to pixels in the odd-numbered rows while a separate set of global drivers and global actuation interconnects is connected to pixels in the even-numbered rows. In other implementations as many as 6 or 8 separately actuatable addressing banks are employed. Other implementations of circuits for controlling displays are described in U.S. Ser. No. 11/607,715 filed Dec. 1, 2006 and entitled "Circuits for Controlling Display Apparatus," which is incorporated herein by reference.

FIG. 3C illustrates a portion of a direct view display 380 that includes the array of light modulators 320 depicted in FIG. 3B disposed on top of backlight 330. In one implementation the backlight 330 is made of a transparent material, i.e. glass or plastic, and functions as a light guide for evenly distributing light from lamps 382, 384, and 386 throughout the display plane. When assembling the display 380 as a field sequential display, the lamps 382, 384, and 386 can be alternate color lamps, e.g. red, green, and blue lamps respectively.

A number of different types of lamps 382-386 can be employed in the displays, including without limitation: incandescent lamps, fluorescent lamps, lasers, or light emitting diodes (LEDs). Further, lamp 382-386 of direct view display 380 can be combined into a single assembly containing multiple lamps. For instance a combination of red, green, and blue LEDs can be combined with or substituted for a white LED in a small semiconductor chip, or assembled into a small multi-lamp package. Similarly each lamp can represent an assembly of 4-color LEDs, for instance a combination of red, yellow, green, and blue LEDs.

The shutter assemblies 302 function as light modulators. By use of electrical signals from the associated control matrix the shutter assemblies 302 can be set into either an open or a closed state. Only the open shutters allow light from the lightguide 330 to pass through to the viewer, thereby forming a direct view image.

In direct view display 380 the light modulators are formed on the surface of substrate 304 that faces away from the light guide 330 and toward the viewer. In other implementations the substrate 304 can be reversed, such that the light modulators are formed on a surface that faces toward the light guide. In these implementations it is sometimes preferable to form an aperture layer, such as aperture layer 322, directly onto the top surface of the light guide 330. In other implementations it is useful to interpose a separate piece of glass or plastic between the light guide and the light modulators, such separate piece of glass or plastic containing an aperture layer, such as aperture layer 322 and associated aperture holes, such as aperture holes 324. It is preferable that the spacing between the plane of the shutter assemblies 302 and the aperture layer 322 be kept as close as possible, preferably less than 10 microns, in some cases as close as 1 micron. Descriptions of other optical assemblies useful for this invention can be found in US Patent Application Publication No. 20060187528A1 filed Sep. 2, 2005 and entitled "Methods and Apparatus for Spatial Light Modulation" and in U.S. Ser. No. 11/528,191 filed Sep. 26, 2006 and entitled "Display Apparatus with Improved Optical Cavities," which are both incorporated herein by reference.

In some displays, color pixels are generated by illuminating groups of light modulators corresponding to different colors, for example, red green and blue. Each light modulator in the group has a corresponding filter to achieve the desired color. The filters, however, absorb a great deal of light, in some cases as much as 60% of the light passing through the filters, thereby limiting the efficiency and brightness of the display. In addition, the use of multiple light modulators per pixel decreases the amount of space on the display that can be used to contribute to a displayed image, further limiting the brightness and efficiency of such a display.

The human brain, in response to viewing rapidly changing images, for example, at frequencies of greater than 20 Hz, averages images together to perceive an image which is the combination of the images displayed within a corresponding period. This phenomenon can be utilized to display color images while using only single light modulators for each pixel of a display, using a technique referred to in the art as field sequential color. The use of field sequential color techniques in displays eliminates the need for color filters and multiple light modulators per pixel. In a field sequential color enabled display, an image frame to be displayed is divided into a number of sub-frame images, each corresponding to a particular color component (for example, red, green, or blue) of the original image frame. For each sub-frame image, the light modulators of a display are set into states corresponding to the color component's contribution to the image. The light modulators then are illuminated by a lamp of the corresponding color. The sub-images are displayed in sequence at a frequency (for example, greater than 60 Hz) sufficient for the brain to perceive the series of sub-frame images as a single image. The data used to generate the sub-frames are often fractured in various memory components. For example, in some displays, data for a given row of display are kept in a shift-register dedicated to that row. Image data is shifted in and out of each shift register to a light modulator in a corresponding column in that row of the display according to a fixed clock cycle.

Figure 4:
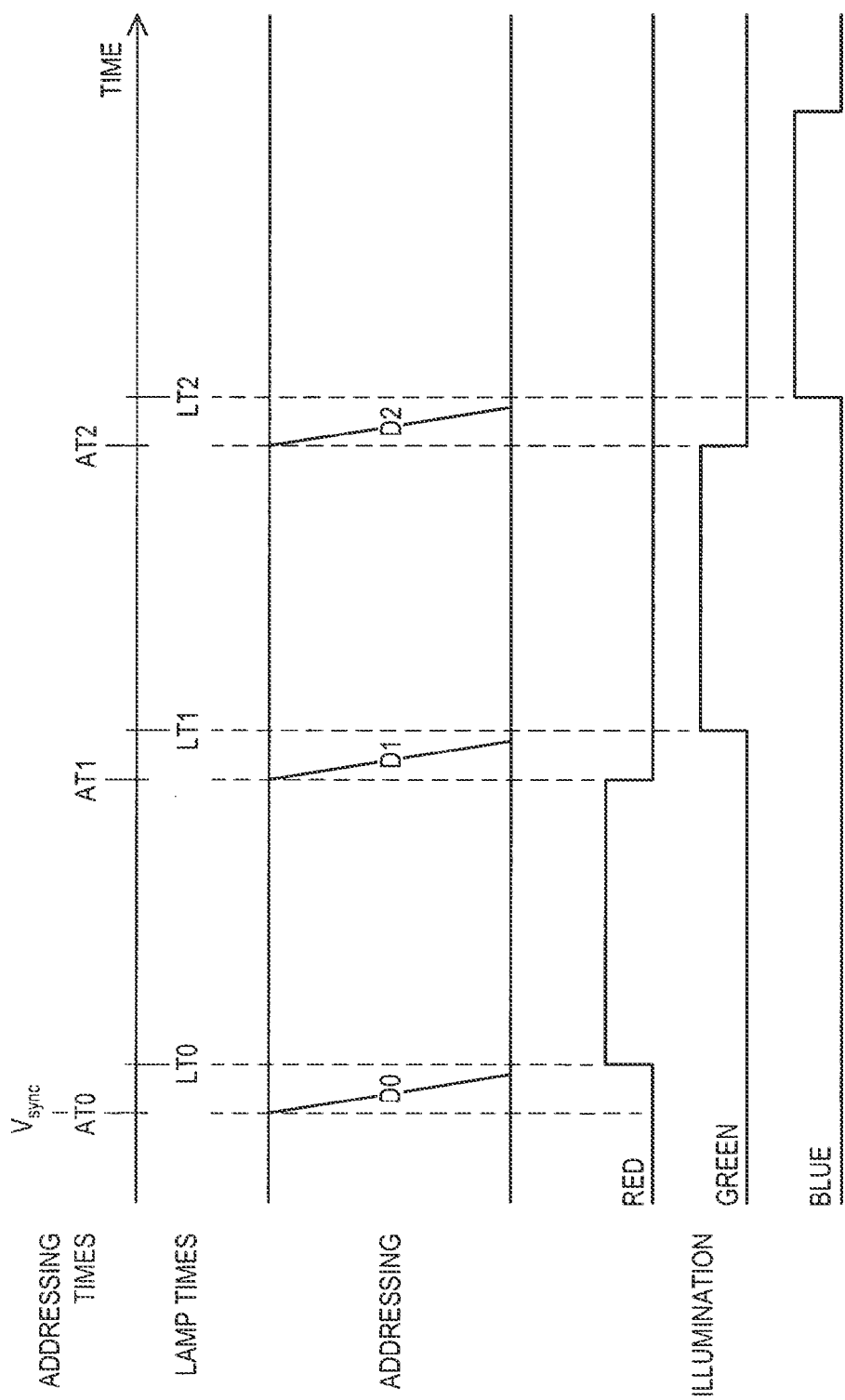
FIG. 4 is a timing diagram for a method of displaying an image on a display using a field sequential color technique.
Figure 7:
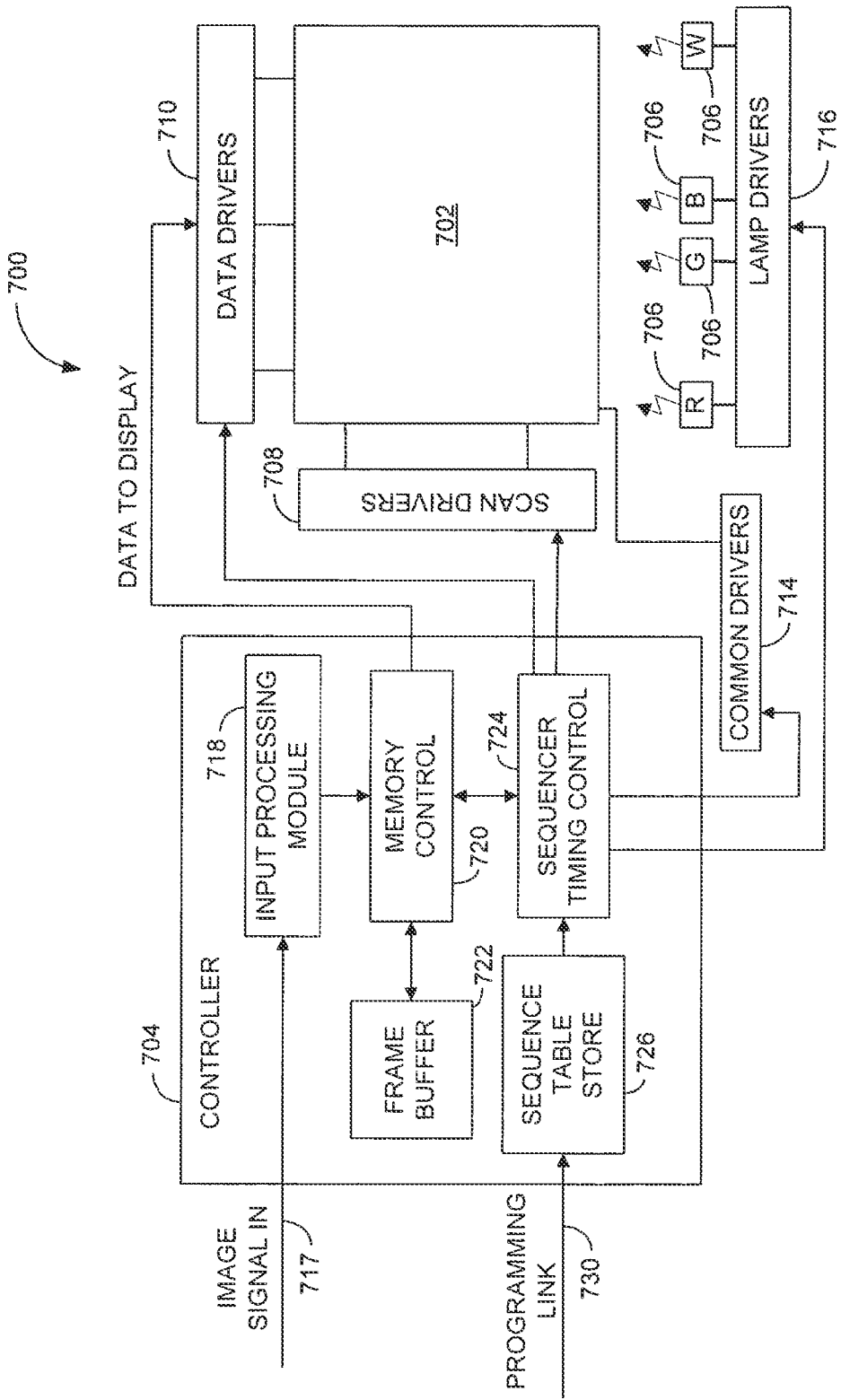
FIG. 7 is a block diagram of a display apparatus, according to an illustrative embodiment of the invention.

FIG. 4 is a timing diagram 400 corresponding to a display process for displaying images using field sequential color, which can be implemented according to an illustrative embodiment of the invention, for example, by a MEMS direct-view display described in FIG. 7. The timing diagrams included herein, including the timing diagram 400 of FIG. 4, conform to the following conventions. The top portions of the timing diagrams illustrate light modulator addressing events. The bottom portions illustrate lamp illumination events.

The addressing portions depict addressing events by diagonal lines spaced apart in time. Each diagonal line corresponds to a series of individual data loading events during which data is loaded into each row of an array of light modulators, one row at a time. Depending on the control matrix used to address and drive the modulators included in the display, each loading event may require a waiting period to allow the light modulators in a given row to actuate. In some implementations, all rows in the array of light modulators are addressed prior to actuation of any of the light modulators. Upon completion of loading data into the last row of the array of light modulators, all light modulators are actuated substantially simultaneously. One method for such actuation is described further in relation to FIG. 11.

Lamp illumination events are illustrated by pulse trains corresponding to each color of lamp included in the display. Each pulse indicates that the lamp of the corresponding color is illuminated, thereby displaying the sub-frame image loaded into the array of light modulators in the immediately preceding addressing event.

The time at which the first addressing event in the display of a given image frame begins is labeled on each timing diagram as AT0. In most of the timing diagrams, this time falls shortly after the detection of a voltage pulse vsync, which precedes the beginning of each video frame received by a display. The times at which each subsequent addressing event takes place are labeled as AT1, AT2, . . . AT(n−1), where n is the number of sub-frame images used to display the image frame. In some of the timing diagrams, the diagonal lines are further labeled to indicate the data being loaded into the array of light modulators. For example, in the timing diagrams of FIGS. 4 and 5, D0 represents the first data loaded into the array of light modulators for a frame and D(n−1) represents the last data loaded into the array of light modulators for the frame. In the timing diagrams of FIGS. 10, 12-17 and 19, the data loaded during each addressing event corresponds to a bitplane.

Figure 6B:
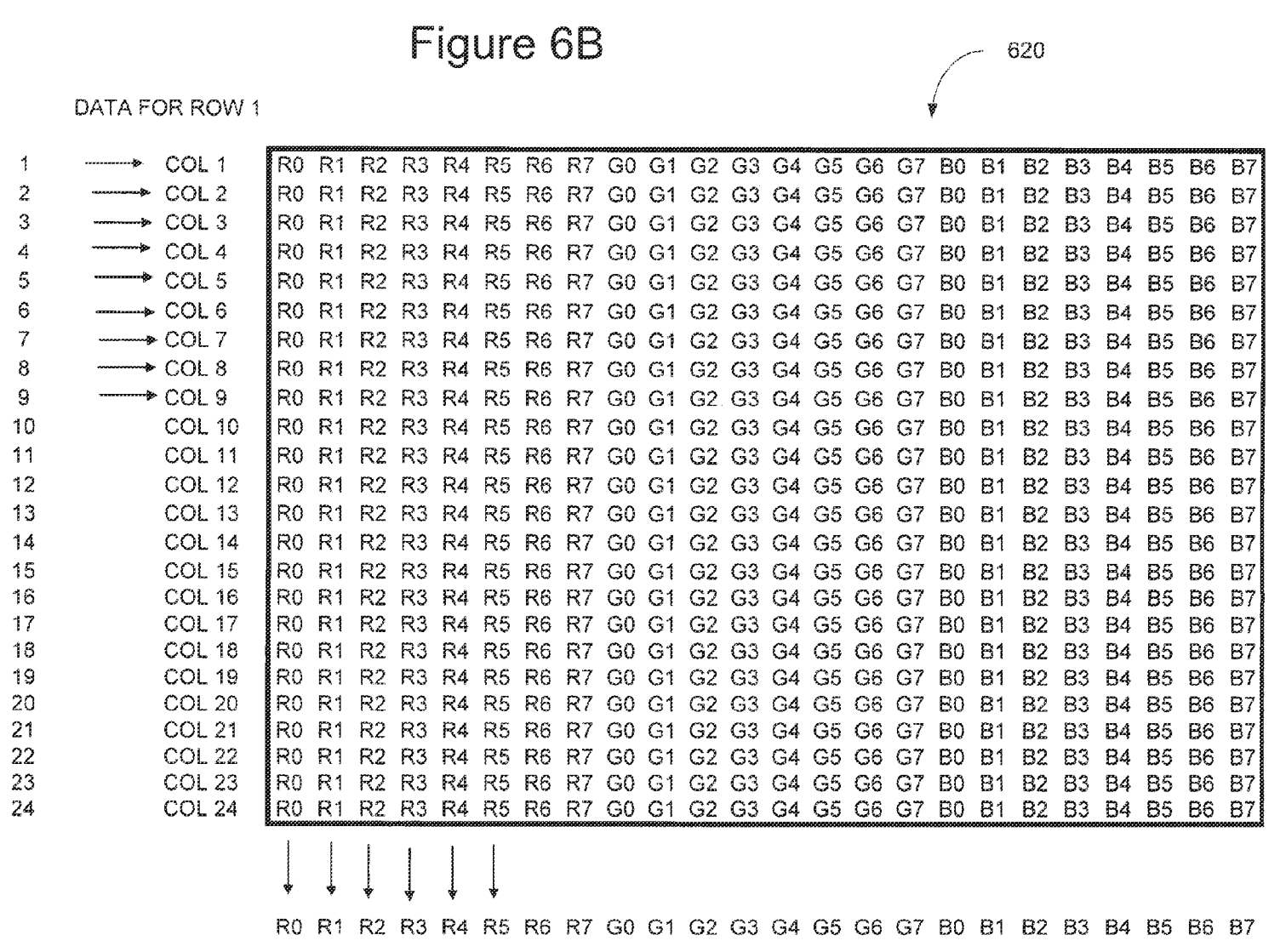

As described in further detail in relation to FIGS. 6A-6C, a bitplane is a coherent set of data identifying desired modulator states for modulators in multiple rows and multiple columns of an array of light modulators. Moreover, each bitplane corresponds to one of a series of sub-frame images derived according to a binary coding scheme. That is, each sub-frame image for a color component of an image frame is weighted according to a binary series 1, 2, 4, 8, 16, etc. The bitplane with the lowest weighting is referred to as the least significant bitplane and is labeled in the timing diagrams and referred to herein by the first letter of the corresponding color component followed by the number 0. For each next-most significant bitplane for the color components, the number following the first letter of the color component increases by one. For example, for an image frame broken into 4 bitplanes per color, the least significant red bitplane is labeled and referred to as the R0 bitplane. The next most significant red bitplane is labeled and referred to as R1, and the most significant red bitplane is labeled and referred to as R3.

Lamp-related events are labeled as LT0, LT1, LT2 . . . LT(n−1). The lamp-related event times labeled in a timing diagram, depending on the timing diagram, either represent times at which a lamp is illuminated or times at which a lamp is extinguished. The meaning of the lamp times in a particular timing diagram can be determined by comparing their position in time relative to the pulse trains in the illumination portion of the particular timing diagram. Specifically referring back to the timing diagram 400 of FIG. 4, to display an image frame according to the timing diagram 400, a single sub-frame image is used to display each of three color components of an image frame. First, data, D0, indicating modulator states desired for a red sub-frame image are loaded into an array of light modulators beginning at time AT0. After addressing is complete, the red lamp is illuminated at time LT0, thereby displaying the red sub-frame image. Data, D1, indicating modulator states corresponding to a green sub-frame image are loaded into the array of light modulators at time AT1. A green lamp is illuminated at time LT1. Finally, data, D2, indicating modulator states corresponding to a blue sub-frame image are loaded into the array of light modulators and a blue lamp is illuminated at times AT2 and LT2, respectively. The process then repeats for subsequent image frames to be displayed.

The level of gray scale achievable by a display that forms images according to the timing diagram of FIG. 4 depends on how finely the state of each light modulator can be controlled. For example, if the light modulators are binary in nature, i.e., they can only be on or off, the display will be limited to generating 8 different colors. The level of gray scale can be increased for such a display by providing light modulators than can be driven into additional intermediate states. In some embodiments related to the field sequential technique of FIG. 4, MEMS light modulators can be provided which exhibit an analog response to applied voltage. The number of grayscale levels achievable in such a display is limited only by the resolution of digital to analog converters which are supplied in conjunction with data voltage sources, such as voltage source 309.

Alternatively, finer grayscale can be generated if the time period used to display each sub-frame image is split into multiple time periods, each having its own corresponding sub-frame image. For example, with binary light modulators, a display that forms two sub-frame images of equal length and light intensity per color component can generate 27 different colors instead of 8. Gray scale techniques that break each color component of an image frame into multiple sub-frame images are referred to, generally, as time division gray scale techniques.

Figure 5:
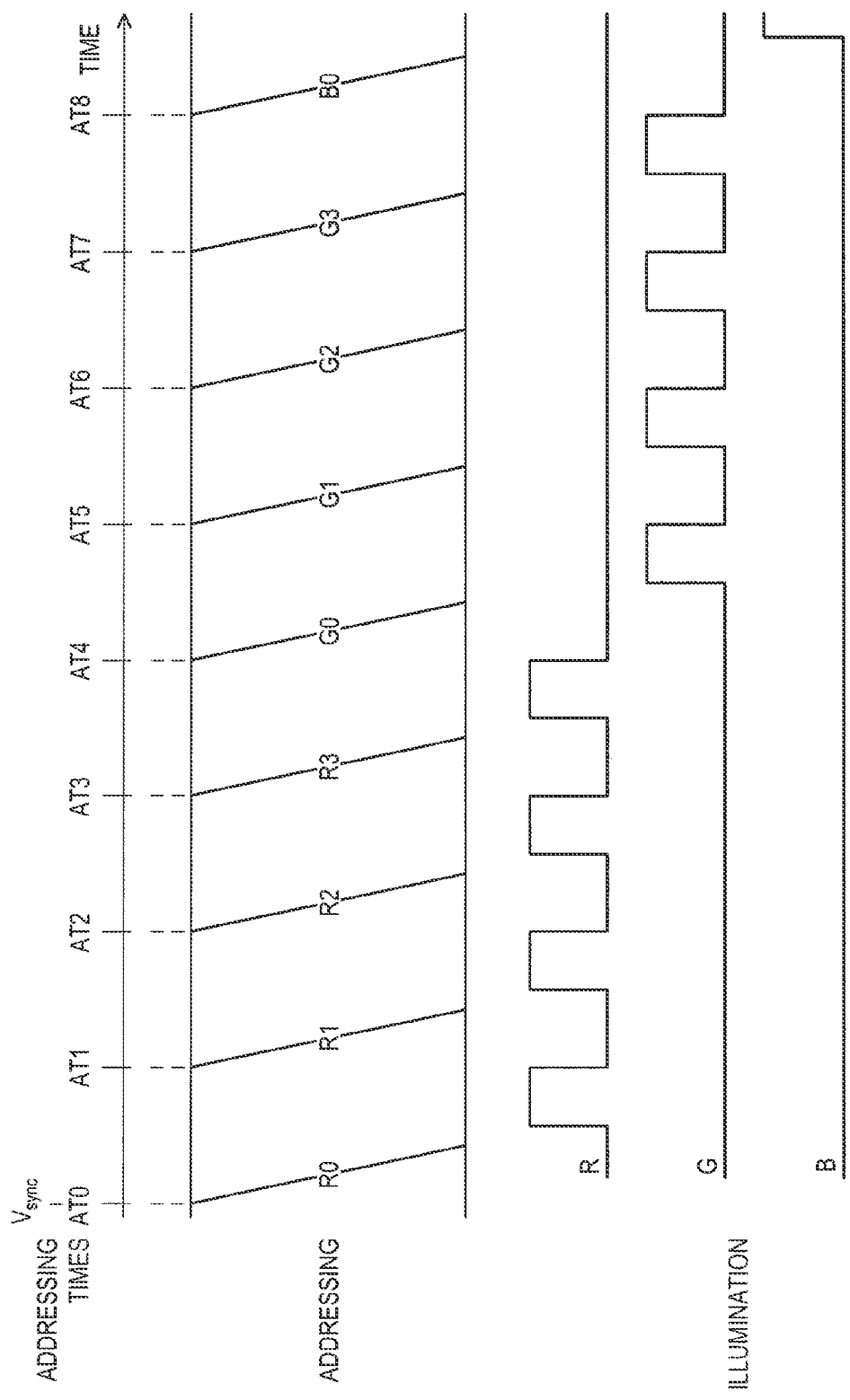
FIG. 5 is a timing diagram for a method of displaying an image on a display using a time-division gray scale technique.

FIG. 5 is a timing diagram corresponding to a display process for displaying an image frame by displaying multiple equally weighted sub-frame images per color that can be implemented by various embodiments of the invention. In the timing diagram of FIG. 5, each color component of an image frame is divided into four equally weighted sub-frame images. More particularly, each sub-frame image for a given color component is illuminated for the same amount of time at the same lamp intensity. Thus, the number portion of the data identifier (e.g., R0, R1, or G3) only refers to the order in which the corresponding sub-frame image is displayed, and not to any weighting value. Assuming the light modulators are binary in nature, a display utilizing this grayscale technique can generate 5 gray scale levels per color or 125 distinct colors.

More specifically, first, data, R0, indicating modulator states desired for a first red sub-frame image are loaded into an array of light modulators beginning at time AT0. After the light modulators have achieved the states indicated by data R0, the red lamp is illuminated, thereby displaying the first red sub-frame image. The red lamp is extinguished at time AT1, which is when data, R1, indicating modulator states corresponding to the next red sub-frame image are loaded into the array of light modulators. The same steps repeat for each red sub-frame image corresponding to data R1, R2 and R3. The steps as described for the red sub-frame images R0-R3 then repeat for the green sub-frame images G0-G3, and then for the blue sub-frame images B0-B3. The process then repeats for subsequent image frames to be displayed. The addressing times in FIG. 5 can be established through a variety of methods. Since the data is loaded at regular intervals, and since the sub-frame images are illuminated for equal times, a fixed clock cycle running with a frequency 12 times that of the vsync frequency can be sufficient for coordinating the display process.

By contrast to the timing diagram shown in FIG. 5, which employs equal-weighting for each of 4 sub-frame images per color, other display processes made possible by this invention employ unequal illumination weightings between sub-frame images. Such unequal weightings enable a coded time division gray scale technique wherein much larger numbers of gray scale levels can be displayed with the same number of sub-frame images. Display processes using coded time division gray scale, in some cases, utilizes bitplanes to implement a binary weighting scheme of sub-frame images. FIGS. 6A-6C depict a process for generating a bitplane, according to an illustrative embodiment of the invention. FIG. 6A is a schematic diagram of a digital image signal 600 received by a display device. The image signal 600 encodes data corresponding to image frames. For a given image frame encoded in the image signal 600, the image signal 600 includes a series of bits for each pixel included in the image frame. The data is encoded in a pixel-by-pixel fashion. That is, the image signal includes all data for the color of a single pixel in the image frame before it includes data for the next pixel.

For example, in FIG. 6A, the data for an image frame begins with a vsync signal indicating the beginning of the image frame. The image signal 600 then includes, for example, 24 bits indicating the color of the pixel in the first row of the first column of the image frame. Of the 24 bits, 8 encode a red component of the pixel, 8 encode a green component, and 8 encode a blue component of the pixel. Each set of eight bits is referred to as a coded word. An eight bit coded word for each color enables a description of 256 unique brightness levels for each color, or 16 million unique combinations of the colors red, green, and blue. Within the coded word, each of the 8 bits represents a particular position or place value (also referred to as a significance value) in the coded word. In FIG. 6A, these place values are indicated by a coding scheme such as R0, R1, R2, R3, etc. R0 represents the least significant bit for the color red. R7 represents the most significant bit for the color red. G7 is the most significant bit for the color green, and B7 is the most significant bit for the color blue. Quantitatively, in binary coding, the place values corresponding to R0, R1, R2, . . . R7 are given by the binary series $2^0, 2^1, 2^2, \ldots 2^7$. In other examples, the image signal 600 may include more or fewer bits per color component of an image. For example, the image signal 600 may include 3, 4, 5, 6, 7, 9, 10, 11, 12 or more bits per color component of an image frame.

The data as received in image signal 600 is organized by rows and columns. Generally the image signal provides all of the data for pixels in the first row before proceeding to subsequent rows. Within the first row, all of the data is received for the pixel in the first column before it is received for pixels in succeeding columns of the same row.

FIG. 6B is a schematic diagram of a memory buffer 620 useful for converting a received image signal into a bitplane, according to an illustrative embodiment of the invention. As described above, a bitplane includes data for pixels in multiple columns and multiple rows of a display corresponding to a single significance value of a grayscale coded word for a color component of an image frame. To convert a binary coded image signal, such as image signal 600 of FIG. 6A, into bitplanes, bits having the significance level are grouped together into a single data structure. A small memory buffer 620 is employed to organize incoming image data. The memory buffer 620 is organized in an array of rows and columns, and allows for data to be read in and out in by addressing either individual rows or by addressing individual columns.

Incoming data, which, as described above, is received in a pixel by pixel format, is read into the memory buffer 620 in successive rows. The memory buffer 620 stores data relevant to only a single designated row of the display, i.e. it operates on only a fraction of the incoming data at any given time. Each numbered row within the memory buffer 620 contains complete pixel data for a given column for the designated row. Each row of the memory buffer 620 contains complete gray scale data for a given pixel.

Once the small memory buffer 620 has been loaded with data for all columns of a given row of the display, the data in the memory buffer 620 can be read out to populate a bitplane data structure. The data is read out column by column. Each column includes a single place value of the gray scale code word of the pixels row of the display. These values correspond to desired states of light modulators in the display. For example, a 0 may refer to an "open" light modulator state and 1 may refer to a "closed" light modulator state, or visa versa. This process repeats for multiple rows in the display.

FIG. 6C is a schematic diagram of portions of two bitplanes 650 and 660, according to an illustrative embodiment of the invention. The first bitplane 650 includes data corresponding to the least significant bits of the gray scale coded words identifying the level of red (i.e., R0 values) for the first 10 columns and 15 rows of pixels of a display. The second bitplane 660 includes data corresponding to the second-least significant bits of the gray scale coded words identifying the level of red (i.e., R1) for the same 10 columns and 15 rows of pixels of the display.

Alternative weighting schemes are available within the method of coded time division gray scale. Binary coding is appropriate where the spatial light modulators allow only two states, e.g. open or closed or e.g. on or off. A ternary weighting system is also a possibility. For instance a spatial light modulator and associated control matrix could allow for three unique states of light transmission or reflection. These could be closed, ½ open, and full open. MEMS-based modulators could, for instance, be constructed where the ½ open and full open states result from the application of distinct actuation voltages. Alternatively, the ½ open state could be achieved through the actuation of only one out of two equal-area MEMS modulators which are supplied in each pixel.

A sub-frame data set will refer herein to the general case of data structures which are not necessarily bitplanes: namely data structures that store information about the desired states of modulators in multiple rows and multiple columns of the array. For the case of ternary coding a single sub-frame data set would include a ternary number value for each of the pixels in multiple rows and columns, e.g. a 0, 1, or 2. Sequential sub-frame images according to a ternary coding scheme would be weighted according to the base-3 numbering system, with weights in the series 1,3,9,27, etc. Compared to a binary coding system, a ternary coding system makes possible even greater numbers of achievable gray scale levels when displayed using an equal number of sub-frame images. By extension, as MEMS pixels or modulators are developed capable of 4 or 5 unique modulation states at each pixel, the use of quaternary or base-5 coding systems become advantageous in the control system.

FIG. 7 is a block diagram of a direct-view display 700, according to an illustrative embodiment of the invention. The direct-view display 700 includes an array of light modulators 702, a controller 704, a set of lamps 706, and driver sets 708, 710, 714, and 716. The array of light modulators 702 includes lights modulators arranged in rows and columns. Suitable light modulators include, without limitation, any of the MEMS-based light modulators described above in relation to FIGS. 2A-2D. In one implementation, the array of light modulators 702 takes the form of the array of light modulators 320 depicted in FIG. 3B. The light modulators are be controlled by a control matrix, such as the control matrices described in FIGS. 3A and 3D.

In general, the controller receives an image signal 717 from an external source and generates outputs data and control signals to the drivers 708, 710, 714, and 716 to control the light modulators in the array of light modulators 702 and the lamps 706. The order in which the data and control signals are output is referred to herein as an "output sequence," described further below More particularly, the controller 704 includes an input processing module 718, a memory control module 720, a frame buffer 722, a timing control module 724, and a schedule table store 726.

A module may be implemented as a hardware circuit including application specific integrated circuits, custom VLSI circuits or gate arrays, off-the-shelf semiconductors such as logic chips, memories, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more physical or logical blocks of computer instructions which may, for instance, be organized as an object, procedure, or function. Nevertheless, the executables of an identified module need not be physically located together, but may include disparate instructions stored in different locations which, when joined logically together, make up the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The illustration of direct view display 700 in FIG. 7 portrays the controller 704 and drivers 708, 710, 714, and 716 as separate functional blocks. These blocks are understood to represent distinguishable circuits and/or modules of executable code. In some implementations the blocks 704, 708, 710, 714, and 716 may be provided as distinct chips or circuits which are connected together by means of circuit boards and/or cables. In other implementations, several of these blocks can be designed together into a single semiconductor chip such that their boundaries are nearly indistinguishable except by function. In some implementations the storage area referred to as frame buffer 722 is provided as a functional area within a custom design of the controller circuit 704. In other implementations the frame buffer 722 is represented by a separate off-the-shelf memory chip such as a DRAM or SRAM.

The input processing module 718 receives the image signal 717 and processes the data encoded therein into a format suitable for displaying via the array of light modulators 702. The input processing module 718 takes the data encoding each image frame and converts it into a series of sub-frame data sets. A sub-frame data set includes information about the desired states of modulators in multiple rows and multiple columns of the array of light modulators 702 aggregated into a coherent data structure. The number and content of sub-frame data sets used to display an image frame depends on the grayscale technique employed by the controller 704. For example, the sub-frame data sets needed to form an image frame using a coded time-division gray scale technique differs from the number and content of sub-frame data sets used to display an image frame using a non-coded time division gray scale technique. While in various embodiments, the image processing module 718 may convert the image signal 717 into non-coded sub-frame data sets, ternary coded sub-frame data sets, or other form of coded sub-frame data set, preferably, the image processing module 718 converts the image signal 717 into bitplanes, as described above in relation to FIGS. 6A-6C.

In addition to and in many cases prior to deriving the sub-frame data sets, the input processing module can carry out a number of other optional processing tasks. It may reformat or interpolate incoming data. For instance, it may rescale incoming data horizontally, vertically, or both, to fit within the spatial-resolution limits of modulator array 702. It may also convert incoming data from an interlaced format to a progressive scan format. It may also resample the incoming data in time to reduce frame rates while maintaining acceptable flicker within the characteristics of MEMS display 700. It may perform adjustments to contrast gradations of the incoming data, in some cases referred to as gamma corrections, to better match the gamma characteristics and/or contrast precision available in the MEMS display 700. It may alter the grayscale levels assigned between neighboring pixels (spatial dithering) and/or assigned between succeeding image frames (temporal dithering) to enhance the gray scale precision available in the display. And it may perform adjustments to color values expressed in the pixel data. In one instance of color adjustment, the data is transformed to match the color coordinates of the lamps 706 used in display 700. For embodiments where four or more distinct-color lamps are employed, the input processing module will transform the data from an incoming 3-color space and map it to coordinates appropriate to the 4-color space.

The input processing module 718 outputs the sub-frame data sets to the memory control module 720. The memory control module 720 then stores the sub-frame data sets in the frame buffer 722. The frame buffer is preferably a random access memory, although other types of serial memory can be used without departing from the scope of the invention. The memory control module 720, in one implementation, stores the sub-frame data set in a predetermined memory location based on the color and significance in a coding scheme of the sub-frame data set. In other implementations, the memory control module 720 stores the sub-frame data set in a dynamically determined memory location and stores that location in a lookup table for later identification. In one particular implementation, the frame buffer 722 is configured for the storage of bitplanes.

The memory control module 720 is also responsible for, upon instruction from the timing control module 724, retrieving sub-image data sets from the frame buffer 722 and outputting them to the data drivers 708. The data drivers 708 load the data output from the memory control module 720 into the light modulators of the array of light modulators 702. The memory control module 720 outputs the data in the sub-image data sets one row at a time. In one implementation, the frame buffer 722 includes two buffers, whose roles alternate. While the memory control module 720 stores newly generated bitplanes corresponding to a new image frame in one buffer, it extracts bitplanes corresponding to the previously received image frame from the other buffer for output to the array of light modulators 702. Both buffer memories can reside within the same circuit, separated only by address.

The timing control module 724 manages the output by the controller 704 of data and command signals according to an output sequence. The output sequence includes the order and timing with which sub-frame data sets are output to the array of light modulators 702 and the timing and character of illumination events. The output sequence, in some implementations, also includes global actuation events. At least some of the parameters that define the output sequence are stored in volatile memory. This volatile memory is referred to as schedule table store 726. A table including the data stored in the schedule table store 726 is referred to herein as a "schedule table" or alternately as a "sequence table". The data stored therein need not actually be stored in table format. Conceptually, the data stored in the schedule table store 726 is easier for a human to understand if displayed in table format. The actual data structure used to store output sequence data can be, for example a series of bit strings. Each string of bits includes a series of coded words corresponding to timing values, memory, addresses, and illumination data. An illustrative data structure for storing output sequence parameters is described further in relation to FIG. 24. Other data structures may be employed without departing from the scope of the invention.

Some output sequence parameters may be stored as hardwired logic in the timing control module 724. For example, the logic incorporated into the timing control module to wait until a particular event time may be expressed as follows:

```
mycount <= mycount + 1;
if mycount = 1324 then
    triggersignal <= '1';
else
    triggersignal <= '0';
```

This logic employs a counter which increments at every clock cycle. When the clock counter reaches the timing value 1324 a trigger signal is sent. For example, the trigger signal may be sent to the memory control module 720 to initiate the loading of a bitplane into the modulators. Or, the trigger signal could be sent to lamp driver 706 to switch the lamp on or off. In the example above, the logic takes the form of logic circuitry built directly into the timing control module 724. The particular timing parameter 1324 is a scalar value contained within the command sequence. In another implementation of timing control module 724, the logic does not include a specific value for a number of clock pulses to wait, but refers instead to one of a series of timing values which are stored in schedule stable store 726.

The output sequence parameters stored in the schedule table store 726 vary in different embodiments of the invention. In one embodiment, the schedule table store 726 stores timing values associated with each sub-frame data set. For example, the schedule table store 726 may store timing values associated with the beginning of each addressing event in the output sequence, as well as timing values associated with lamp illumination and/or lamp extinguishing events. In other embodiments, the schedule table store 726 stores lamp intensity values instead of or in addition to timing values associated with addressing events. In various embodiments, the schedule table store 726 stores an identifier indicating where each sub-image data set is stored in the frame buffer 722, and illumination data indicating the color or colors associated with each respective sub-image data set.

The nature of the timing values stored in the schedule table store 726 can vary depending on the specific implementation of the controller 704. The timing value, as stored in the schedule table store 726, in one implementation, is a number of clock cycles, which for example, have passed since the initiation of the display of an image frame, or since the last addressing or lamp event was triggered. Alternatively, the timing value may be an actual time value, stored in microseconds or milliseconds.

Table 1 is an illustrative schedule table illustrating parameters suitable for storage in the schedule table store 726 for use by the timing control module 724. Several additional illustrative schedule tables are described in further detail in relation to FIGS. 13, 14A-B, 15-17 and 19.

TABLE 1

Schedule Table 1

| | Field 1 | Field 2 | Field 3 | Field 4 | Field 5 | Field 6 | Field 7 | - - - | Field n − 1 | Field n |
|---|---|---|---|---|---|---|---|---|---|---|
| addressing time | AT0 | AT1 | AT2 | AT3 | AT4 | AT5 | AT6 | - - - | AT(n − 1) | ATn |
| memory location of sub-frame data set | M0 | M1 | M2 | M3 | M4 | M4 | M6 | - - - | M(n − 1) | Mn |
| lamp ID | R | R | R | R | G | G | G | - - - | B | B |
| lamp time | LT0 | LT1 | LT2 | LT3 | LT4 | LT5 | LT6 | - - - | LT(n − 1) | LTn |

The Table 1 schedule table includes two timing values for each sub-frame data set, an addressing time and a lamp illumination time. The addressing times AT0-AT(n−1) are associated with times at which the memory control module 720 outputs a respective sub-frame data set, in this case a bitplane, to the array of light modulators 702. The lamp illumination times LT0-LT(n−1) are associated with times at which corresponding lamps are illuminated. In fact, each time value in the schedule table may trigger more than one event. For example, in some grayscale techniques, lamp activity is synchronized with the actuation of the light modulators to avoid illuminating the light modulators while they are not in an addressed state. Thus, in some implementations, the addressing times AT, not only trigger addressing events, they also trigger lamp extinguishing events. Similarly, in other implementations, lamp extinguishing events also trigger addressing events.

The address data, labeled in the table as "memory location of sub-frame data set," in the schedule table can be stored in a number of forms. For example, in one implementation, the address is a specific memory location in the frame buffer of the beginning of the corresponding bitplane, referenced by buffer, column, and row numbers. In another implementation, the address stored in the schedule table store 726 is an identifier for use in conjunction with a look up table maintained by the memory control module 720. For example, the identifier may have a simple 6-bit binary "xxxxxx" word structure where the first 2 bits identify the color associated with the bitplane, while the next 4 bits refer to the significance of the bitplane. The actual memory location of the bitplane is then stored in a lookup table maintained by the memory control module 720 when the memory control module 720 stores the bitplane into the frame buffer. In other implementations the memory locations for bitplanes in the output sequence may be stored as hardwired logic within the timing control module 724.

The timing control module 724 may retrieve schedule table entries using several different methods. In one implementation the order of entries in the schedule table is fixed; the timing control module 724 retrieves each entry in order until reaching a special entry that designates the end of the sequence. Alternatively, a sequence table entry may contain codes that direct the timing control module 724 to retrieve an entry which may be different from the next entry in the table. These additional fields may incorporate the ability to perform jumps, branches, and looping in analogy with the control features of a standard microprocessor instruction set. Such flow control modifications to the operation of the timing control module 724 allow a reduction in the size of the sequence table.

The direct-view display 700 also includes a programming link 730. The programming link 730 provides a means by which the schedule table store 726 may be modified by external circuits or computers. In other embodiments the programming link connects directly to a system processor within the same housing as the direct view display 700. The system processor may be programmed to alter the schedule table store in accordance with the type of image or data to be displayed by display 700. The external processor, using the programming link 730, can modify the parameters stored in the schedule table store 726 to alter the output sequence used by the controller 704. For example, the programming link 730 can be used to change the timing parameters stored in the schedule table store 726 to accommodate different frame rates. The timing parameters associated with each bitplane and the number of bitplanes displayed can be modified by the programming link 730 to adjust the number of colors or grayscale the display can provide. Average brightness can be adjusted by changing lamp intensity values. Color saturation can be modified by the programming link by altering percentage of brightness formed using a white color field or by adjusting color mixing (described further in relation to FIG. 17).

The direct-view display includes a set of lamps 706 for illuminating the array of light modulators 702. In one implementation, the direct-view display 700 includes a red lamp, a green lamp, and a blue lamp. In another implementation, the direct-view display 700 also includes a white lamp. In still another implementation, the direct-view display 700 includes multiple lamps for each color spaced along a side of the array of light modulators 702.

In addition to the red, green, blue, white color combination, other lamp combinations are possible which expand the space or gamut of achievable colors. A useful 4-color lamp combination with expanded color gamut is red, blue, true green (about 520 nm) plus parrot green (about 550 nm). Another 5-color combination which expands the color gamut is red, green, blue, cyan, and yellow. A 5-color analogue to the well known YIQ color space can be established with the lamps white, orange, blue, purple, and green. A 5-color analog to the well known YUV color space can be established with the lamps white, blue, yellow, red, and cyan.

Other lamp combinations are possible. For instance, a useful 6-color space can be established with the lamp colors red, green, blue, cyan, magenta, and yellow. A 6-color space can also be established with the colors white, cyan, magenta, yellow, orange, and green. A large number of other 4-color and 5-color combinations can be derived from amongst the colors already listed above. Further combinations of 6, 7, 8 or 9 lamps with different colors can be produced from the colors listed above, Additional colors may be employed using lamps with spectra which lie in between the colors listed above.

The direct-view display 700 also includes a number of sets of driver circuits 708, 710, 714, and 716 controlled by, and in electrical communication with the various components of the controller 704. The direct-view display 700 includes a set of scan drivers 708 for write-enabling each of the rows of the array of light modulators in sequence. The scan drivers 708 are controlled by, and in electrical communication with the timing control module 724. Data drivers 710 are in electrical communication with the memory control 720. The direct-view display 700 may include one driver circuit 710 for each column in the array of light modulators 702, or it may have some smaller number of data drivers 710, each responsible for loading data into multiple columns of the array of light modulators 702.

The direct-view display 700 includes a series of common drivers 714, including global actuation drivers, actuation voltage drivers, and, in some embodiments, additional common voltage drivers. Common drivers 714 are in electrical communication with the timing control module 720 and light modulators in multiple rows and multiple columns of the array of light modulators 702.

The lamps 706 are driven by lamp drivers 716. The lamps may be in electrical communication both with the memory control module 720 and/or the timing control module 724. The timing control module 724 controls the timing of the illumination of the lamps 706. Illumination intensity information may also be supplied by the timing control module 724, or it may be supplied by the memory control module 720.

Some electronic devices employing displays according to this invention employ variations on the design of controller 704. For such displays the controller does not include an input processing module or a frame buffer. Instead the system processor attached to the electronic device provides a pre-formatted output sequence of bitplanes for display by the controller, drivers, and the array of MEMS light modulators. In such a display the timing control module coordinates the output of bitplane data for the array of modulators and controls the illumination of lamps associated with each bitplanes. The timing control module may make reference to a schedule table store, within which are stored timing values for addressing and lamp events and/or lamp intensities associated with each of the bitplanes.

Figure 8:
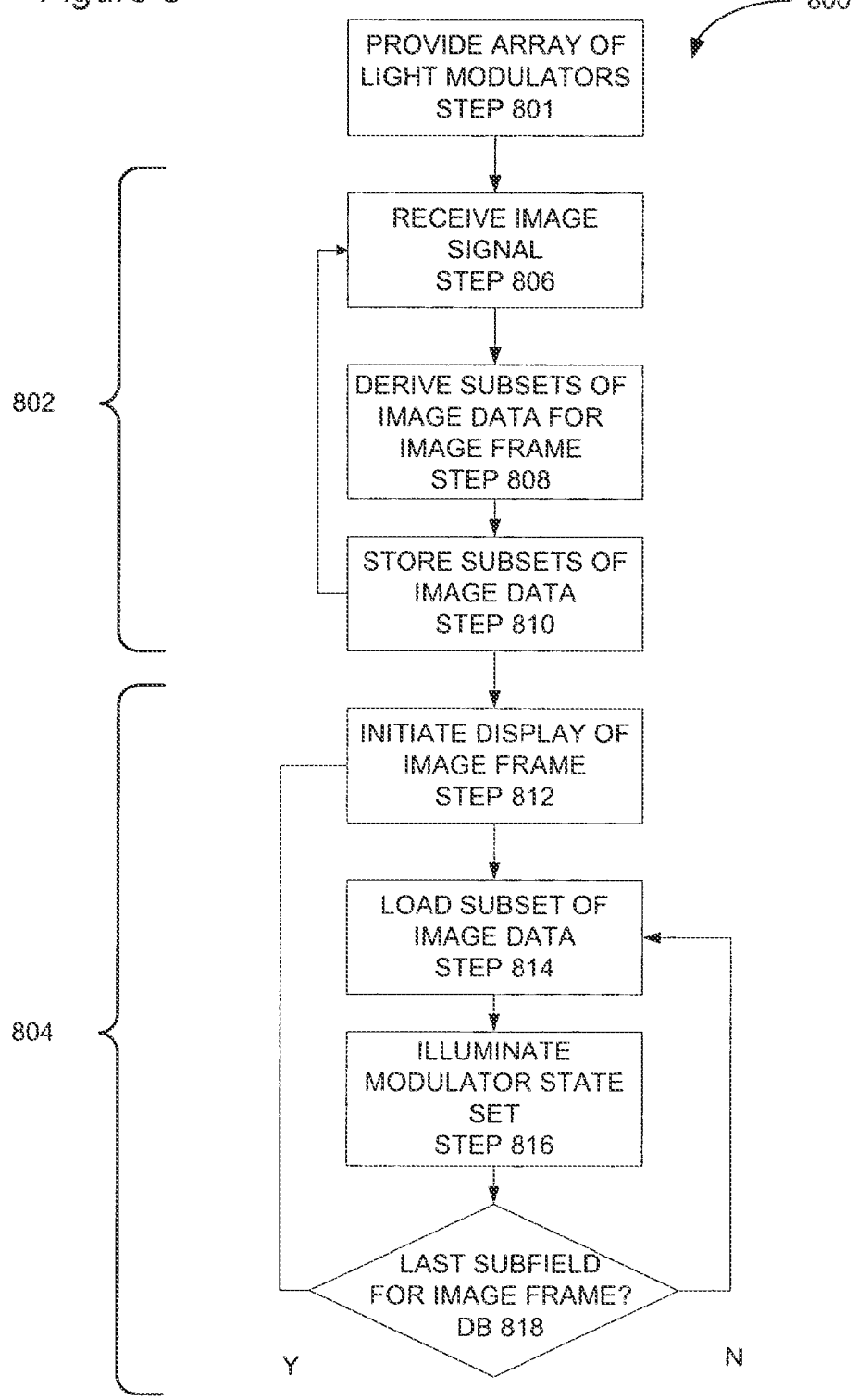
FIG. 8 is a flow chart of a method of displaying images suitable for use by the display apparatus of FIG. 6, according to an illustrative embodiment of the invention.

FIG. 8 is a flow chart of a method of displaying video 800 (the "display method 800") suitable for use by a direct-view display such as the direct-view display 700 of FIG. 7, according to an illustrative embodiment of the invention. Referring to FIGS. 7 and 8, the display method 800 begins with the provision of an array of light modulators (step 801), such as the array of light modulators 702. Then, the display method 800 proceeds with two interrelated processes, which operate in parallel. The first process is referred to herein as an image processing process 802 of the display method 800. The second process is referred to as a display process 804.

The image processing process 802 begins with the receipt of an image signal (step 806) by the video input 718. As described above, the image signal encodes one or more image frames for display on the direct-view display 700. In one embodiment, the image signal is received as indicated in FIG. 6A. That is, data for each pixel is received sequentially, pixel-by-pixel, row-by-row. The data for a given pixel includes one or more bits for each color component of the pixel.

Upon receipt of data for an image frame (step 806), the controller 704 of the direct-view display 700 derives a plurality of sub-frame data sets for the image frame (step 808). Preferably, the image processing module 718 of the controller 704 derives a plurality of bitplanes based on the data in the image signal 717 as described above in relation to FIGS. 6A-6C. The imaging process continues at step 810, wherein the sub-frame data sets are stored in the memory. Preferably the biplanes are stored in frame buffer 722, according to address information that allows them to be randomly accessed at a later points in the process.

The display process 804 begins with the initiation of the display of an image frame (step 812), for example, in response to the detection of a vsync pulse in the input signal 717. Then, the first sub-frame data set corresponding to the image frame is output by the memory control module 720 (step 814) to the array of light modulators 702 in an addressing event. The memory address of this first sub-frame data set is determined based on data in the schedule table store 726. Preferably, the sub-frame data set is a bitplane. After the modulators addressed in the first sub-frame data set achieve the state indicated in the sub-frame data set, the lamp or lamps corresponding to the sub-frame data set loaded into the light modulators is illuminated (step 816). The time at which the light is illuminated may be governed by a timing value stored in the schedule table store 726 associated with sub-frame image. The lamp remains illuminated until the next time the light modulators in the array of light modulators begin to change state, at which time the lamp is extinguished. The extinguishing time, too, may be determined based on a time value stored in the schedule table store 726. Depending on the addressing technique implemented by the controller 704, the extinguishing time may be before or after the next addressing event begins.

After the array of light modulators is illuminated, but not necessarily before or at the same time the lamp is extinguished, the controller 704 determines, based on the output sequence, whether the recently displayed sub-frame image is the last sub-frame image to be displayed for the image frame (decision block 818). If it is not the last sub-frame image, the next sub-frame data set is loaded into the array of light modulators 702 in another addressing event (step 814). If the recently displayed sub-frame image is the last sub-frame image of an image frame, the controller 704 awaits initiation of the display of a subsequent display initiation event (step 812).

Figure 9:
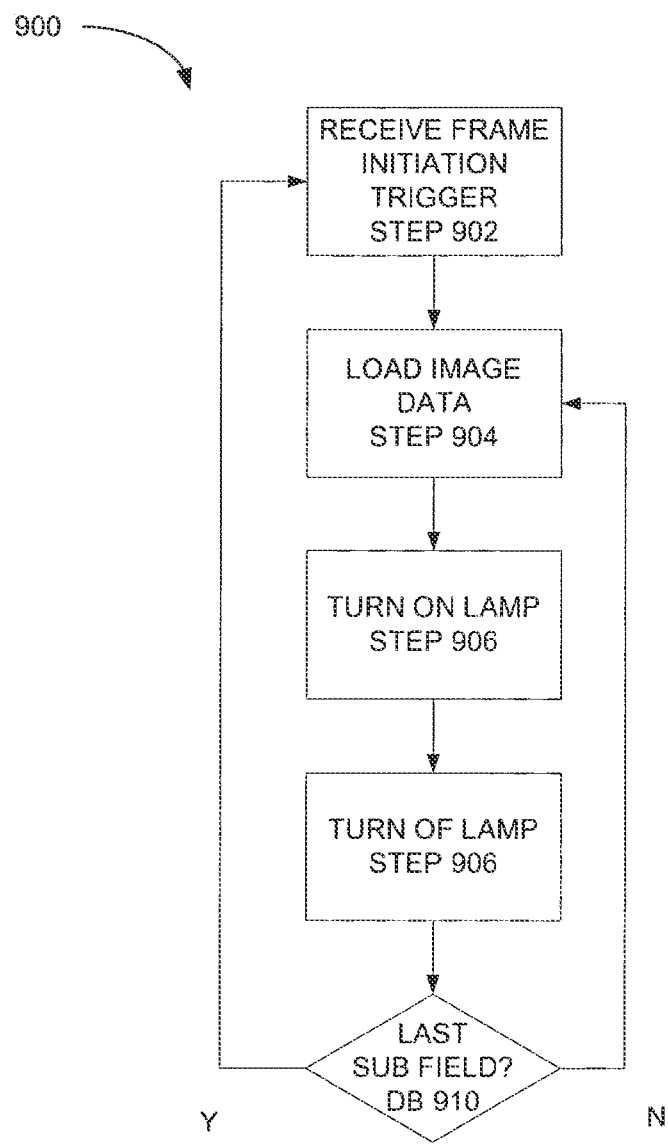
FIG. 9 is a more detailed flow chart of a portion of a first implementation of the method of FIG. 7, according to an illustrative embodiment of the invention.

FIG. 9 is a more detailed flow chart of an illustrative display process 900 suitable for use as part of the display method 800 for displaying images on the direct-view display 700. In the display process 900, the sub-frame data sets employed by the direct-view display are bitplanes. The display process 900 begins with the initiation of the display of an image frame (step 902). For example, the display of an image frame may be initiated (step 902) in response to the detection by the controller 704 of a vsync pulse in the image signal 717. Next, the bitplane corresponding to the image frame is output by the controller 704 to the array of light modulators 702 (step 904). Each row of the sub-frame data set is loaded sequentially. As each row is addressed, the controller 704 waits a sufficient amount of time to ensure the light modulators in the respective row actuate before beginning to address the next row in the array of light modulators 702. During this time, as states of the light modulators in the array of light modulators 702 are in flux, the lamps of the direct-view display 700 remain off.

After waiting a sufficient amount of time to ensure all rows of the array of light modulators 702 have actuated according to the data in the bitplane, the color lamp 702 corresponding to the bitplane is illuminated (step 906), thereby displaying the sub-frame image corresponding to the bitplane loaded into the array of light modulators 702. In one implementation, this waiting time is stored in the schedule table store 726. In other implementations, this waiting time is a fixed value hardwired into the timing control module 724 as a number of clock cycles following the beginning of an addressing event.

The controller then waits a time stored in the schedule table data store 726 associated with the sub-frame image before extinguishing the lamp (step 908). At decision block 910, the controller 704 determines whether the most recently displayed sub-frame image is the last sub-frame image of the image frame being displayed. If the most recently displayed sub-frame image is the last sub-frame image for the image frame, the controller awaits the initiation of the display of a subsequent image frame (step 902). If it is not the last sub-frame image for the image frame, the controller 704 begins loading the next bitplane (step 904) into the array of light modulators 702. This addressing event may be triggered directly by the extinguishing of the lamp at step 908, or it may begin after a time associated with a timing value stored in the schedule table store 726 passes.

Figure 10:
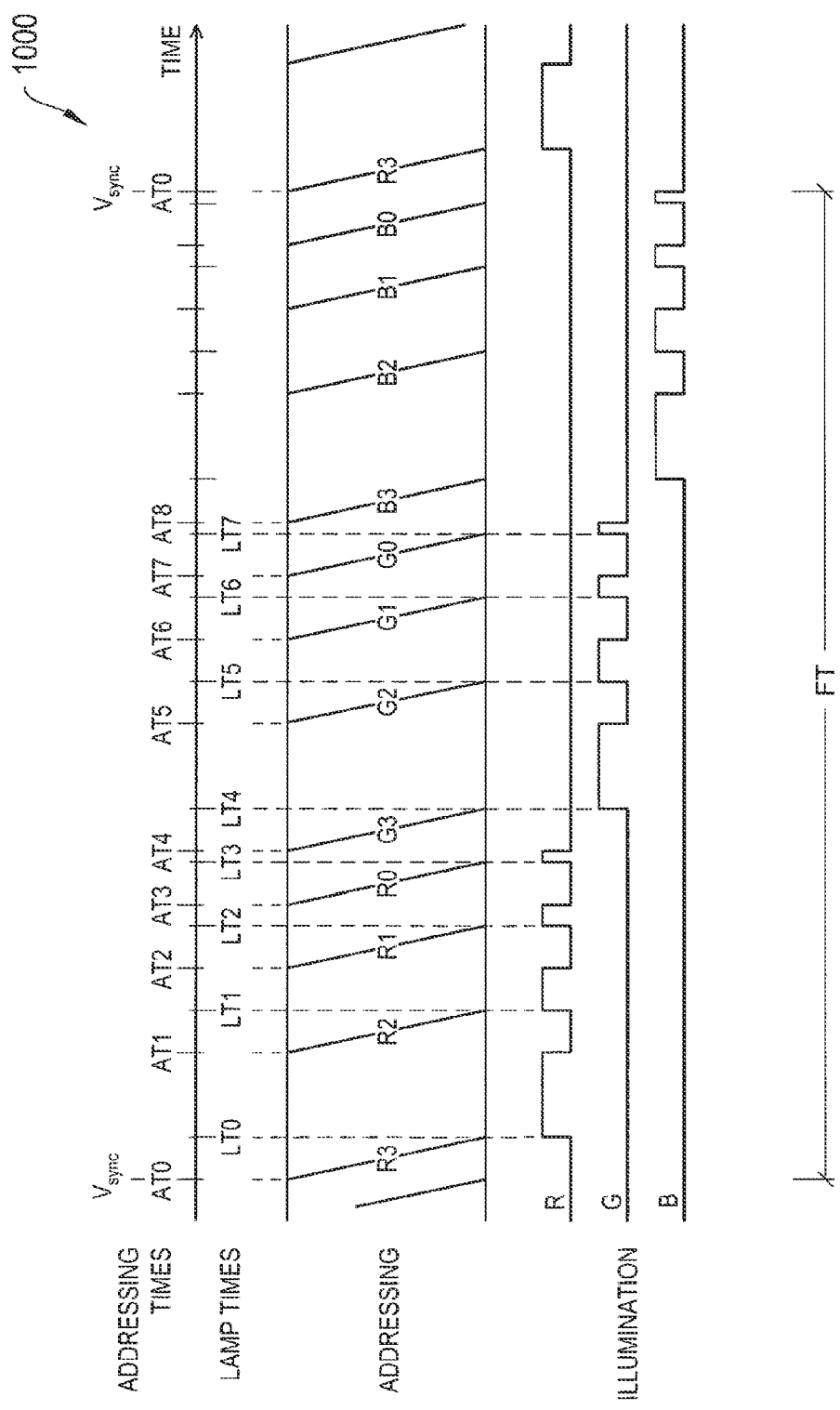
FIG. 10 is a timing diagram illustrating the timing of various image formation events in the method of FIG. 9, according to an illustrative embodiment of the invention.

FIG. 10 is a timing diagram 1000 that corresponds to an implementation of the display process 900 that utilizes an output sequence having as parameters the values stored in the Table 1 schedule table. The timing diagram 1000 corresponds to a coded-time division grayscale display process in which image frames are displayed by displaying four sub-frame images for each of three color components (red, green, and blue) of the image frame. Each sub-frame image displayed of a given color is displayed at the same intensity for half as long a time period as the prior sub-frame image, thereby implementing a binary weighting scheme for the sub-frame images.

The display of an image frame begins upon the detection of a vsync pulse. As indicated on the timing diagram and in the Table 1 schedule table, the first sub-frame data set R3, stored beginning at memory location M0, is loaded into the array of light modulators 702 in an addressing event that begins at time AT0. According to the Table 1 schedule table, the red lamp is then illuminated at time LT0. LT0 is selected such that it occurs after each of the rows in the array of light modulators 702 has been addressed, and the light modulators included therein have actuated. At time AT1, the controller 704 of the direct-view display both extinguishes the red lamp and begins loading the subsequent bitplane, R2, into the array of light modulators 702. According to the Table 1 schedule table, this bitplane is stored beginning at memory location M1. The process repeats until all bitplanes identified in the Table 1 schedule table have been displayed. For example, at time AT4, the controller 704 extinguishes the red lamp and begins loading the most significant green bitplane, G3, into the array of light modulators 702. Similarly at time LT6, the controller 704 turns on the green lamp until time AT7, at which it time it is extinguished again.

The time period between vsync pulses in the timing diagram is indicated by the symbol FT, indicating a frame time. In some implementations the addressing times AT0, AT1, etc. as well as the lamp times LT0, LT1, etc. are designed to accomplish 4 sub-frame images per color within a frame time FT of 16.6 milliseconds, i.e. according to a frame rate of 60 Hz. In other implementations the time values stored in schedule table store 726 can be altered to accomplish 4 sub-frame images per color within a frame time FT of 33.3 milliseconds, i.e. according to a frame rate of 30 Hz. In other implementations frame rates as low as 24 Hz may be employed or frame rates in excess of 100 Hz may be employed.

In the particular implementation of coded time division gray scale illustrated by timing diagram 1000, the controller outputs 4 sub-frame images to the array 702 of light modulators for each color to be displayed. The illumination of each of the 4 sub-frame images is weighted according to the binary series 1,2,4,8. The display process in timing diagram 1000, therefore, displays a 4-digit binary word for gray scale in each color, that is, it is capable of displaying 16 distinct gray scale levels for each color, despite the loading of only 4 sub-images per color. Through combinations of the colors, the implementation of timing diagram 1000 is capable of displaying more than 4000 distinct colors.

In other implementations of display process 800 the sub-frame images in the sequence of sub-frame images need not be weighted according to the binary series 1,2,4,8, etc. As mentioned above, the use of base-3 weighting can be useful as a means of expressing sub-frame data sets derived from a ternary coding scheme. Still other implementations employ a mixed coding scheme. For instance the sub-frame images associated with the least significant bits may be derived and illuminated according to a binary weighting scheme, while the sub-frame images associated with the most significant bits may be derived and illuminated with a more linear weighting scheme. Such a mixed coding helps to reduce the large differences in illumination periods for the most significant bits and is helpful in reducing image artifacts such as dynamic false contouring.

Figure 11:
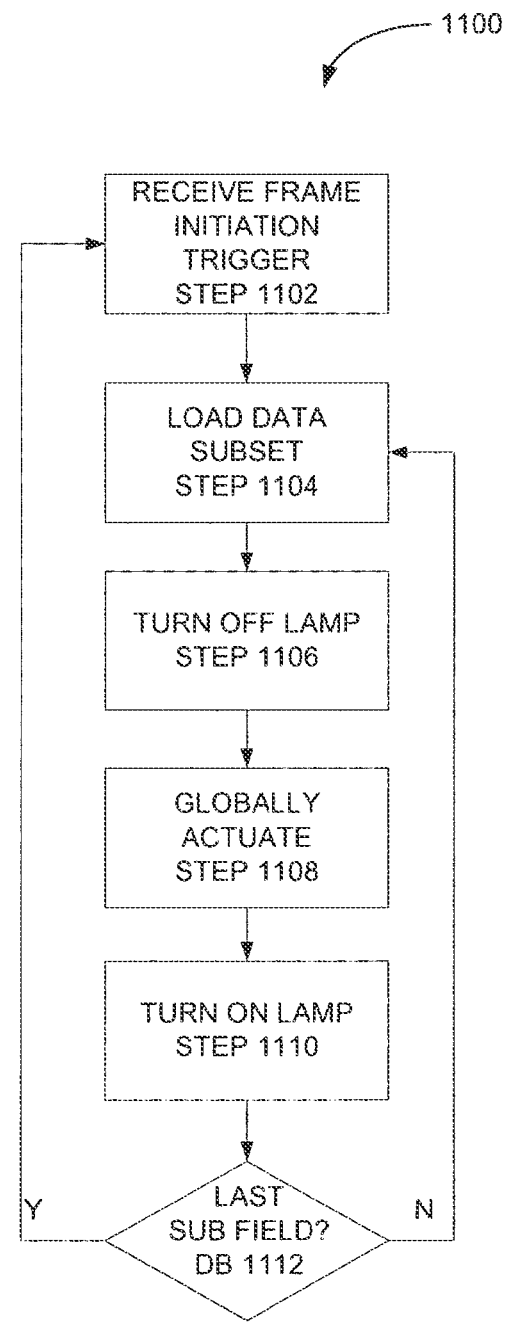
FIG. 11 is a more detailed flow chart of a portion of a second implementation of the method of FIG. 8, according to an illustrative embodiment of the invention.

FIG. 11 is a more detailed flow chart of an illustrative display process 1100 suitable for use as part of the display method 800 for displaying images on the direct-view display 700. As in the display process 900, the display process 1100 utilizes bitplanes for sub-frame data sets. In contrast to display process 900, however, display process 1100 includes a global actuation functionality. In a display utilizing global actuation, pixels in multiple rows and multiple columns of the display are addressed before any of the actuators actuate. In the display process 1100, all rows of the display are addressed prior to actuation. Thus, while in display process 900, a controller must wait a certain amount of time after loading data into each row of light modulators to allow sufficient time for the light modulators to actuate, in display process 1100, the controller need only wait this "actuation time" once, after all rows have been addressed. One control matrix capable of providing a global actuation functionality is described above in relation to FIG. 3D.

Display process 1100 begins with the initiation of the display of a new image frame (step 1102). Such an initiation may be triggered by the detection of a vsync voltage pulse in the image signal 717. Then, at a time stored in the schedule table store 726 after the initiation of the display process for the image frame, the controller 704 begins loading the first bitplane into the light modulators of the array of light modulators 702 (step 1104).

At step 1106, any lamp currently illuminated is extinguished. Step 1106 may occur at or before the loading of a particular bitplane (step 1104) is completed, depending on the significance of the bitplane. For example, in some embodiments, to maintain the binary weighting of bitplanes with respect to one another, some bitplanes may need to be illuminated for a time period that is less than the amount of time it takes to load the next bitplane into the array of light modulators 702. Thus, a lamp illuminating such a bitplane is extinguished while the next bitplane is being loaded into the array of light modulators (step 1104). To ensure that lamps are extinguished at the appropriate time, in one embodiment, a timing value is stored in the schedule table store 726 to indicate the appropriate light extinguishing time.

When the controller 704 has completed loading a given bitplane into the array of light modulators 702 (step 1104) and extinguished any illuminated lamps (step 1106), the controller 704 issues a global actuation command (step 1108) to a global actuation driver, causing all of the light modulators in the array of light modulators 702 to actuate at substantially the same time. Global actuation drivers represent a type of common driver 714 included as part of display 700. The global actuation drivers may connect to modulators in the array of light modulators, for instance, by means of global actuation interconnects such as interconnect 354 of control matrix 340.

In some implementations the step 1108, globally actuate, includes a series of steps or commands issued by the timing control module 724. For instance, in certain control matrices described in co-pending U.S. Ser. No. 11/607,715, the global actuation step may involve a (first) charging of shutter mechanisms by means of a charging interconnect, followed by a (second) driving of a shutter common interconnect toward ground potential (at which point all commonly connected light modulators move into their closed state), followed after a constant waiting period for shutter actuation, followed by a (third) grounding of the global actuation interconnect (at which point only selected shutters move into their designated open states). Each of the charging interconnects, shutter common interconnects, and global actuation interconnects is connected to a separate driver circuit, responsive to trigger signals sent at the appropriate times according to timing values stored in the timing control module 724.

After waiting the actuation time of the light modulators, the controller 704 issues an illumination command (step 1110) to the lamp drivers to turn on the lamp corresponding to the recently loaded bitplane. The actuation time is the same for each bitplane loaded, and thus need not be stored in the schedule table store 726. It can be permanently stored in the timing control module 724 in hardware, firmware, or software.

After the lamp corresponding to the bitplane is illuminated (step 1110), at decision block 1112, the controller 704 determines, based on the output sequence, whether the currently loaded bitplane is the last bitplane for the image frame to be displayed. If so, the controller 704 awaits initiation of the display of the next image frame (step 1102). Otherwise, the controller 704 begins loading the next bitplane into the array of light modulators 702.

Figure 12:
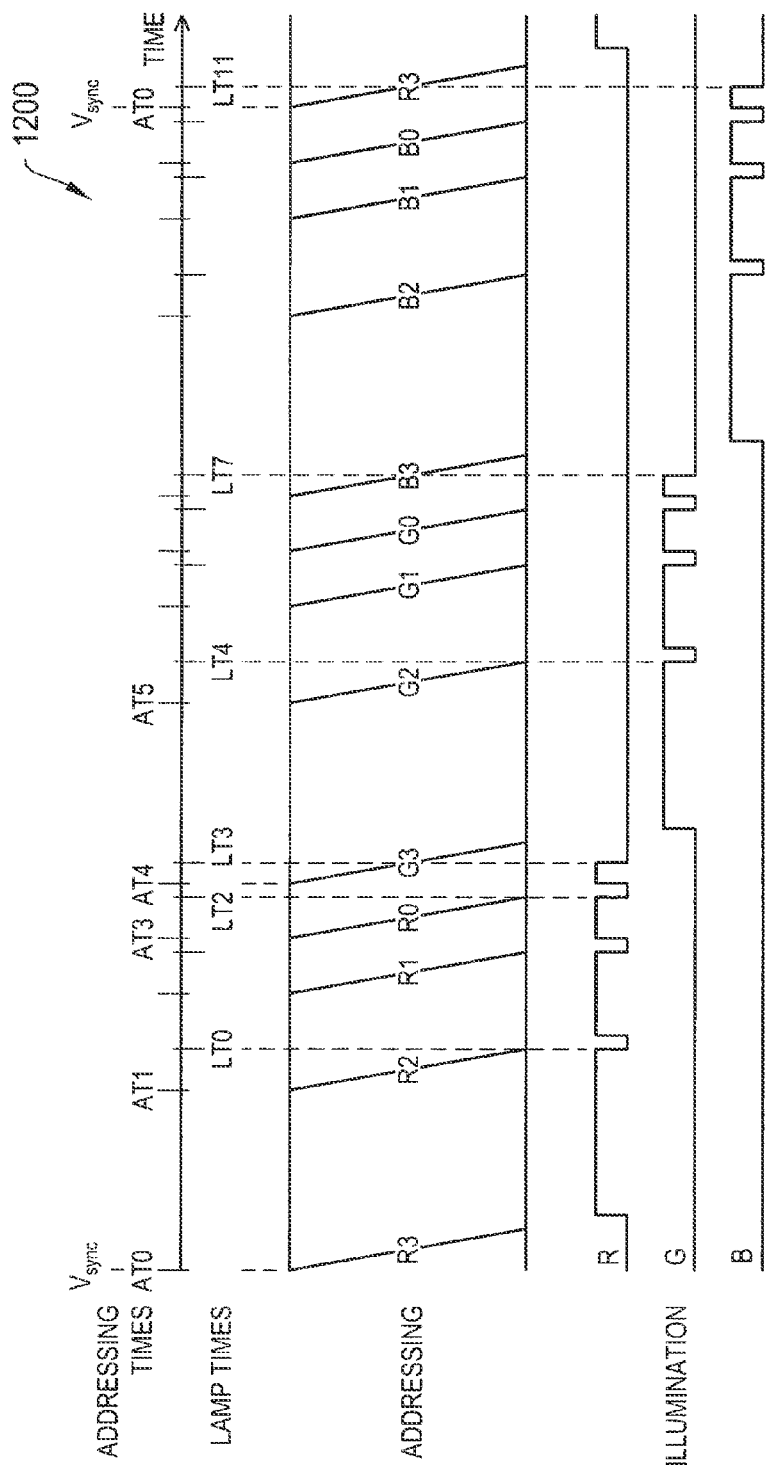
FIG. 12 is a timing diagram illustrating the timing of various image formation events in a first implementation of the method of FIG. 11, according to an illustrative embodiment of the invention.

FIG. 12 is a timing diagram 1200 that corresponds to an implementation of the display process 1100 that utilizes an output sequence having as parameters the values stored in the Table 1 schedule table. While the display processes corresponding to FIGS. 10 and 12 utilize similar stored parameters, their operation is quite different. Similar to the display process corresponding to timing diagram 1000 of FIG. 10, the display process corresponding to timing diagram 1200 uses a coded-time division grayscale addressing process in which image frames are displayed by displaying four sub-frame images for each of three color components (red, green, and blue) of the image frame. Each sub-frame image displayed of a given color is displayed at the same intensity for half as long a time period as the prior sub-frame image, thereby implementing a binary weighting scheme for the sub-frame images. However, the display process corresponding to timing diagram 1200 differs from the timing diagram 1000 in that it incorporates the global actuation functionality described in the display process 1100. As such, the lamps in the display are illuminated for a significantly greater portion of the frame time. The display can therefore either display brighter images, or it can operate its lamps at lower power levels while maintaining the same brightness level. As brightness and power consumption are not linearly related, the lower illumination level operating mode, while providing equivalent image brightness, consumes less energy.

More specifically, the display of an image frame in timing diagram 1200 begins upon the detection of a vsync pulse. As indicated on the timing diagram and in the Table 1 schedule table, the bitplane R3, stored beginning at memory location M0, is loaded into the array of light modulators 702 in an addressing event that begins at time AT0. Once the controller 704 outputs the last row of data for a bitplane to the array of light modulators 702, the controller 704 outputs a global actuation command. After waiting the actuation time, the controller 704 causes the red lamp to be illuminated. As indicated above, since the actuation time is a constant for all sub-frame images, no corresponding time value needs to be stored in the schedule table store 726 to determine this time. At time AT1, the controller 704 begins loading the subsequent bitplane R2, which, according to the schedule table, is stored beginning at memory location M1, into the array of light modulators 702.

Lamp extinguishing event times LT0-LT11 occur at times stored in the schedule table store 726. The times may be stored in terms of clock cycles following the detection of a vsync pulse, or they may be stored in terms of clock cycles following the beginning of the loading of the previous bitplane into the array of light modulators 702. For bitplanes which are to be illuminated for a period longer than the time it takes to load a bitplane into the array of light modulators 726, the lamp extinguishing times are set in the schedule table to coincide with the completion of an addressing event corresponding to the subsequent sub-frame image. For example, LT0 is set to occur at a time after AT0 which coincides with the completion of the loading of bitplane R2. LT1 is set to occur at a time after AT1 which coincides with the completion of the loading of bitplane R1.

Some bitplanes, such as R0, G0, and B0, however, are intended to be illuminated for a period of time that is less than the amount of time it takes to load a bitplane into the array. Thus, LT3, LT7, and LT11 occur in the middle of subsequent addressing events.

In alternate implementations the sequence of lamp illumination and data addressing can be reversed. For instance the addressing of bitplanes corresponding to the subsequent sub-frame image can follow immediately upon the completion of a global actuation event, while the illumination of a lamp can be delayed until a lamp illumination event at some point after the addressing has begun.

Figure 13:
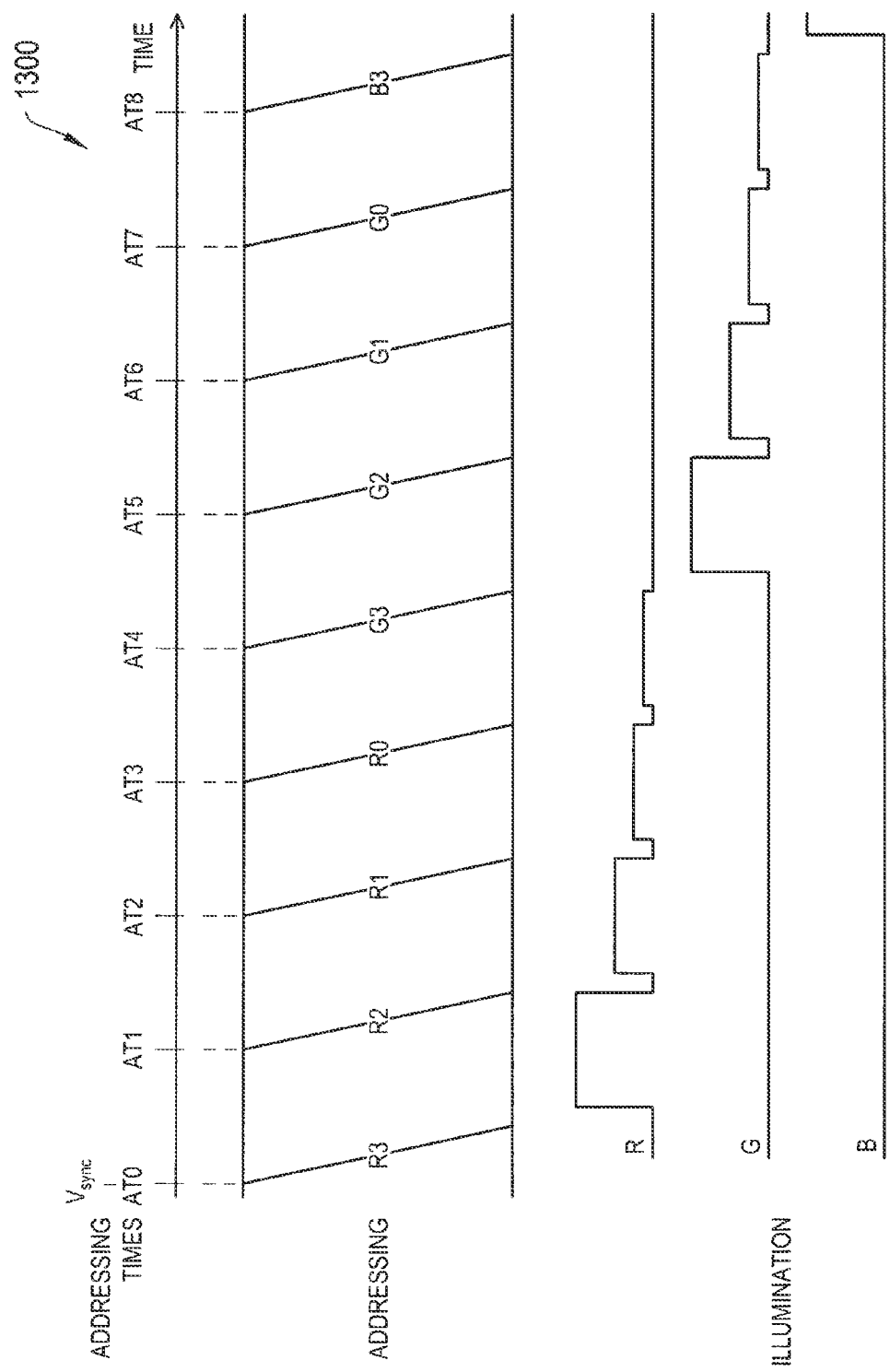
FIG. 13 is a timing diagram illustrating the timing of various image formation events in a second implementation of the method of FIG. 11, according to an illustrative embodiment of the invention.

FIG. 13 is a timing diagram 1300 that corresponds to another implementation of the display process 1100 that utilizes a table similar to Table 2 as a schedule table. The timing diagram 1300 corresponds to a coded-intensity grayscale addressing process similar to that described with respect to FIG. 5 in that each sub-frame image for a given color component (red, green, and blue) is illuminated for the same amount of time. However, in contrast to the display process depicted in FIG. 5, in the display process corresponding to timing diagram 1300, each sub-frame image of a particular color component is illuminated at half the intensity as the prior sub-frame image of the color component, thereby implementing a binary weighting scheme without varying lamp illumination times.

TABLE 2

Schedule Table 2

|  | Field 1 | Field 2 | Field 3 | Field 4 | Field 5 | Field 6 | Field 7 | --- | Field n − 1 | Field n |
|---|---|---|---|---|---|---|---|---|---|---|
| addressing time | AT0 | AT1 | AT2 | AT3 | AT4 | AT5 | AT6 | --- | AT(n − 1) | ATn |
| memory location of sub-frame data set | M0 | M1 | M2 | M3 | M4 | M4 | M6 | --- | M(n − 1) | Mn |
| lamp ID | R | R | R | R | G | G | G | --- | B | B |
| lamp intensity | IL0 | IL1 | IL2 | IL3 | IL4 | IL5 | IL6 | --- | IT(n − 1) | ITn |

More specifically, the display of an image frame in timing diagram 1300 begins upon the detection of a vsync pulse. As indicated on the timing diagram and in the Table 2 schedule table, the bitplane R3, stored beginning at memory location M0, is loaded into the array of light modulators 702 in an addressing event that begins at time AT0. Once the controller 704 outputs the last row data of a bitplane to the array of light modulators 702, the controller 704 outputs a global actuation command. After waiting the actuation time, the controller causes the red lamp to be illuminated at a lamp intensity IL0 stored in the Table 2 schedule table. Similar to the addressing process described with respect to FIG. 12, since the actuation time is a constant for all sub-frame images, no corresponding time value needs to be stored in the schedule table store 726 to determine this time. At time AT1, the controller 704 begins loading the subsequent bitplane R2, which, according to the schedule table, is stored beginning at memory location M1, into the array of light modulators 702. The sub-frame image corresponding to bitplane R2 is illuminated at an intensity level IL1, as indicated in Table 2, which is equal to half of the intensity level IL0. Similarly, the intensity level IL2 for bitplane R1 is equal to half of the intensity level IL1, and the intensity level I13 for bitplane R0 is equal to half of the intensity level IL2.

For each sub-frame image, the controller 704 may extinguish the illuminating lamp at the completion of an addressing event corresponding to the next sub-frame image. As such, no corresponding time value needs to be stored in the schedule table store 726 corresponding to lamp illumination times.

Figure 14A:
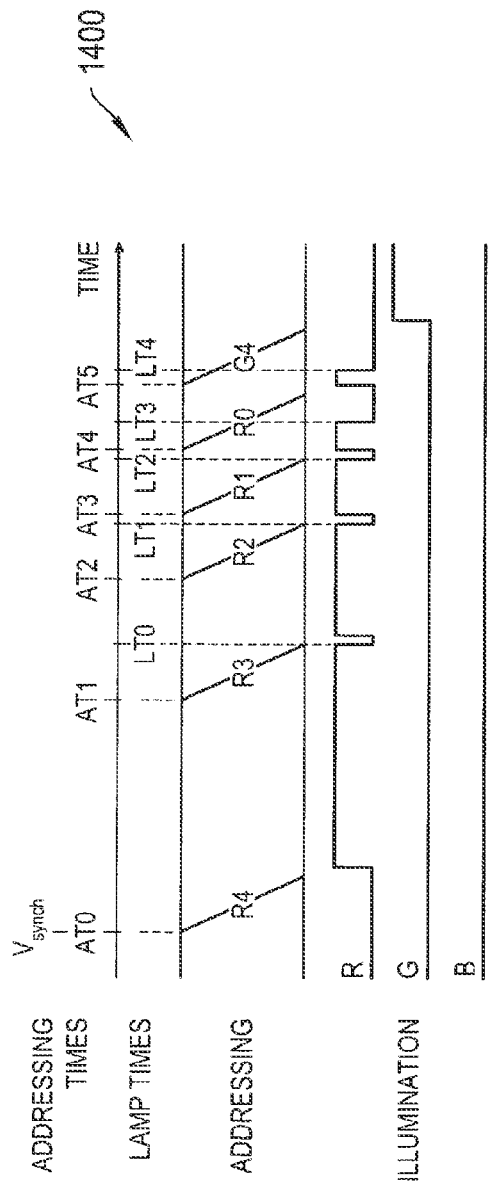
FIG. 14A is a timing diagram illustrating the timing of various image formation events in a third implementation of the method of FIG. 11, according to an illustrative embodiment of the invention.

FIG. 14A is a timing diagram 1400 that corresponds to another implementation of the display process 1100 that utilizes a table similar to Table 3 as a schedule table. The timing diagram 1400 corresponds to a coded-time division grayscale addressing process in which image frames are displayed by displaying five sub-frame images for each of three color components (red, green, and blue) of the image frame. By including an extra sub-frame image per color component, the display process corresponding to timing diagram 1400 can display twice the number of gray scale levels at each color as the display process that corresponds to timing diagram 1200. Each sub-frame image displayed of a given color is displayed at the same intensity for half as long a time period as the prior sub-frame image, thereby implementing a binary pulse width weighting scheme for the sub-frame images.

TABLE 3

Schedule Table 3

|  | Field 1 | Field 2 | Field 3 | Field 4 | Field 5 | Field 6 | Field 7 | --- | Field n − 1 | Field n |
|---|---|---|---|---|---|---|---|---|---|---|
| addressing time | AT0 | AT1 | AT2 | AT3 | AT4 | AT5 | AT6 | --- | AT(n − 1) | ATn |
| memory location of sub-frame data set | M0 | M1 | M2 | M3 | M4 | M4 | M6 | --- | M(n − 1) | Mn |
| lamp ID | R | R | R | R | R | G | G | --- | B | B |
| lamp time | LT0 | LT1 | LT2 | LT3 | LT4 | LT5 | LT6 | --- | LT(n − 1) | LTn |

More specifically, the display of an image frame in timing diagram 1200 begins upon the detection of a vsync pulse. As indicated on the timing diagram, the bitplane R4, stored beginning at memory location M0, is loaded into the array of light modulators 702 in an addressing event that begins at time AT0. Once the controller 704 outputs the last row data of a bitplane to the array of light modulators 702, the controller 704 outputs a global actuation command. After waiting the actuation time, the controller causes the red lamp to be illuminated. Similar to the addressing process described with respect to FIG. 12, since the actuation time is a constant for all sub-frame images, no corresponding time value needs to be stored in the schedule table store 726 to determine this time. At time AT1, the controller 704 begins loading the subsequent bitplane R3, which is stored beginning at memory location M1, into the array of light modulators 702.

Lamp extinguishing event times occur at times stored in the schedule table store 726. The times may be stored in terms of clock cycles following the detection of a vsync pulse, or they may be stored in terms of clock cycles following the beginning of the loading of the previous bitplane into the array of light modulators 702. For bitplanes which are to be illuminated for a period longer than the time it takes to load a bitplane into the array of light modulators 726, the lamp extinguishing times are set in the schedule table to coincide with the completion of an addressing event corresponding to the subsequent sub-frame image. For example, LT0 is set to occur at a time after AT0 which coincides with the completion of the loading of bitplane R3. LT1 is set to occur at a time after AT1 which coincides with the completion of the loading of bitplane R2.

Similar to the addressing process corresponding to the timing diagram 1200 of FIG. 12, some bitplanes, such as R1 and R0, G1 and G0, and B1 and B0 are intended to be illuminated for a period of time that is less than the amount of time it takes to load a bitplane into the array. Thus, their corresponding lamp extinguishing times occur in the middle of subsequent addressing events. Because the lamp extinguishing times depend on whether the corresponding illumination times are less than or greater than the time required for addressing, the corresponding schedule table includes lamp times, e.g., LT0, LT1, LT2, etc.

Figure 14B:
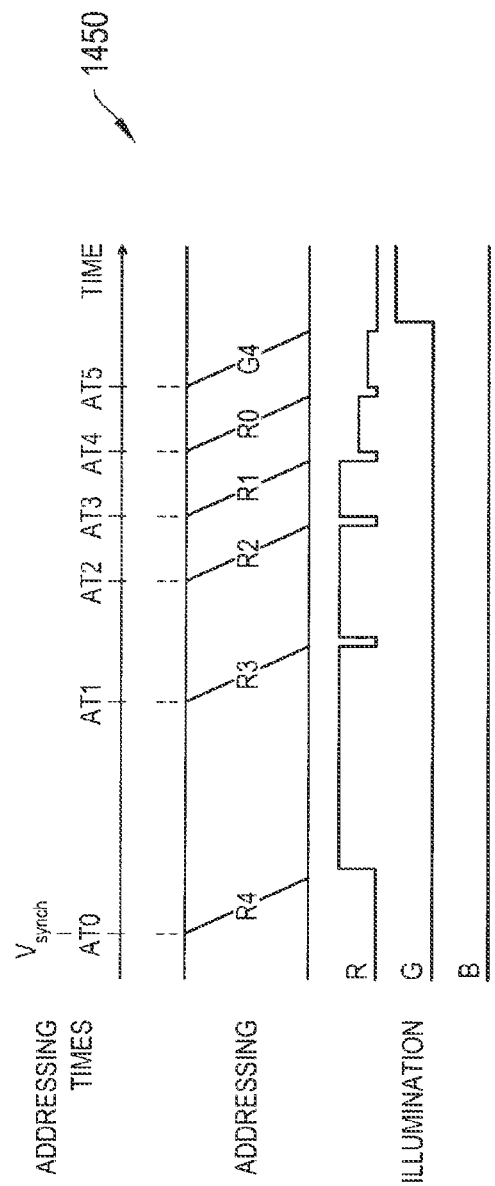
FIG. 14B is a timing diagram illustrating the timing of various image formation events in a fourth implementation of the method of FIG. 11, according to an illustrative embodiment of the invention.

FIG. 14B is a timing diagram 1450 that corresponds to another implementation of the display process 1100 that utilizes the parameters stored in Table 4 as a schedule table. The timing diagram 1450 corresponds to a coded-time division and intensity grayscale addressing process similar to that of the timing diagram 1400, except that the weighting of the least significant sub-image and the second least significant sub-image are achieved by varying lamp intensity in addition to lamp illumination time. In particular, sub-frame images corresponding to the least significant bitplane and the second least significant bitplane are illuminated for the same length of time as the sub-frame images corresponding to the third least significant bitplane, but at one quarter and one half the intensity, respectively. By combining intensity grayscale with time division grayscale, all the bitplanes may be illuminated for a period of time equal to or longer than the time it takes to load a bitplane into the array of light modulators 702. This eliminates the need for lamp extinguishing times to be stored in the schedule table store 726.

the controller 704 may extinguish the illuminating lamp at the completion of an addressing event corresponding to the next sub-frame image. As such, no corresponding time value needs to be stored in the schedule table store 726 to determine this time.

The timing diagram 1450 corresponds to a display process in which perceived brightness of sub-images of an output sequence are controlled in a hybrid fashion. For some sub-frame images in the output sequence, brightness is controlled by modifying the period of illumination of the sub-frame image. For other sub-frame images in the output sequence, brightness is controlled by modifying illumination intensity. It is useful in a direct view display to provide the capability for controlling both pulse widths and intensities independently. In one implementation of such independent control, the lamp drivers 714 are responsive to variable intensity commands issued from the timing control module 724 as well as to timing or trigger signals from the timing control module 724 for the illumination and extinguishing of the lamps. For independent pulse width and intensity control, the schedule table store 726 stores parameters that describe the required intensity of lamps in addition to the timing values associated with their illumination.

It is useful to define an illumination value as the product (or the integral) of an illumination period (or pulse width) with the intensity of that illumination. For a given time interval assigned in an output sequence for the illumination of a bitplane there are numerous alternative methods for controlling

TABLE 4

Schedule Table 4

| | Field 1 | Field 2 | Field 3 | Field 4 | Field 5 | Field 6 | Field 7 | - - - | Field n − 1 | Field n |
|---|---|---|---|---|---|---|---|---|---|---|
| addressing time | AT0 | AT1 | AT2 | AT3 | AT4 | AT5 | AT6 | - - - | AT(n − 1) | ATn |
| memory location of sub-frame data set | M0 | M1 | M2 | M3 | M4 | M4 | M6 | - - - | M(n − 1) | Mn |
| lamp ID | R | R | R | R | R | G | G | - - - | B | B |
| lamp intensity | IL0 | IL1 | IL2 | IT3 | IT4 | IT5 | IT6 | - - - | IT(n − 1) | ITn |

More specifically, the display of an image frame in timing diagram 1450 begins upon the detection of a vsync pulse. As indicated on the timing diagram and schedule table 4, the bitplane R4, stored beginning at memory location M0, is loaded into the array of light modulators 702 in an addressing event that begins at time AT0. Once the controller 704 outputs the last row of data of a bitplane to the array of light modulators 702, the controller 704 outputs a global actuation command. After waiting the actuation time, the controller causes the red lamp to be illuminated at a lamp intensity IL0 stored in the schedule table store 726. Similar to the addressing process described with respect to FIG. 12, since the actuation time is a constant for all sub-frame images, no corresponding time value needs to be stored in the schedule table store 726 to determine this time. At time AT1, the controller 704 begins loading the subsequent bitplane R3, which, according to the schedule table, is stored beginning at memory location M1, into the array of light modulators 702. The sub-frame image corresponding to bitplane R3 is illuminated at an intensity level IL1, as indicated in Table 2, which is equal to the intensity level IL0. Similarly, the intensity level IL2 for bitplane R2 is equal to the intensity level IL1. However, the intensity level IT3 for bitplane R1 is half that of the intensity level IL2, and the intensity level IT4 for bitplane R0 is half that of the intensity level IT3. Similar to the display process described with respect to FIG. 13, for each sub-frame image, the lamps to achieve any required illumination value. Three such alternate pulse profiles for lamps appropriate to this invention are compared in FIG. 14C. In FIG. 14C the time markers 1482 and 1484 determine time limits within which a lamp pulse must express its illumination value. In a global actuation scheme for driving MEMS-based displays, the time marker 1482 might represent the end of one global actuation cycle, wherein the modulator states are set for a bitplane previously loaded, while the time marker 1484 can represent the beginning of a subsequent global actuation cycle, for setting the modulator states appropriate to the subsequent bitplane. For bitplanes with smaller significance, the time interval between the markers 1482 and 1484 can be constrained by the time necessary to load data subsets, e.g. bitplanes, into the array of modulators. The available time interval, in these cases, is substantially longer that the time required for illumination of the bitplane, assuming a simple scaling from the pulse widths assigned to bits of larger significance.

The lamp pulse 1486 is a pulse appropriate to the expression of a particular illumination value. The pulse width 1486 completely fills the time available between the markers 1482 and 1484. The intensity or amplitude of lamp pulse 1486 is adjusted, however, to achieve a required illumination value. An amplitude modulation scheme according to lamp pulse 1486 is useful, particularly in cases where lamp efficiencies are not linear and power efficiencies can be improved by reducing the peak intensities required of the lamps.

The lamp pulse 1488 is a pulse appropriate to the expression of the same illumination value as in lamp pulse 1486. The illumination value of pulse 1488 is expressed by means of pulse width modulation instead of by amplitude modulation. As shown in the timing diagram 1400, for many bitplanes the appropriate pulse width will be less than the time available as determined by the addressing of the bitplanes.

The series of lamp pulses 1490 represent another method of expressing the same illumination value as in lamp pulse 1486. A series of pulses can express an illumination value through control of both the pulse width and the frequency of the pulses. The illumination value can be considered as the product of the pulse amplitude, the available time period between markers 1482 and 1484, and the pulse duty cycle.

The lamp driver circuitry can be programmed to produce any of the above alternate lamp pulses 1486, 1488, or 1490. For example, the lamp driver circuitry can be programmed to accept a coded word for lamp intensity from the timing control module 724 and build a sequence of pulses appropriate to intensity. The intensity can be varied as a function of either pulse amplitude or pulse duty cycle.

Figure 15:
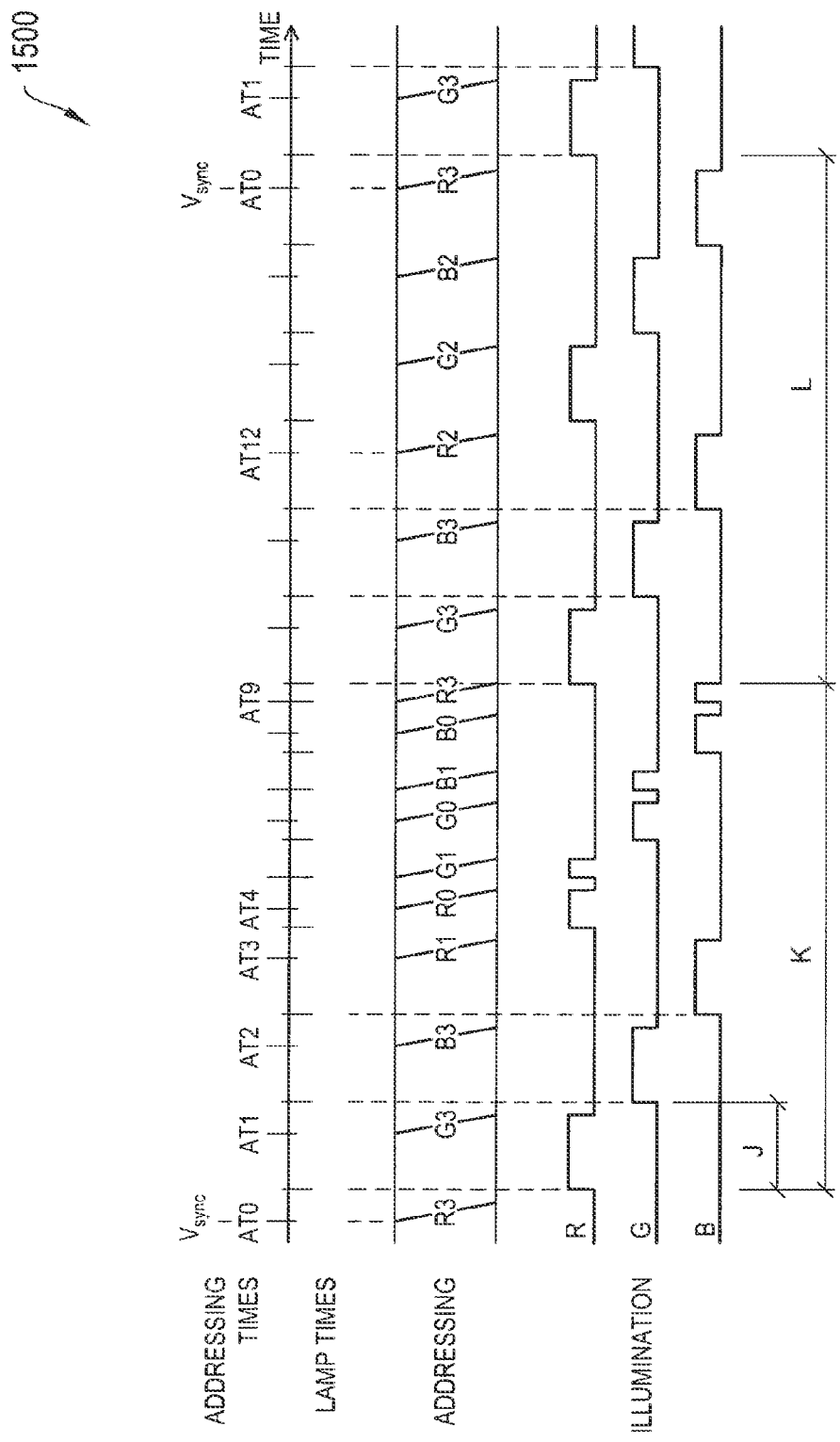
FIG. 15 is a timing diagram illustrating the timing of various image formation events in a fourth implementation of the method of FIG. 11, according to an illustrative embodiment of the invention.

FIG. 15 is a timing diagram 1500 that corresponds to another implementation of the display process 1100 that utilizes a schedule table similar to Table 5. The timing diagram 1500 corresponds to a coded-time division grayscale addressing process similar to that described with respect to FIG. 12, except that restrictions have been placed on illumination periods for the most significant bits and rules have been established for the ordering of the bitplanes in the display sequence. The sequencing rules illustrated for timing diagram 1500 are established to help reduce two visual artifacts which detract from image quality in field sequential displays, i.e. color breakup and flicker. Color breakup is reduced by increasing the frequency of color changes, that is by alternating between sub-images of different colors at a frequency preferably in excess of 180 Hz. Flicker is reduced in its simplest manifestation by ensuring that frame rates are substantially greater than 30 Hz, that is, by ensuring that bitplanes of similar significance which appear in subsequent image frames are separated by time periods of less than 25 milliseconds.

Sequencing rules associated with color breakup and flicker can be implemented by the technique of bit splitting. In particular, in timing diagram 1500, the most significant bits, e.g. R3, G3, and B3, are split in two, that is: reduced to half of their nominal illumination period and then repeated or displayed twice within the time of any given image frame. The red bitplane R3 for instance, is first loaded to the modulation array at time event AT0 and is then loaded for the second time at the time event AT9. The illumination period associated with the most significant bitplane R3, loaded at time event AT9, is equal to the illumination period associated with bitplane R2, which is loaded at the time event AT12. Because the most significant bitplane R3 appears twice within the image frame, however, the illumination value associated with the information contained within bitplane R3 is still twice that allotted to the next most significant bitplane R2.

In addition, instead of displaying sub-frame images of an image grouped by color, as shown in the timing diagrams 1000, 1200, 1300, 1400 and 1450, the timing diagram 1500 displays sub-frame images corresponding to a given color interspersed among sub-frame images corresponding to other colors. For example, to display an image according to the timing diagram 1500, a display first loads and displays the first occurrence of the most significant bitplane for red, R3, followed immediately by the most significant green bitplane, G3, followed immediately by the most significant blue bitplane B3. Since the most significant bitplanes have been split, these color changes occur fairly rapidly, with the longest time periods between color changes about equal to the illumination time of the next most significant bitplane, R2. The time periods between illumination of sub-frame images of different colors, illustrated as the time period J in timing diagram 1500, are preferably held to less than 4 milliseconds, more preferably less than 2.8 milliseconds. The smaller bitplanes, R1 and R0, G1 and G0, and B1 and B0, can still be grouped together, since the total of their illumination times is still less than 4 milliseconds.

Interspersing or alternating between bitplanes or different colors helps to reduce the imaging artifact of color breakup. It is preferable to avoid grouping the output of bitplanes by color. For instance, although the bitplane B3 is the third of the bitplanes to be output by the controller (at addressing event AT2), the appearance of the blue bitplane B3 does not imply the end of all possible appearances of red bitplanes within the frame time. Indeed the bitplane R1 for the color red immediately follows B3 in the sequence of timing diagram 1500. It is preferable to alternate between bitplanes of different color with the highest frequency possible within an image frame.

To reduce the power associated with refreshing a display it is not always possible to establish a frame rate in excess of 30 Hz. Alternate rules related to the ordering of the bitplanes may still be applied, however, to minimize flicker in the perceived image. In timing diagram 1500 the time periods K and L represent the separation in time between events in which the most significant bitplane in red, i.e. the most significant bitplane R3 is output to the display. Similar time periods K and L exist between successive occurrences of the other most significant bitplanes G3 and B3. The time period K represents the maximum time between output of most significant bitplanes within a given image frame. The time period L represents the maximum time between output of most significant bitplanes in two consecutive image frames. In timing diagram 1500 the sum of K+L is equal to the frame time, and for this embodiment, the frame time may be as long as 33 milliseconds (corresponding to a 30 Hz frame rate). Flicker may still be reduced in displays where bit-splitting is

TABLE 5

Schedule Table 5

| | Field 1 | Field 2 | Field 3 | Field 4 | Field 5 | Field 6 | Field 7 | --- | Field n − 1 | Field n |
|---|---|---|---|---|---|---|---|---|---|---|
| addressing time | AT0 | AT1 | AT2 | AT3 | AT4 | AT5 | AT6 | --- | AT(n − 1) | ATn |
| memory location of sub-frame data set | M0 | M1 | M2 | M3 | M4 | M4 | M6 | --- | M(n − 1) | Mn |
| lamp ID | R | G | B | R | R | G | G | --- | G | B | employed, if both time intervals K and L are held to less than 25 milliseconds, preferably less than 17 milliseconds.

Flicker may arise from a variety of factors wherein characteristics of a display are repeated at frequencies as low as 30 Hz. In timing diagram 1500, for instance, the lesser significance bitplanes R1 and R0 are illuminate only once per frame, and the frame rate is as long as 30 Hz. Therefore images associated with these lesser bitplanes may contribute to the perception of flicker. The bank-wise addressing method described with respect to FIG. 19, however, will provide another mechanism by which even lesser bitplanes can be repeated at frequencies substantially greater than the frame rate.

Flicker may also be generated by the characteristic of bitplane jitter. Jitter appears when the spacing between similar bitplanes is not equal in the sequence of displayed bitplanes. Flicker would ensue, for instance, if the time periods K and L between MSB red bitplanes were not equal. Flicker can be reduced by ensuring that time periods K and L are equal to within 10%. That is the length of time between a first time the bitplane corresponding to the most significant sub-frame image of a color component of the image frame is output and a second time the bitplane corresponding to the most significant sub-frame image of the color component is output is within 10% of the length of time between the second time the bitplane corresponding to the most significant sub-frame image of the color component is output and a subsequent time at which a sub-frame image corresponding to the most significant sub-frame image of the color component is output.

Figure 16:
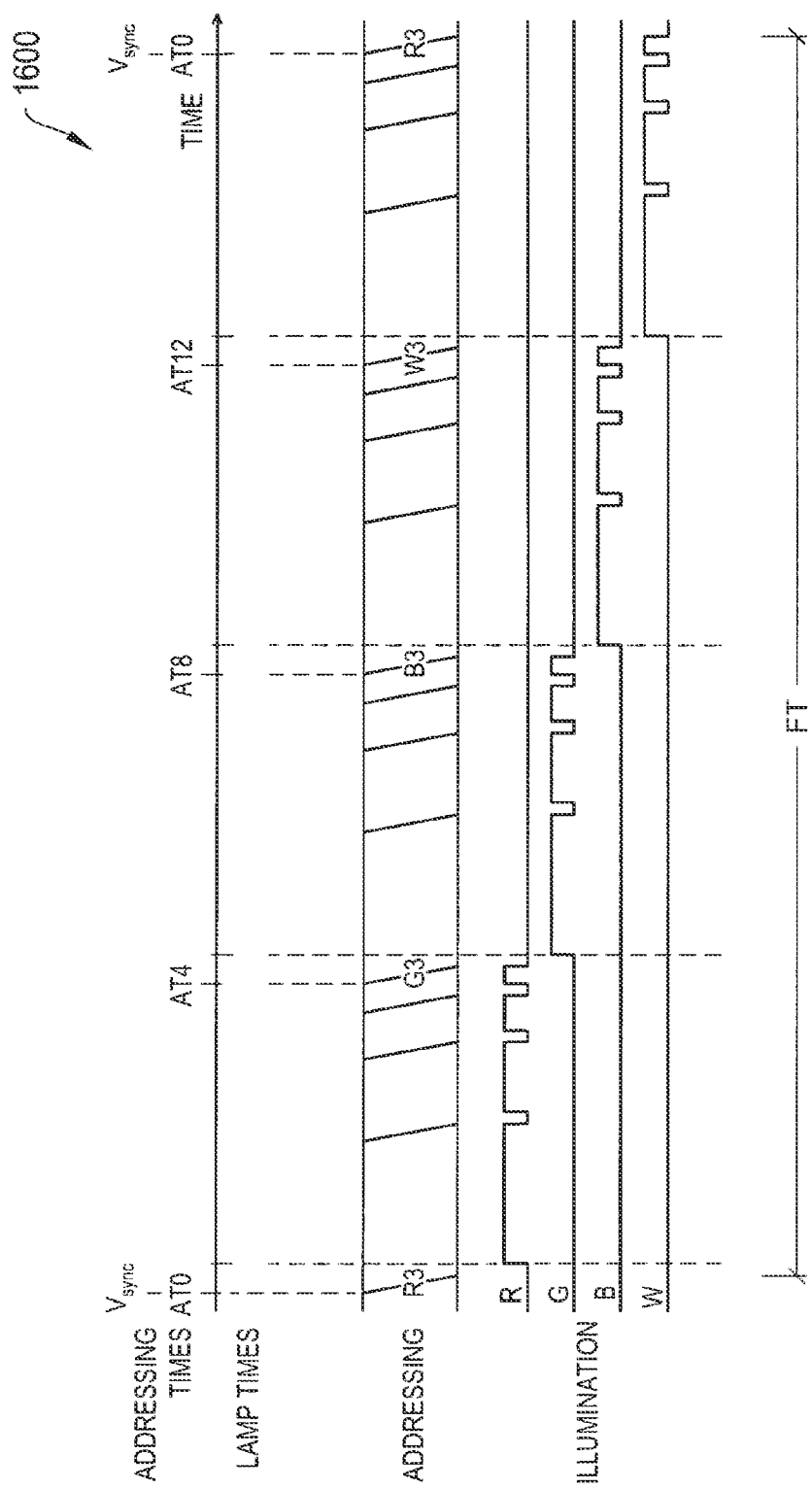
FIG. 16 is a timing diagram illustrating the timing of various image formation events in a fifth implementation of the method of FIG. 11, according to an illustrative embodiment of the invention.

FIG. 16 is a timing diagram 1600 that corresponds to another implementation of the display process 1100 that utilizes the parameters listed in Table 6. The timing diagram 1600 corresponds to a coded-time division grayscale addressing process in which image frames are displayed by displaying four sub-frame images for each color component of the image frame. Each sub-frame image displayed of a given color is displayed at the same intensity for half as long a time period as the prior sub-frame image, thereby implementing a binary weighting scheme for the sub-frame images. The timing diagram 1600 is similar to the timing diagram 1200 of FIG. 12, but has sub-frame images corresponding to the color white, in addition to the colors red, green and blue, that are illuminated using a white lamp. The addition of a white lamp allows the display to display brighter images or operate its lamps at lower power levels while maintaining the same brightness level. As brightness and power consumption are not linearly related, the lower illumination level operating mode, while providing equivalent image brightness, consumes less energy. In addition, white lamps are often more efficient, i.e. they consume less power than lamps of other colors to achieve the same brightness.

More specifically, the display of an image frame in timing diagram 1600 begins upon the detection of a vsync pulse. As indicated on the timing diagram and in the Table 6 schedule table, the bitplane R3, stored beginning at memory location M0, is loaded into the array of light modulators 702 in an addressing event that begins at time AT0. Once the controller 704 outputs the last row data of a bitplane to the array of light modulators 702, the controller 704 outputs a global actuation command. After waiting the actuation time, the controller causes the red lamp to be illuminated. Similar to the addressing process described with respect to FIG. 12, since the actuation time is a constant for all sub-frame images, no corresponding time value needs to be stored in the schedule table store 726 to determine this time. At time AT4, the controller 704 begins loading the first of the green bitplanes, G3, which, according to the schedule table, is stored beginning at memory location M4. At time AT8, the controller 704 begins loading the first of the blue bitplanes, B3, which, according to the schedule table, is stored beginning at memory location M8. At time AT12, the controller 704 begins loading the first of the white bitplanes, W3, which, according to the schedule table, is stored beginning at memory location M12. After completing the addressing corresponding to the first of the white bitplanes, W3, and after waiting the actuation time, the controller causes the white lamp to be illuminated for the first time.

Because all the bitplanes are to be illuminated for a period longer than the time it takes to load a bitplane into the array of light modulators 726, the controller 704 extinguishes the lamp illuminating a sub-frame image upon completion of an addressing event corresponding to the subsequent sub-frame image. For example, LT0 is set to occur at a time after AT0 which coincides with the completion of the loading of bitplane R2. LT1 is set to occur at a time after AT1 which coincides with the completion of the loading of bitplane R1.

The time period between vsync pulses in the timing diagram is indicated by the symbol FT, indicating a frame time. In some implementations the addressing times AT0, AT1, etc. as well as the lamp times LT0, LT1, etc. are designed to accomplish 4 sub-frame images for each of the 4 colors within a frame time FT of 16.6 milliseconds, i.e. according to a frame rate of 60 Hz. In other implementations the time values stored in schedule table store 726 can be altered to accomplish 4 sub-frame images per color within a frame time FT of 33.3 milliseconds, i.e. according to a frame rate of 30 Hz. In other implementations frame rates as low as 24 Hz may be employed or frame rates in excess of 100 Hz may be employed.

TABLE 6

Schedule Table 6

| | Field 1 | Field 2 | Field 3 | Field 4 | Field 5 | Field 6 | Field 7 | --- | Field n – 1 | Field n |
|---|---|---|---|---|---|---|---|---|---|---|
| addressing time | AT0 | AT1 | AT2 | AT3 | AT4 | AT5 | AT6 | --- | AT(n – 1) | ATn |
| memory location of sub-frame data set | M0 | M1 | M2 | M3 | M4 | M4 | M6 | --- | M(n – 1) | Mn |
| lamp ID | R | R | R | R | G | G | G | --- | W | W |

The use of white lamps can improve the efficiency of the display. The use of four distinct colors in the sub-frame images requires changes to the data processing in the input processing module 718. Instead of deriving bitplanes for each of 3 different colors, a display process according to timing diagram 1600 requires bitplanes to be stored corresponding to each of 4 different colors. The input processing module 718 may therefore convert the incoming pixel data, encoded for colors in a 3-color space, into color coordinates appropriate to a 4-color space before converting the data structure into bitplanes.

In addition to the red, green, blue, and white lamp combination, shown in timing diagram 1600, other lamp combinations are possible which expand the space or gamut of achievable colors. A useful 4-color lamp combination with expanded color gamut is red, blue, true green (about 520 nm) plus parrot green (about 550 nm). Another 5-color combination which expands the color gamut is red, green, blue, cyan, and yellow. A 5-color analogue to the well known YIQ color space can be established with the lamps white, orange, blue, purple, and green. A 5-color analog to the well known YUV color space can be established with the lamps white, blue, yellow, red, and cyan.

Other lamp combinations are possible. For instance, a useful 6-color space can be established with the lamp colors red, green, blue, cyan, magenta, and yellow. A 6-color space can also be established with the colors white, cyan, magenta, yellow, orange, and green. A large number of other 4-color and 5-color combinations can be derived from amongst the colors already listed above. Further combinations of 6, 7, 8 or 9 lamps with different colors can be produced from the colors listed above, Additional colors may be employed using lamps with spectra which lie in between the colors listed above.

Figure 17:
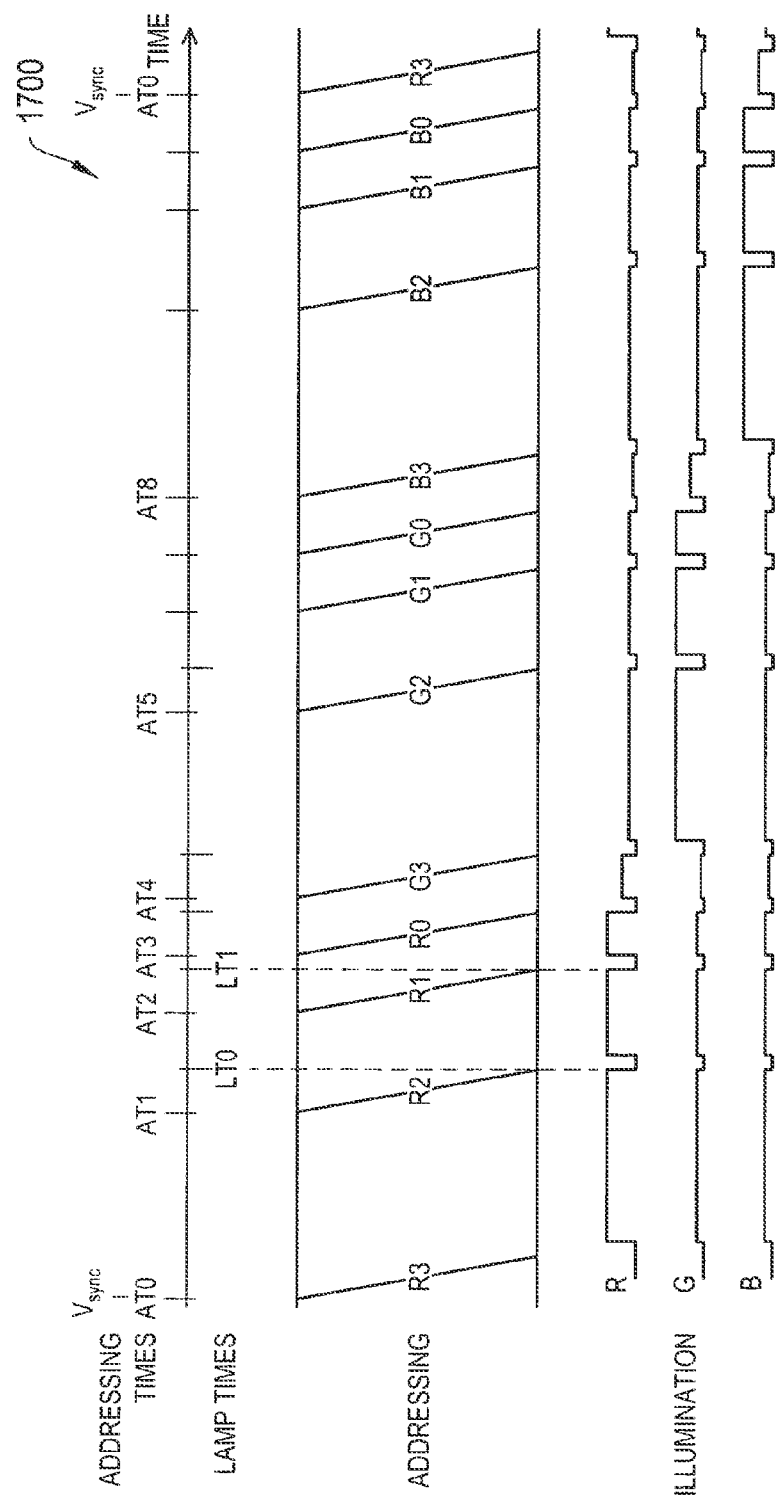
FIG. 17 is a timing diagram illustrating the timing of various image formation events in a sixth implementation of the method of FIG. 11, according to an illustrative embodiment of the invention.

FIG. 17 is a timing diagram 1700 that corresponds to another implementation of the display process 1100 that utilizes the parameters listed in the schedule table of Table 7. The timing diagram 1700 corresponds to a hybrid coded-time division and intensity grayscale display process in which lamps of different colors may be illuminated simultaneously. Though each sub-frame image is illuminated by lamps of all colors, sub-frame images for a specific color are illuminated predominantly by the lamp of that color. For example, during illumination periods for red sub-frame images, the red lamp is illuminated at a higher intensity than the green lamp and the blue lamp. As brightness and power consumption are not linearly related, using multiple lamps each at a lower illumination level operating mode may require less power than achieving that same brightness using one lamp at an higher illumination level.

The addressing timing is similar to that described in FIG. 12 in that each sub-frame image is displayed at the same intensity for half as long a time period as the prior sub-frame image, except for the sub-frame images corresponding to the least significant bitplanes which are instead each illuminated for the same length of time as the prior sub-frame image, but at half the intensity. As such, the sub-frame images corresponding to the least significant bitplanes are illuminated for a period of time equal to or longer than that required to load a bitplane into the array.

More specifically, the display of an image frame in timing diagram 1700 begins upon the detection of a vsync pulse. As indicated on the timing diagram and in the Table 7 schedule table, the bitplane R3, stored beginning at memory location M0, is loaded into the array of light modulators 702 in an addressing event that begins at time AT0. Once the controller 704 outputs the last row data of a bitplane to the array of light modulators 702, the controller 704 outputs a global actuation command. After waiting the actuation time, the controller causes the red, green and blue lamps to be illuminated at the intensity levels indicated by the Table 7 schedule, namely RI0, GI0 and BI0, respectively. Similar to the addressing process described with respect to FIG. 12, since the actuation time is a constant for all sub-frame images, no corresponding time value needs to be stored in the schedule table store 726 to determine this time. At time AT1, the controller 704 begins loading the subsequent bitplane R2, which, according to the schedule table, is stored beginning at memory location M1, into the array of light modulators 702. The sub-frame image corresponding to bitplane R2, and later the one corresponding to bitplane R1, are each illuminated at the same set of intensity levels as for bitplane R1, as indicated by the Table 7 schedule. In comparison, the sub-frame image corresponding to the least significant bitplane R0, stored beginning at memory location M3, is illuminated at half the intensity level for each lamp. That is, intensity levels RI3, GI3 and BI3 are equal to half that of intensity levels RI0, GI0 and BI0, respectively. The process continues starting at time AT4, at which time bitplanes in which the green intensity predominates are displayed. Then, at time AT8, the controller 704 begins loading bitplanes in which the blue intensity dominates.

Because all the bitplanes are to be illuminated for a period longer than the time it takes to load a bitplane into the array of light modulators 726, the controller 704 extinguishes the lamp illuminating a sub-frame image upon completion of an addressing event corresponding to the subsequent sub-frame image. For example, LT0 is set to occur at a time after AT0 which coincides with the completion of the loading of bitplane R2. LT1 is set to occur at a time after AT1 which coincides with the completion of the loading of bitplane R1.

The mixing of color lamps within sub-frame images in timing diagram 1700 can lead to improvements in power efficiency in the display. Color mixing can be particularly useful when images do not include highly saturated colors.

Figure 18:
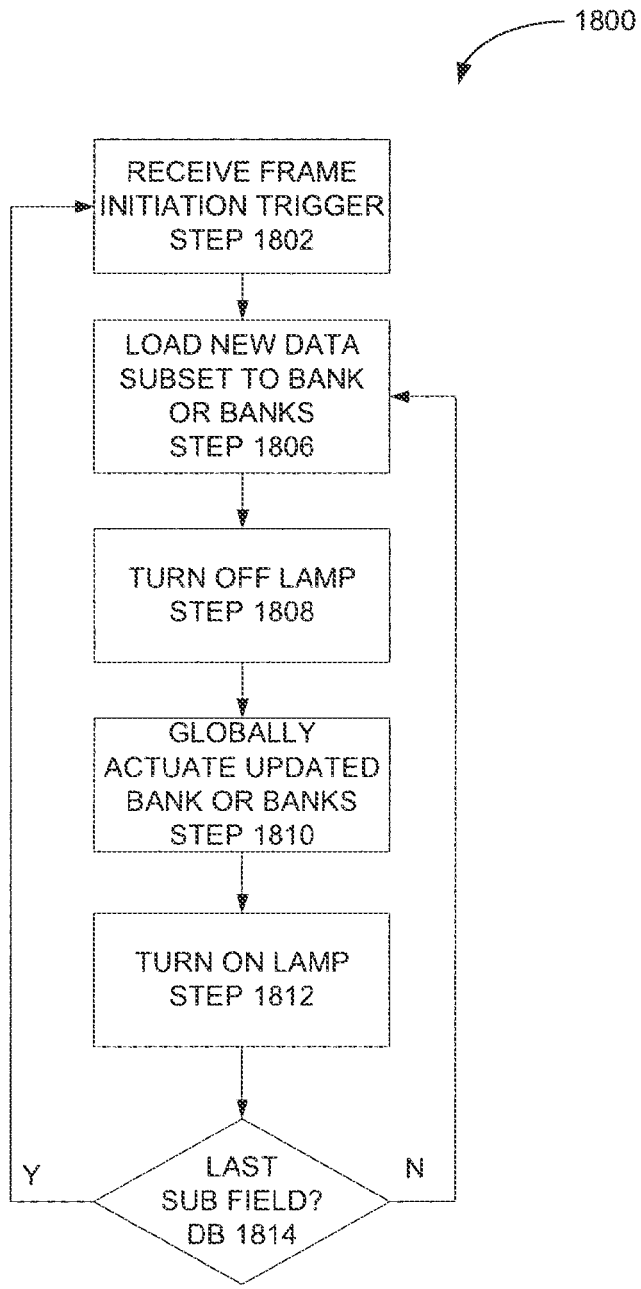
FIG. 18 is a more detailed flow chart of a portion of a third implementation of the method of FIG. 8, according to an illustrative embodiment of the invention.

FIG. 18 is a more detailed flow chart of an illustrative display process 1800 suitable for use as part of the display method 800 for displaying images on the direct-view display 700. As in the display process 1100, the display process 1800

TABLE 7

Schedule Table 7

| | Field 1 | Field 2 | Field 3 | Field 4 | Field 5 | Field 6 | Field 7 | --- | Field n − 1 | Field n |
|---|---|---|---|---|---|---|---|---|---|---|
| data time | AT0 | AT1 | AT2 | AT3 | AT4 | AT5 | AT6 | --- | AT(n − 1) | ATn |
| memory location of sub-frame data set | M0 | M1 | M2 | M3 | M4 | M5 | M6 | --- | M(n − 1) | Mn |
| red average intensity | RI0 | RI1 | RI2 | RI3 | RI4 | RI5 | RI6 | --- | RI(n − 1) | Rn |
| green average intensity | GI0 | GI1 | GI2 | GI3 | GI4 | GI5 | GI6 | --- | GI(n − 1) | Gn |
| blue average intensity | BI0 | BI1 | BI2 | BI3 | BI4 | BI5 | BI6 | --- | BI(n − 1) | Bn | utilizes bitplanes for sub-frame data sets. Display process 1800 also includes a global actuation functionality similar to that used in display process 1100. Display process 1800, however, adds a bankwise addressing functionality as a tool for improving the illumination efficiency in the display.

For many display processes, especially where a display loads and displays large numbers of bitplanes (for example, greater than 5) for each color component of an image, proportionately more time must be dedicated to the addressing of the display at the expense of illumination of corresponding sub-images This is true even when global actuation techniques are employed as in display process 1100. The situation is illustrated by the timing diagram 1400 of FIG. 14A. Timing diagram 1400 illustrates a 5-bit sequence per color with illumination values assigned to the bitplanes according to a binary significance sequence 16:8:4:2:1. The illumination periods associated with the bitplanes R1 and R0, however, are considerably shorter than the time required for loading data sets into the array appropriate to the next bitplane. As a result, a considerable amount of time passes between the times the lamps illuminating the R1 and R0 bitplanes are extinguished and the times the lamps illuminating the R0 and G4 bitplanes, respectively, are turned on. This situation results in a reduced duty cycle and therefore reduced efficiency for lamp illumination.

Bankwise addressing is a functionality by which duty cycles for lamps can be increased by reducing the times required for addressing. This is accomplished by dividing the display into multiple independently actuatable banks of rows such that only a portion of the display needs to be addressed and actuated at any one time. Shorter addressing cycles increase the efficiency of the display for those bitplanes that require only the shortest of illumination times.

In one particular implementation, bank-wise addressing involves segregating the rows of the display into two segments. In one embodiment, the rows in the top half of the display are controlled separately from rows in the bottom half of the display. In another embodiment the display is segregated on an every-other row basis, such that even-numbered rows belong to one bank or segment and the odd-numbered rows belong to the other bank. Separate bitplanes are stored for each segment at a distinct addresses in the buffer memory 722. For bank-wise addressing, the input processing module 718 is programmed to not only derive bitplane information from the incoming video stream, but also to identify, and in some cases store, portions of bitplanes separately according to their assignment to different banks. In the following description bitplanes are labeled by color, bank, and significance value. For example, bitplane RE3 in a five bit per color component gray scale process refers to the second most significant bitplane for the even numbered rows of the display apparatus. Bitplane BO0 corresponds to the least significant blue bitplane for the odd numbered rows.

When the bankwise addressing scheme employs a global actuation functionality, then independent global actuation voltage drivers and independent global actuation interconnects are provided for each bank. For instance the odd-numbered rows are connected to one set of global actuation drivers and global actuation interconnects, while the even numbered rows are connected to an independent set of global actuation drivers and interconnects.

Display process 1800 begins with the initiation of the display of a new image frame (step 1802). Such an initiation may be triggered by the detection of a vsync voltage pulse in the image signal 717. Then, at a time identified in the schedule table store 726 after the initiation of the display process for the image frame, the controller 704 begins loading the first bitplane into the light modulators of the array of light modulators 702 (step 1804). In contrast to step 1104 of FIG. 11, at step 1804, bitplanes for either one or both of the banks of the display are loaded into the corresponding rows of the array of light modulators 702. In one embodiment, at step 1804, the timing control module 724 analyzes its output sequence to see how many banks need to be addressed in a given addressing event and then addresses each bank needed to be addressed in sequence. In one implementation, for one bank, bitplanes are loaded into corresponding light modulator rows in order of increasing significance while for the other bank, bitplanes are loaded into the corresponding light modulator rows in order of decreasing significance.

At step 1806, any lamp currently illuminated is extinguished. Step 1806 may occur at or before the loading of a particular bitplane (step 1804) is completed, depending on the significance of the bitplane. For example, in some embodiments, to maintain the binary weighting of bitplanes with respect to one another, some bitplanes may need to be illuminated for a time period that is less than the amount of time it takes to load the next bitplane into the array of light modulators 702. Thus, a lamp illuminating such a bitplane is extinguished while the next bitplane is being loaded into the array of light modulators (step 1804). To ensure that lamps are extinguished at the appropriate time, a timing value is stored in the schedule table to indicate the appropriate light extinguishing time.

When the controller 704 has completed loading either or both of the bitplane data into either or both of banks in the array of light modulators 702 (step 1804) and when the controller has extinguished any illuminated lamps (step 1806), the controller 704 issues a global actuation command (step 1808) to either or both of the global actuation drivers, depending on where it is in its output sequence, thereby causing either only one of the banks of addressable modulators or both banks in the array of light modulators 702 to actuate at substantially the same time. The timing of the global actuation is determined by logic in the timing control module based on whether the schedule indicates that one or both of the banks requires addressing. That is, if a single bank needs addressing according to the schedule table store 726, the timing control module 724 waits a first amount of time before causing the controller 704 to issue the global actuation command. If the schedule table store 726 indicates both banks require addressing, the timing control module 724 waits about twice that amount of time before triggering global actuation. As only two possible time values are needed for timing global actuation (i.e., a single bank time, or a dual bank time), these values can be stored permanently in the timing control module 724 in hardware, firmware, or software.

After waiting the actuation time of the light modulators, the controller 704 issues an illumination command (step 1810) to the lamp drivers to turn on the lamp corresponding to the recently loaded bitplane. The actuation time is measured from the time a global actuation command is issued (step 1808), and thus is the same for each bitplane loaded. Therefore, it need not be stored in a schedule table. It can be permanently stored in the timing control module 724 in hardware, firmware, or software.

After the lamp corresponding to the bitplane is illuminated (step 1810), at decision block 1812, the controller 704 determines, based on the schedule table store 726, whether the currently loaded bitplane is the last bitplane for the image frame to be displayed. If so, the controller 704 awaits initiation of the display of a subsequent image frame (step 1802). Otherwise, at the time of the next addressing event listed in the schedule table store 726, the controller 704 begins loading the corresponding bitplane or bitplanes into the array of light modulators 702 (step 1804).

Figure 19:
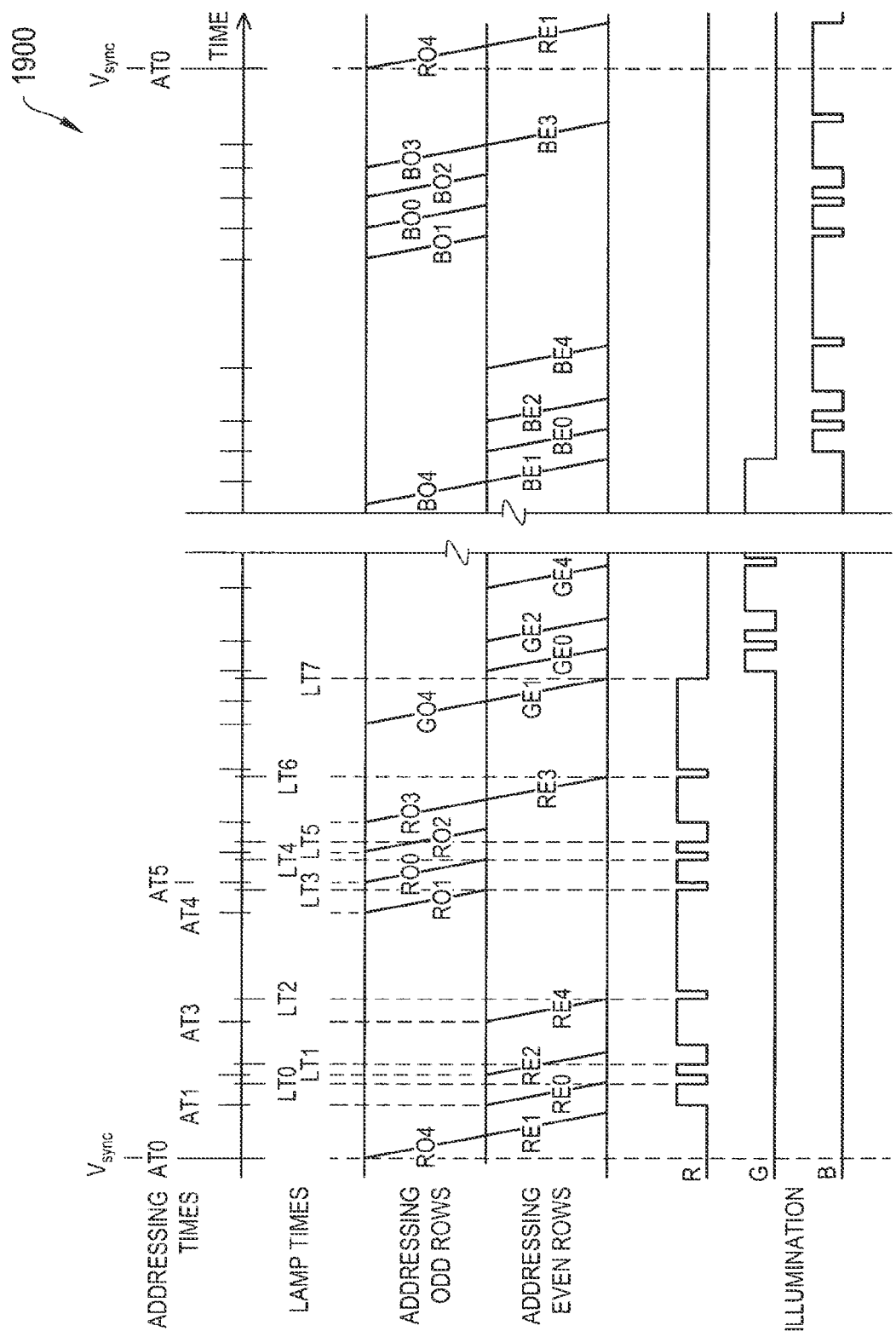
FIG. 19 is a timing diagram illustrating the timing of various image formation events in an implementation of the method of FIG. 18, according to an illustrative embodiment of the invention.

FIG. 19 is a timing diagram 1900 that corresponds to an implementation of the display process 1800 through utilization of the parameters listed in the schedule table of Table 8. The timing diagram 1900 corresponds to a coded-time division grayscale display process in which image frames are displayed by displaying 5 sub-frame images for each of three color components (red, green, and blue) of the image frame. Each sub-frame image displayed of a given color is displayed at the same intensity for half as long a time period as the prior sub-frame image, thereby implementing a binary weighting scheme for the sub-frame images. In addition, the timing diagram 1900 incorporates the global actuation functionality described in the display process 1100 and the bankwise addressing functionality described in the display process 1800. By reducing the times required for addressing, the display can therefore either display brighter images, or it can operate its lamps at lower power levels while maintaining the same brightness level. As brightness and power consumption are not linearly related, the lower illumination level operating mode, while providing equivalent image brightness, consumes less energy.

TABLE 8

Schedule Table 8

| | Field 1 | Field 2 | Field 3 | Field 4 | Field 5 | Field 6 | Field 7 | --- | Field n−1 | Field n |
|---|---|---|---|---|---|---|---|---|---|---|
| data time | AT0 | AT1 | AT2 | AT3 | AT4 | AT5 | AT6 | --- | AT(n−1) | ATn |
| memory location for Bank 1 "odd rows" | MO0 | 0 | 0 | 0 | 0 | MO5 | M06 | --- | MO(n−1) | MOn |
| memory location for Bank 2 "even rows" | ME0 | ME1 | ME2 | ME3 | ME4 | 0 | 0 | --- | ME(n−1) | MEn |
| lamp ID | R | R | R | R | R | R | R | --- | B | B |
| lamp time | LT0 | LT1 | LT2 | LT3 | LT4 | LT5 | LT6 | --- | LT(n−1) | LTn |

More specifically, the display of an image frame in timing diagram 1900 begins upon the detection of a vsync pulse. As indicated on the timing diagram and in the Table 8 schedule table, the bitplane R04, stored beginning at memory location MO0, is loaded into only the odd rows of the array of light modulators 702 in an addressing event that begins at time AT0. Immediately thereafter, the bitplane RE1 is loaded into only the even rows of the array of light modulators, using data stored in the location ME0. Once the controller 704 outputs the last of the even rows of data of a bitplane to the array of light modulators 702, the controller 704 outputs a global actuation command to both of the independently addressable global actuation drivers connected to the banks of even and odd rows. After waiting the actuation time following the issuance of the global actuation command, the controller 704 causes the red lamp to be illuminated. As indicated above, since the actuation time is a constant for all sub-frame images and is based on the issuance of the global actuation command, no corresponding time value needs to be stored in the schedule table store 726 to determine this time.

At time AT1, the controller 704 begins loading the subsequent bitplane RE0, stored beginning at memory location ME1, into the even rows of the array of light modulators 702. During the addressing event beginning at AT1, the timing control module 724 skips any process related to loading of the data into the odd rows. This may be accomplished by storage of a coded parameter in the schedule table store 726 associated with the timing value AT1, for instance, the numeral zero. In this fashion the amount of time to complete the addressing event initiated at time AT1 is only ½ of the time required for addressing both banks of rows at time AT0. Note that the least significant red bitplane for the odd rows is not loaded into the array of light modulators 702 until much later, at time AT5.

Lamp extinguishing event times LT0-LTn−1 occur at times stored in the schedule table store 726. The times may be stored in terms of clock cycles following the detection of a vsync pulse, or they may be stored in terms of clock cycles following the beginning of the loading of the previous bitplane into the array of light modulators 702. For bitplanes which are to be illuminated for a period longer than the time it takes to load a bitplane into the array of light modulators 726, the lamp extinguishing times are set in the schedule table to coincide with the completion of a corresponding addressing event. For example, LT0 is set to occur at a time after AT0 which coincides with the completion of the loading of the even-numbered rows. LT0 is set to occur at a time after AT1 which coincides with the completion of the loading of bitplane RE0 into the even-numbered rows. LT3 is set to occur at a time after AT4, which coincides with the completion of the loading of bitplane RO1 into the odd-numbered rows. After all red bitplanes for each bank are loaded and illuminated for the appropriate amounts of time, the process begins again with the green bitplanes.

The example of bank-wise addressing by timing diagram 1900 provides for only two independently addressable and actuatable banks. In other embodiments, arrays of MEMS modulators and their drive circuits can be interconnected so as to provide 3, 4, 5, 6, 7, 8 or more independently addressable banks A display with 6 independently addressable banks would require only ⅙ the time for addressing the rows within one bank, in comparison to time needed for addressing of the whole display. With the use of 6 banks, 6 different bitplanes attributed to the same color of lamp can be interleaved and illuminated simultaneously. For the 6-bit example, the rows associated with each bank may be assigned to every $6^{th}$ row of the display.

In some embodiments that employ bank-wise addressing, it is not necessary to turn off the lamps while switching a given bank of rows from states indicated by one bitplane to states indicated in the next, as long as the states of the rows in the other contemporaneous banks are associated with the same color.

Referring again to the sequencing rules introduced with respect to timing diagram 1500, the bank-wise addressing scheme provides additional opportunities for reducing flicker in a MEMS-based field sequential display. In particular the red bitplane R1 for the even rows, introduced at addressing event AT0, is displayed within the same grouping of red sub-images as the red bitplane R1 for the odd rows, introduced at timing event AT4. Each of these bitplanes is displayed only once per frame. If the frame rate in timing diagram 19 was as low as 30 Hz, then the display of these lesser bitplanes would be separated by substantially more than 25 milliseconds between frames, contributing to the perception of flicker. However, this situation can be improved if the bitplanes in timing diagram 19 are further re-arranged such that the display of R1 bitplanes between adjacent frames are never separated by more than 25 milliseconds, preferably less than 17 milliseconds.

In particular, the display of the most significant bitplane in red, i.e. the most significant bit—R4, can be split, for instance at some point between the addressing events AT3 and AT4. The two groupings of red sub-images can then be re-arranged amongst similar sub-groupings in the green and blue sub-images. The red, green, and blue sub-groupings can be interspersed, as in the timing diagram 1500. The result is that that the display of the e.g. R1, G1, B1, sub-frame data sets can be arranged to appear at roughly equal time intervals, both within and between successive image frames. In this example, the R1 bitplane for the even rows would still appear only once per image frame. Flicker can be reduced, however, if the display of the R1 bitplane alternates between odd and even rows, and if the time separation between display of the odd or even portions of the bitplane is never more than 25 milliseconds, preferably less than 17 milliseconds.

Figure 20:
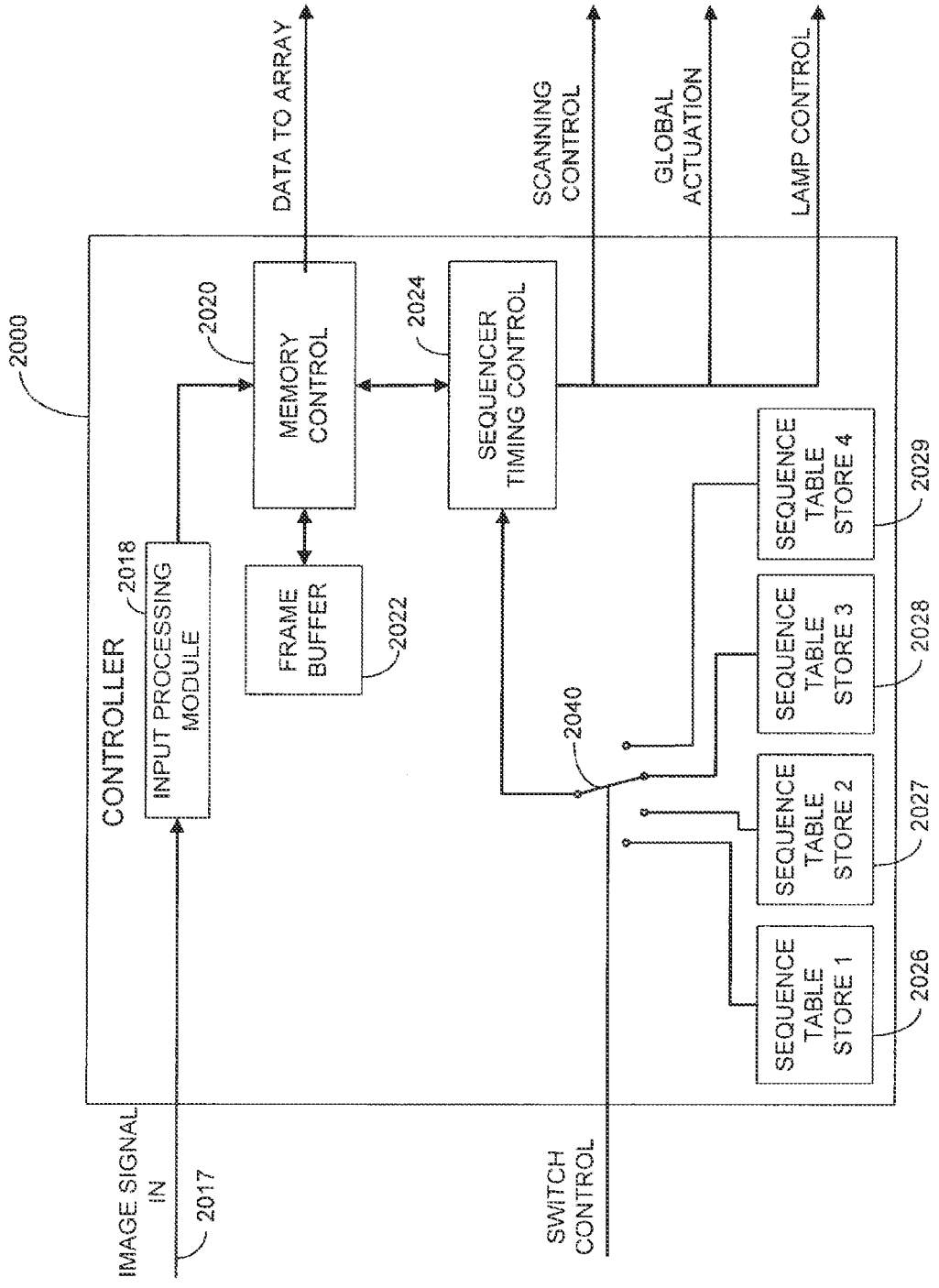
FIG. 20 is a block diagram of a controller suitable for inclusion in the display apparatus of FIG. 1, according to an illustrative embodiment of the invention.

FIG. 20 is a block diagram of a controller 2000 for use in a direct-view display, according to an illustrative embodiment of the invention. For example, the controller 2000 can replace the controller 704 of the direct-view MEMS display 700 of FIG. 7. The controller 2000 receives an image signal 2017 from an external source and outputs both data and control signals for controlling light modulators and lamps of the display into which it is incorporated The controller 2000 includes an input processing module 2018, a memory control module 2020, a frame buffer 2022, a timing control module 2024, four unique schedule table stores 2026, 2027, 2028, and 2029. For the controller 2000, instead of a programming link which allows alteration of the parameters in a schedule table store, the controller provides a switch control module 2040 which determines which of the 4 schedule table stores will be active at any given time. In some implementations the components 2018-2040 may be provided as distinct chips or circuits which are connected together by means of circuit boards and/or cables. In other implementations several of these components can be designed together into a single semiconductor chip such that their boundaries are nearly indistinguishable except by function.

The input processing module 2018 receives the image signal 2017 and processes the data encoded therein, similar to input processing module 718, into a format suitable for displaying via the array of light modulators. The input processing module 2018 takes the data encoding each image frame and converts it into a series of sub-frame data sets. While in various embodiments, the input processing module 2018 may convert the image signal 2017 into non-coded sub-frame data sets, ternary coded sub-frame data sets, or other form of coded sub-frame data set, preferably, the input processing module 2018 converts the image signal 2017 into bitplanes, as described above in relation to FIGS. 6A-6C.

The input processing module 2018 outputs the sub-frame data sets to the memory control module 2020. The memory control module 2020 then stores the sub-frame data sets in the frame buffer 2022. The frame buffer is preferably a random access memory, although other types of serial memory can be used without departing from the scope of the invention. The memory control module 2020, in one implementation stores the sub-frame data set in a predetermined memory location based on the color and significance in a coding scheme of the sub-frame data set. In other implementations, the memory control module 2020 stores the sub-frame data set in a dynamically determined memory location and stores that location in a lookup table for later identification. In one particular implementation, the frame buffer 2022 is configured for the storage of bitplanes.

The memory control module 2020 is also responsible for, upon instruction from the timing control module 2024, retrieving sub-image data sets from the frame buffer 2022 and outputting them to the data drivers. The data drivers load the data output by the memory control module 2020 into the light modulators of the array of light modulators. The memory control module 2020 outputs the data in the sub-image data sets one row at a time. In one implementation, the frame buffer 2022 includes two buffers, whose roles alternate. While the memory control module 2020 stores newly generated bitplanes corresponding to a new image frame in one buffer, it extracts bitplanes corresponding to the previously received image frame from the other buffer for output to the array of light modulators Both buffer memories can reside within the same circuit, distinguished only by address.

The order in which the sub-image data sets are output, referred to as the "sub-frame data set output sequence," and the time at which the memory control module 2022 begins outputting each sub-image data set is controlled, at least in part, by data stored in one of the alternate schedule table stores 2026, 2027, 2028, and 2029. Each of the schedule table stores 2026-2029 stores at least one timing value associated with each sub-frame data set, an identifier indicating where the sub-image data set is stored in the frame buffer 2022, and illumination data indicating the color or colors associated with the sub-image data set. In some implementations, the schedule table stores 2026-2029 also store intensity values indicating the intensity with which the corresponding lamp or lamps should be illuminated for a particular sub-frame data set.

In one implementation the timing values stored in the schedule table stores 2026-2029 determine when to begin addressing the array of light modulators with the sub-frame data set. In another implementation, the timing value is used to determine when a lamp or lamps associated with the sub-frame data set should be illuminated and/or extinguished. In one implementation, the timing value is a number of clock cycles, which for example, have passed since the initiation of the display of an image frame, or since the last addressing or lamp event was triggered. Alternatively, the timing value may be an actual time value, stored in microseconds or milliseconds.

The distinct timing values stored in the various schedule table stores 2026-2029 provide a choice between distinct imaging algorithms, for instance between display modes which differ in the properties of frame rate, lamp brightness, achievable grayscale precision, or in the saturation of displayed colors. The storage of multiple schedule tables, therefore, provides for flexibility in the method of displaying images, a flexibility which is especially advantageous when it provides a method for saving power for use in portable electronics. Direct view display 2000 includes 4 unique schedule tables stored in memory. In other implementations the number of distinct schedules that are stored may be 2, 3, or any other number. For instance it may be advantageous to store schedule parameters for as many as 100 unique schedule table stores.

The multiple schedule tables stored in controller 2000 allow for the exploitation of trade-offs between image quality and power consumption. For some images, which do not require a display of deeper, saturated colors, it is possible to rely on white lamps or mixed colors to provide brightness, especially as these color schemes can be more power efficient. Similarly, not all images or applications require the display of 16 million colors. A palette of 250,000 colors may be sufficient (6 bits per color) for some images or applications. For other images or applications, a color range limited to only 4,000 colors (4 bits per color) or 500 colors (3 bits per color) may be sufficient. It is advantageous to include electronics in a direct view MEMS display controller so as to provide display flexibility to take advantage of power saving opportunities.

Many of the variables effecting both image quality and power consumption in a MEMS direct view display are governed by the timing and bitplane parameters which are stored in the schedule table store stores 2026-2029. Together with the sequencing commands stored within the timing control module 2024, these parameters allow the controller 2000 to output variations on lamp intensities, frame rates, different pallets of colors (based on the mixing of lamp colors within a subfield), or different grey scale bit depths (based on the number of bitplanes employed to display an image frame).

In one implementation, each schedule table corresponds to a different display process. For example, schedule table 2026 corresponds to a display process capable of generating approximately 16 million colors (8 bits per color) with high color saturation. Schedule table 2027 corresponds to a display process appropriate only for black and white (e.g. text) images with a frame rate, or refresh rate, that is very low, e.g. less than 20 frames per second. Schedule table 2028 corresponds to a display process suited for outdoor viewing of color or video images where brightness is at a premium but where battery power must nevertheless be conserved. Schedule table 2029 corresponds to a display process providing a restricted choice of colors (e.g. 4,000) which would provide an easy to read and low-power display appropriate for most icon or text-type information with the exception of video. Of the display processes represented by the schedule table stores 2026-2029, the display process represented by schedule table 2026 requires the most power, whereas the display process represented by schedule table 2027 requires the least. The display processes corresponding to schedule tables 2028 and 2029 require power usage somewhere in between that required by the other display processes.

In the controller 2000, for any given image frame, the timing control module 2024 derives its display process parameters or constants from only one of the four possible sequence tables. A switch control module 2040 governs which of the sequence tables is referenced by the timing control module 2040. This switch control module 2040 could be a user controlled switch, or it could be responsive to commands from an external processor, contained either within the same housing as the MEMS display device or external to it (referred to as an "external module"). The external module, for instance, can decide whether the information to be displayed is text or video, or whether the information displayed should be colored or strictly black and white. In some embodiments the switch commands can originate from the input processing module 2018. Whether in response to an instruction from the user or an external module, the switch control module 2040 selects a schedule table store that corresponds to the desired display process or display parameters.

Figure 21:
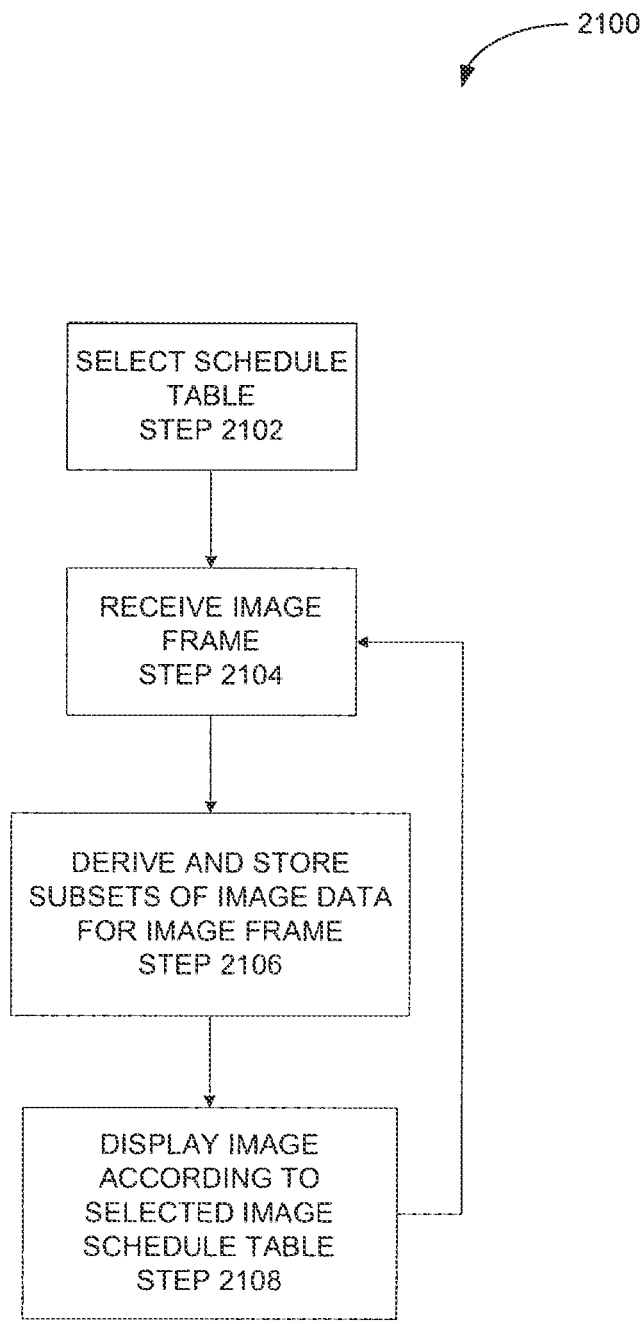
FIG. 21 is a flow chart of a method of displaying an image suitable for use by the controller of FIG. 20, according to an illustrative embodiment of the invention.

FIG. 21 is a flow chart of a process of displaying images 2100 (the "display process 2100") suitable for use by a direct-view display such as the controller 2000 of FIG. 20, according to an illustrative embodiment of the invention. Referring to FIGS. 20 and 21, the display process 2100 begins with the selection of an appropriate schedule table for use in displaying an image frame (step 2102). For example, a selection is made between schedule table stores 2026-2029. This selection can be made by the input processing module 2118, a module in another part of the device in which the direct-view MEMS display is incorporated, or it can be made directly by the user of the device. When the selection amongst schedule tables is made by the input processing module or an external module, it can be made in response to the type of image to be displayed (for instance video or still images require finer levels of gray scale contrast versus an image which needs only a limited number of contrast levels (such as a text image)). Another factor which that might influence the selection of an imaging mode or schedule table, whether selected directly by a user or automatically by the external module, might be the lighting ambient of the device. For example, one might prefer one brightness for the display when viewed indoors or in an office environment versus outdoors where the display must compete in an environment of bright sunlight. Brighter displays are more likely to be viewable in an ambient of direct sunlight, but brighter displays consume greater amounts of power. The external module, when selecting schedule tables on the basis of ambient light, can make that decision in response to signals it receives through an incorporated photodetector. Another factor that might influence the selection of an imaging mode or schedule table, whether selected directly by a user or automatically by the external module, might be the level of stored energy in a battery powering the device in which the display is incorporated. As batteries near the end of their storage capacity it may be preferable to switch to an imaging mode which consumes less power to extend the life of the battery.

The selection step 2102 can be accomplished by means of a mechanical relay, which changes the reference within the timing control module 2024 to only one of the four schedule table stores 2026-2029. Alternately, the selection step 2102 can be accomplished by the receipt of an address code which indicates the location of one of the schedule table stores 2026-2029. The timing control module 2024 then utilizes the selection address, as received through the switch control module 2040, to indicate the correct memory source for its schedule parameters. Alternately the timing control module 2024 can make reference to a schedule table stored in memory by means of a multiplexer circuit, similar to a memory control circuit. When a selection code is entered into the controller 2000 by means of the switch control module 2040, the multiplexer is reset so that schedule table parameters requested by the timing control module 2024 are routed to the correct address in memory.

The process 2100 then continues with the receipt of the data for an image frame. The data is received by the input processing module 2018 by means of the input line 2017 at step 2104. The input processing module then derives a plurality of sub-frame data sets, for instance bitplanes, and stores them in the frame buffer 2022 (step 2106). After storage of the sub-frame data sets the timing control module 2024 proceeds to display each of the sub-frame data sets, at step 2108, in their proper order and according to timing values stored in the selected schedule table.

The process 2100 then continues iteratively with receipt of subsequent frames of image data. The sequence of receiving image data at step 2104 through the display of the sub-frame data sets at step 2108 can be repeated many times, where each image frame to be displayed is governed by the same selected schedule table. This process can continue until the selection of a new schedule table is made at a later time, e.g. by repeating the step 2102. Alternatively, the input processing module 2018 may select a schedule table for each image frame received, or it may periodically examine the incoming image data to determine if a change in schedule table is appropriate.

Figure 22:
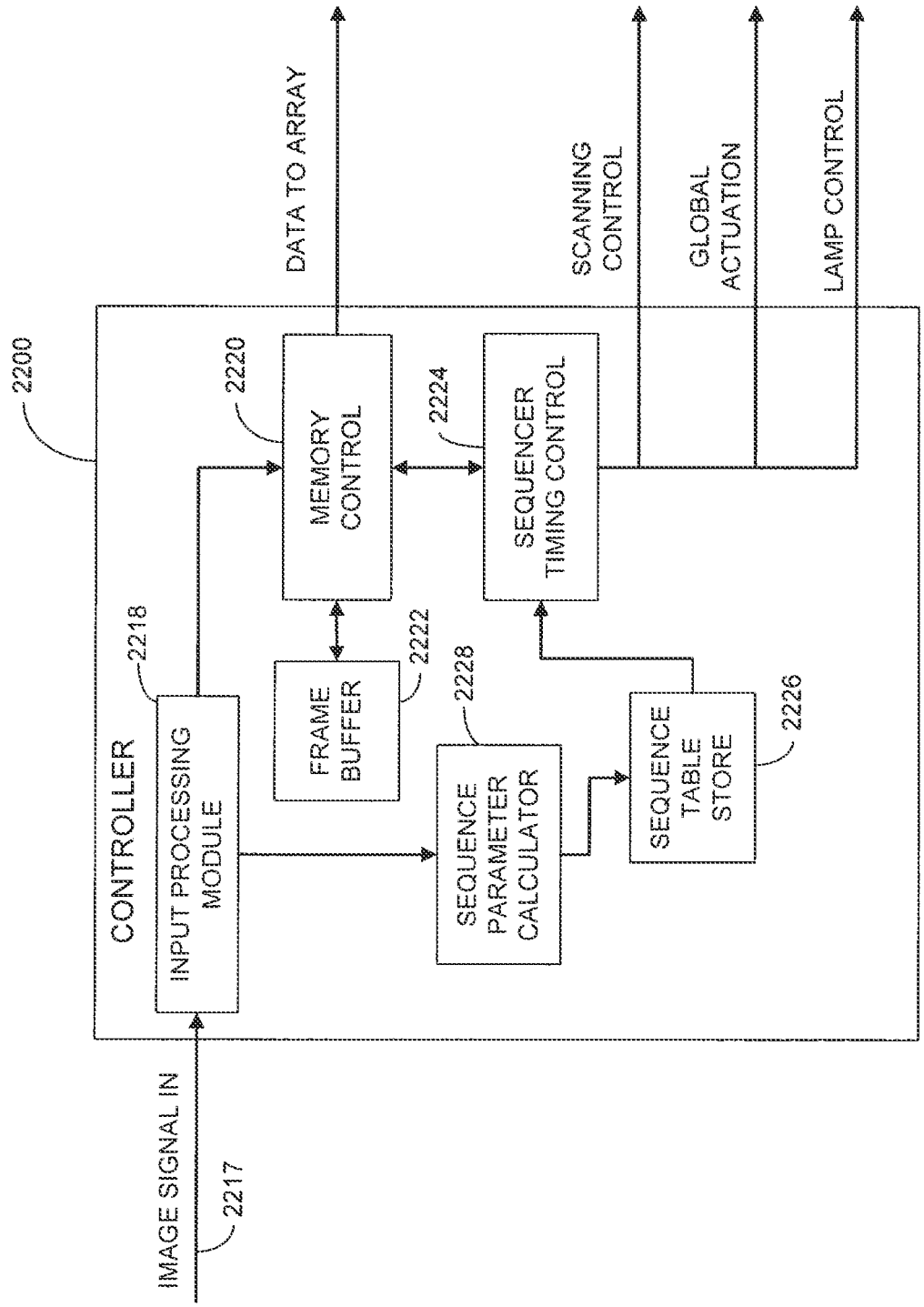
FIG. 22 is a block diagram of a second controller suitable for inclusion in the display apparatus of FIG. 1, according to an illustrative embodiment of the invention.

FIG. 22 is a block diagram of a controller 2200, suitable for inclusion in a MEMS direct-view display, according to an illustrative embodiment of the invention. For example, the controller 2200 may replace the controller 704 of the MEMS direct-view display 700. The controller 2200 receives an image signal 2217 from an external source and outputs both data and control signals for controlling the drivers, light modulators, and lamps of the display in which the controller is included.

The controller 2200 includes an input processing module 2218, a memory control module 2220, a frame buffer 2222, a timing control module 2224. In contrast to controllers 704 and 2000, the controller 2200 includes a sequence parameter calculation module 2228. The sequence parameter calculation module receives monitoring data from the input processing module 2218 and outputs changes to the sequencing parameters stored within the schedule table store 2226, and in some implementations, changes to the bitplanes stored for a given image frame. In some implementations, the components 2218, 2220, 2222, 2224, 2226, and 2228 may be provided as distinct chips or circuits which are connected together by means of circuit boards and/or cables. In other implementations, several of these components can be designed together into a single semiconductor chip such that their boundaries are nearly indistinguishable except by function.

The input processing module 2218 receives the image signal 2217 and processes the data encoded therein into a format suitable for displaying via the array of light modulators. The input processing module 2218 takes the data encoding each image frame and converts it into a series of sub-frame data sets. A sub-frame data set includes information about the desired states of modulators in multiple rows and multiple columns of the array of light modulators. The number and content of sub-frame data sets used to display an image frame depends on the grayscale technique employed by the controller 2200. For example, the sub-frame data sets needed to form an image frame using a coded time-division gray scale technique differs from the number and content of sub-frame data sets used to display an image frame using a non-coded time division gray scale technique. While in various embodiments, the input processing module 2218 may convert the image signal 2217 into non-coded sub-frame data sets, ternary coded sub-frame data sets, or other form of coded sub-frame data set, preferably, the input processing module 2218 converts the image signal 2217 into bitplanes, as described above in relation to FIGS. 6A-6C.

The input processing module 2218 outputs the sub-frame data sets to the memory control module 2220. The memory control module 2220 then stores the sub-frame data sets in the frame buffer 2222. The memory control module 2220, in one implementation stores the sub-frame data set in a predetermined memory location based on the color and significance in a coding scheme of the sub-frame data set. In other implementations, the memory control module 2220 stores the sub-frame data set in a dynamically determined memory location and stores that location in a lookup table for later identification. In one particular implementation, the frame buffer 2222 is configured for the storage of bitplanes.

The memory control module 2220 is also responsible for, upon instruction from the timing control module 2224, retrieving bitplanes sets from the frame buffer 2222 and outputting them to the data drivers 2208. The data drivers 2208 load the data output by the memory control module 2220 into the light modulators of the array of light modulators. The memory control module 2220 outputs the data in the sub-image data sets one row at a time. In one implementation, the frame buffer 2222 includes two buffers, whose roles alternate. While the memory control module 2220 stores newly generated bitplanes corresponding to a new image frame in one buffer, it extracts bitplanes corresponding to the previously received image frame from the other buffer for output to the array of light modulators Both buffer memories can reside within the same circuit, distinguished only by address.

The order in which the sub-image data sets are output, referred to as the "sub-frame data set output sequence," and the time at which the memory control module 2220 begins outputting each sub-image data set is controlled, at least in part, by data stored in the schedule table store 2226. The schedule table store 2226 stores at least one timing value associated with each sub-frame data set, an identifier indicating where the sub-image data set is stored in the frame buffer 2222, and illumination data indicating the color or colors associated with the sub-image data set. In some implementations, the schedule table store 2226 also stores intensity values indicating the intensity with which the corresponding lamp or lamps should be illuminated for a particular sub-frame data set.

In one implementation the timing values stored in the schedule table store 2226 determine when to begin addressing the array of light modulators with each sub-frame data set. In another implementation, the timing value is used to determine when a lamp or lamps associated with the sub-frame data set should be illuminated and/or extinguished. In one implementation, the timing value is a number of clock cycles, which for example, have passed since the initiation of the display of an image frame, or since the last addressing or lamp event was triggered. Alternatively, the timing value may be an actual time value, stored in microseconds or milliseconds.

Controller 2200 includes a re-configurable schedule table store 2226. As described above with respect to controllers 704 and 2000 the schedule table store 2226 provides a flexible or programmable component to the controller. A programming link, such as the interface 730 allowed the schedule table store 726 within controller 704 to be altered or reprogrammed according to different lamp intensities, frame rates, color schemes, or grey scale bit depths. Similar alterations to the display process are possible for schedule table store 2226 within controller 2200, except that these variations now occur automatically in response to the requirements of individual image frames, based on characteristics of those image frames detected by the input processing module 2218

Based on the data contained within the image frame, it is often possible to reduce power consumption in the display by controlling variables such as lamp brightness, color saturation, and bit depth without any change or distortion perceptible in the image. This is because many images do not require full brightness from the lamps, or they do not require the deepest or most saturated of colors, or they require only a limited number of gray scale levels. Controller 2200 is configured to sense the display requirements for an image frame based on the data within the image frame and to adapt the display algorithm by means of changes to the schedule table store 2226.

A method by which the controller 2200 can adapt the display characteristics based on the content of incoming image data is shown in FIG. 23 as display method 2300. Display method 2300 is suitable for use by a MEMS direct-view display such as the MEMS direct-view display 2200 of FIG. 22, according to an illustrative embodiment of the invention. Referring to FIGS. 22 and 23, the display method 2300 begins with the receipt of the data for an image frame at step 2302. The data is received by the input processing module 2218 by means of the input line 2217. The input processing module 2218 derives a plurality of sub-frame data sets, for instance bitplanes, from the data and stores the bitplanes in the frame buffer 2222. Additionally, however, at step 2304 prior to the storage of the bitplanes in step 2306, the input processing module monitors and analyzes the content of the incoming image to look for characteristics which might effect the display of that image. For instance at step 2304 the input processing module might make note of the pixel or pixels with the most saturated colors in the image frame, i.e. pixels which call for significant brightness values from one color which are not balanced, diluted or desaturated by requiring illumination in the same pixel from the other color lamps in the same image frame. In another example of input data monitoring, the input processing module 2218 might make note of the pixel or pixels with the brightest values required of each of the lamps, regardless of color saturation.

After a complete image frame has been received and stored in the frame buffer 2222 the method 2300 proceeds to step 2308. At step 2308 the sequence parameter calculation module 2228 assesses the data collected at step 2304 and identifies changes to the display process that can be implemented by adjusting values in the sequence table 2226. The changes to the sequence table 2226 are then affected at step 2310 by re-writing certain of the parameters stored within table 2226. Finally, at step 2312, the method 2300 proceeds to the display of sub-images according to the ordering parameters and timing values that have been re-programmed within the schedule table 2226.

The method 2300 then continues iteratively with receipt of subsequent frames of image data. As indicated in the method 800, the processes of receiving (step 2302) and displaying image data (step 2312) may run in parallel, with one image being displayed from the data of one buffer memory according to the re-programmed schedule table at the same time that new sub-frame data sets are being analyzed and stored into a parallel buffer memory. The sequence of receiving image data at step 2302 through the display of the sub-frame data sets at step 2312 can be repeated interminably, where each image frame to be displayed is governed by a schedule table which is re-programmed in response to the incoming data.

It is instructive to consider some examples of how the method 2300 can reduce power consumption by adjusting the display characteristics in the schedule table store 2226 in response to data collected at step 2304. These examples are referred to as adaptive power schemes.

In one scheme for adaptive power that is responsive to the incoming image data, the data monitoring at step 2304 detects the pixels in each frame with the most saturated colors. If it is determined that the most saturated color required for a frame is only 82% of the saturation available from the colored lamps, then it is possible to remix the colors that are provided to the bitplanes so that power can be saved—while still providing the 82% saturation level required by the image. By adding, for instance subordinate red, green, or blue colors to the primary color in each frame, power can be saved in the display. In this example the sequence parameter calculation module 2228 would receive a signal from the input processing module 2218 indicating the degree of color mixing which is allowed. Before the frame is displayed the sequence parameter calculation module re-writes the intensity parameters in the sequence table 2226 which determine color mixing at each bitplane, so that colors are correspondingly desaturated and power is saved.

In another adaptive power scheme, a process is provided within the sequence parameter calculation module 2228 which determines whether the image is comprised solely of text or text plus symbols as opposed to video or a photographic image. The sequence parameter calculation module 2228 then re-writes the parameters in the sequence table accordingly. Text images, especially black and white text images, do not need to be refreshed as often as video images and typically require only a limited number of different colors or gray shades. The sequence parameter calculator 2228 can therefore adjust both the frame rate as well as the number of sub-images to be displayed for each image frame. Text images require fewer sub-images in the display process than photographic images In still another adaptive power scheme, the monitoring function at step 2304 analyzes or searches for the maximum intensity attributed to each color in each pixel. If an image is to be displayed that requires no more than 65% of the brightness from any of the lamps for any of the pixels, then in some cases it is possible to display that image correctly by reducing the average intensity of the lamps accordingly. The lamp intensity values within the schedule table store 2226 can be reduced by a set of commands within the sequence parameter calculation module 2228.

APPENDIX 1

Appendix 1 presents a timing sequence 3000 expressed by means of schedule table 9, which expresses an embodiment for the timing sequences of this invention.

The timing sequence 3000 of Appendix 1 is appropriate to the display of image information at a 30 Hz frame rate (e.g. 33.3 milliseconds between vsync pulses); it includes the display of 7 bits for each of the colors red, green, and blue. The timing sequence 3000 is constrained by the following parameters related to setting of modulator states in the array:

240 microseconds required for loading a complete bitplane to the array 120 microseconds required for loading bitplanes to only a single bank (odd or even) of rows 100 microseconds required for global actuation The schedule table for timing sequence 3000 includes the following information, required by the timing control module 724 for display of the sub-images Subfield number Bitplane interval (elapsed time between global actuation pulses)

Alphanumeric code for memory locations of the bitplanes, separated by their assigned banks (e.g. R0, R1, R2, . . . R6)

Illumination intensity

The schedule table for timing sequence 3000 does not distinguish between addressing times and illumination times. Instead the logic within the timing control module 724 assumes that each bitplane interval begins immediately after completion of a global actuation event. In the first action of the sequence after global actuation the lamps are illuminated according to the intensity values listed in Table 9.

The timing sequence 3000 includes the following features as described previously. Similar to timing sequence 1200, the display that employs timing sequence 3000 includes the capability of global actuation. The display that employs timing sequence 3000 includes two independent global actuation circuits, for each of the odd and even banks respectively. The timing sequence 3000 includes a scheme for control of the lamps, similar to that described in timing sequence 1450, in which both pulse periods and pulse intensity is used to express illumination value. The timing sequence 3000 is capable of mixing colors, as in timing sequence 1700, although in this embodiment only one lamp is illuminated at one time.

The timing sequence 3000 includes bank-wise addressing. The lesser bitplanes, e.g. R0, R1, R2, and R3 are always displayed successively within a given bank, e.g. the odd rows, and this sequence of lesser bitplanes is illuminated at the same time that the most significant bit (e.g. R6) is illuminated in the other bank (e.g. in the even rows).

The timing sequence 3000 splits the most significant bits (e.g. R6, G6, and B6 into four separate but equally timed sub-images. The timing sequence alternates colors frequently, with a maximum period between colors of 1.38 milliseconds. The time between the expression of most significant bits is not always equal between successive pairs of most significant bits, but in no case is that period between most significant bits greater than 4.16 milliseconds.

TABLE 9

Schedule Table 9

| Field Number | Illumination Width | Illumination Intensity | Interval Time Width (ms) | Odd Load bitplane | Even Load bitplane |
|---|---|---|---|---|---|
| 0 |  |  |  | R1 | R6 |
| 1 | 1 | 1 | 0.1301 | R2 | * |
| 2 | 2 | 1 | 0.2602 | R3 | * |
| 3 | 4 | 1 | 0.5203 | R0 | * |
| 4 | 1 | 0.5 | 0.1301 | G1 | G6 |
| 5 | 1 | 1 | 0.1301 | G2 | * |
| 6 | 2 | 1 | 0.2602 | G3 | * |
| 7 | 4 | 1 | 0.5203 | G0 | * |
| 8 | 1 | 0.5 | 0.1301 | B1 | B6 |
| 9 | 1 | 1 | 0.1301 | B2 | * |
| 10 | 2 | 1 | 0.2602 | B3 | * |
| 11 | 4 | 1 | 0.5203 | B0 | * |
| 12 | 1 | 0.5 | 0.1301 | R6 | R6 |
| 13 | 8 | 1 | 1.0406 | G6 | G6 |
| 14 | 8 | 1 | 1.0406 | B6 | B6 |
| 15 | 8 | 1 | 1.0406 | R5 | R5 |
| 16 | 8 | 1 | 1.0406 | G5 | G5 |
| 17 | 8 | 1 | 1.0406 | B5 | B5 |
| 18 | 8 | 1 | 1.0406 | R4 | R6 |
| 19 | 8 | 1 | 1.0406 | G4 | G6 |
| 20 | 8 | 1 | 1.0406 | B4 | B6 |
| 21 | 8 | 1 | 1.0406 | R6 | R1 |
| 22 | 1 | 1 | 0.1301 | * | R2 |
| 23 | 2 | 1 | 0.2602 | * | R3 |
| 24 | 4 | 1 | 0.5203 | * | R0 |
| 25 | 1 | 0.5 | 0.1301 | G6 | G1 |
| 26 | 1 | 1 | 0.1301 | * | G2 |
| 27 | 2 | 1 | 0.2602 | * | G3 |
| 28 | 4 | 1 | 0.5203 | * | G0 |
| 29 | 1 | 0.5 | 0.1301 | B6 | B1 |
| 30 | 1 | 1 | 0.1301 | * | B2 |
| 31 | 2 | 1 | 0.2602 | * | B3 |
| 32 | 4 | 1 | 0.5203 | * | B0 |
| 33 | 1 | 0.5 | 0.1301 | R6 | R6 |
| 34 | 8 | 1 | 1.0406 | G6 | G6 |
| 35 | 8 | 1 | 1.0406 | B6 | B6 |
| 36 | 8 | 1 | 1.0406 | R5 | R5 |
| 37 | 8 | 1 | 1.0406 | G5 | G5 |
| 38 | 8 | 1 | 1.0406 | B5 | B5 |
| 39 | 8 | 1 | 1.0406 | R6 | R4 |
| 40 | 8 | 1 | 1.0406 | G6 | G4 |
| 41 | 8 | 1 | 1.0406 | B6 | B4 |
| 42 | 8 | 1 | 1.0406 | R1 | R6 |

The invention claimed is:

1. An electromechanical device, comprising:
an array of light blocking elements, each respective light blocking element movable between at least two positions;
at least two light sources including a first light source generating light of a first color and a second light source generating light of a second different color; and
a controller for:
receiving image data encoding an image frame;
generating at least two sub-frames for each color component of a plurality of color components associated with the image frame, wherein each sub-frame corresponds to illumination and extinguishing of at least one light source,
moving each respective light blocking element between the at least two positions; and
controlling the light sources to generate light to pass towards the array of light blocking elements, wherein, for the image frame, the light of the first color is generated at a greater intensity and for a different length of time during an illumination period of a first sub-frame associated with a color component than during an illumination period of a second sub-frame associated with the color component.

2. The electromechanical device of claim 1, wherein a respective light blocking element corresponds to at least one aperture and blocks light from passing through the aperture while in at least one of the two positions.

3. The electromechanical device of claim 2, further comprising a transparent substrate, the apertures and the light blocking elements being formed on the transparent substrate.

4. The electromechanical device of claim 3, wherein the light blocking elements include electromechanical shutters that are movable transverse to the substrate to modulate light passing through the apertures.

5. The electromechanical device of claim 1, wherein during a sub-frame associated with a respective color component, the controller applies an electrical signal to drive the first light source at a greater intensity than the second light source.

6. The electromechanical device of claim 1, wherein the controller outputs a control signal to coordinate driving the array of light blocking elements and illuminating the at least two light sources to display a single sub-frame image.

7. The electromechanical device of claim 6, comprising a third light source, wherein the first light source corresponds to a red color, the second light source corresponds to a green color, and the third light source corresponds to a blue color.

8. An apparatus, comprising:
light generating means for generating light of at least a first color and a second color;
modulating means for modulating the light;
control means for:
receiving image data encoding an image frame;
generating at least two sub-frames for each color component of a plurality of color components associated with the image frame, each sub-frame corresponds to illumination and extinguishing of the light generating means;

moving the modulating means to one of at least two positions, based on the received image data; and driving the light generating means to generate light to pass towards the modulating means, wherein for the image frame, the light of the first color is generated at a greater intensity and for a different length of time during an illumination period of a first sub-frame associated with a color component than during an illumination period of a second sub-frame associated with that color component.

9. The apparatus of claim 8, comprising a means for storing an output sequence parameter, the output sequence parameter including data corresponding to timing an intensity values.

10. The apparatus of claim 9, comprising applying electrical signals to drive the light generating means to generate light of at least the first and second color in accordance with the output sequence parameter data.

11. The apparatus of claim 8, wherein driving the light generating means includes driving the light generating means to generate light of at least the first color and the second color at the same time during an illumination period for a sub-frame image.

12. The apparatus of claim 8, wherein driving the light generating means to generate light occurs after moving the means for modulating light is complete.

13. An electromechanical device comprising:
a substrate;
an array of light blocking elements formed on the substrate, the respective light blocking elements having at least two positions;
at least two light sources that generate light of at least two colors to pass towards the array of light blocking elements; and
a controller for:
obtaining a plurality of sub-frame data sets from a memory for each color component of a plurality of color components, wherein the sub-frame data sets correspond to a portion of a time associated with display of an image frame;
controlling the position of the light blocking elements in the array according to the sub-frame data sets; and
illuminating at least one light source to display sub-frame images corresponding to sub-frame data sets associated with a respective color component, wherein for the image frame, light of a first color is generated at a greater intensity and for a different length of time during an illumination period of a first sub-frame image associated with the color component than during an illumination period of a second sub-frame associated with the color component.

14. The electromechanical device of claim 13, wherein the controller applies an electrical signal to drive, during an illumination period of a sub-frame associated with a color component, a first light source of one color at a greater intensity than the other light sources of different colors.

15. The electromechanical device of claim 13, wherein the at least two light sources comprise light sources of at least three different colors.

16. The electromechanical device of claim 13, wherein the light blocking elements comprise electromechanical shutters that move transverse to the substrate.

17. The electromechanical device of claim 13, wherein the substrate is transparent.

18. The electromechanical device of claim 1, wherein the first and second colors include colors other than white.

19. The electromechanical device of claim 8, wherein the first and second colors include colors other than white.

20. The electromechanical device of claim 13, wherein the at least two light sources generate colors other than white.

* * * * *